(12) United States Patent
Ferrante et al.

(10) Patent No.: US 10,084,515 B2
(45) Date of Patent: Sep. 25, 2018

(54) METHOD AND SYSTEM FOR MILLIMETER WAVE HOTSPOT (MMH) BACKHAUL AND PHYSICAL (PHY) LAYER TRANSMISSIONS

(71) Applicant: INTERDIGITAL PATENT HOLDINGS, INC., Wilmington, DE (US)

(72) Inventors: Steven Ferrante, Doylestown, PA (US); Arnab Roy, East Norriton, PA (US); Philip J. Pietraski, Jericho, NY (US); Ravikumar V. Pragada, Collegeville, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 82 days.

(21) Appl. No.: 15/029,837

(22) PCT Filed: Oct. 16, 2014

(86) PCT No.: PCT/US2014/060973
§ 371 (c)(1),
(2) Date: Apr. 15, 2016

(87) PCT Pub. No.: WO2015/058005
PCT Pub. Date: Apr. 23, 2015

(65) Prior Publication Data
US 2016/0241314 A1    Aug. 18, 2016

Related U.S. Application Data

(60) Provisional application No. 61/891,738, filed on Oct. 16, 2013.

(51) Int. Cl.
*H04W 4/00* (2018.01)
*H04W 56/00* (2009.01)
(Continued)

(52) U.S. Cl.
CPC ......... *H04B 7/0452* (2013.01); *H04B 7/0408* (2013.01); *H04W 72/0406* (2013.01); *H04W 72/10* (2013.01)

(58) Field of Classification Search
CPC ................................ H04W 4/00; H04W 56/00
See application file for complete search history.

(56) References Cited

U.S. PATENT DOCUMENTS 8,767,892 B1 * 7/2014 Stein ..................... H04L 7/0004
375/140
8,830,917 B1 * 9/2014 Zhang ..................... H04W 4/00
370/329
(Continued)

OTHER PUBLICATIONS

Abu-Surra et al., "PHY Simulations and Methodology," IEEE P802.11, Wireless LANs, IEEE 802.11-10/0431r3 (May 2010).
(Continued)

*Primary Examiner* — Melanie Jagannathan
(74) *Attorney, Agent, or Firm* — Volpe and Koenig, P.C.

(57) ABSTRACT

A method and apparatus are disclosed for communication in a Millimeter Wave Hotspot (mmH) backhaul system which uses mesh nodes. A mmH mesh node may receive a control signal which includes a total number of available control slots. The mesh node may determine the number of iterations of a resource scheduling mechanism that can be made during the time period of all available control slots, based on the number of neighbor nodes for the mesh node. Further, the mesh node may receive control slot information, including information about traffic queues and priorities. The mesh node may then perform resource scheduling using the resource scheduling mechanism based on the currently received control slot information and control slot information received in previous iterations of resource scheduling. The mesh node may also adjust a preamble based on a time
(Continued)

between a last packet transmission and a current packet transmission to a neighboring node.

6 Claims, 42 Drawing Sheets

(51) Int. Cl.
  *H04B 7/0452* (2017.01)
  *H04W 72/04* (2009.01)
  *H04W 72/10* (2009.01)
  *H04B 7/0408* (2017.01)

(56) References Cited

U.S. PATENT DOCUMENTS

| | | | |
|---|---|---|---|
| 2003/0198206 A1 | 10/2003 | Cain et al. | |
| 2005/0286477 A1 | 12/2005 | Gupta et al. | |
| 2009/0285269 A1* | 11/2009 | Zhang | H04B 1/70735 375/150 |
| 2010/0080266 A1* | 4/2010 | Zhang | H04J 13/102 375/140 |
| 2015/0016409 A1 | 1/2015 | Thill et al. | |

OTHER PUBLICATIONS

Cordeiro, "IEEE 802.11 NG60 SG Proposed CSD," IEEE 802.11-14/1152r8 (Sep. 2014).

Cordeiro, "IEEE 802.11 NG60 SG Proposed PAR," IEEE 802.11-14/1151r8 (Sep. 2014).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Lansford, "Wireless Next Generation (WNG) Standing Committee Meeting Minutes for May 2014 Interim Meeting Waikoloa, Hawaii, USA," IEEE P802.11, Wireless LANs (May 2014).

Levy et al., "A Backhaul Use Case for NG 11ad," IEEE 11-14/0579r0 (Mar. 2014).

Levy et al., "A Backhaul Use Case for NG 11ad," IEEE 11-14/0579r1 (May 2014).

Seberry et al., "On a Use of Golay Sequences for Asynchronous DS CDMA Applications," University of Wollongong Research Online (2002).

Zhang, "DTRA: Directional Transmission and Reception Algorithms in WLANs with Directional Antenna for QoS Support," IEEE Network, VI. 19, No. 3, pp. 27-32 (May 2005).

\* cited by examiner

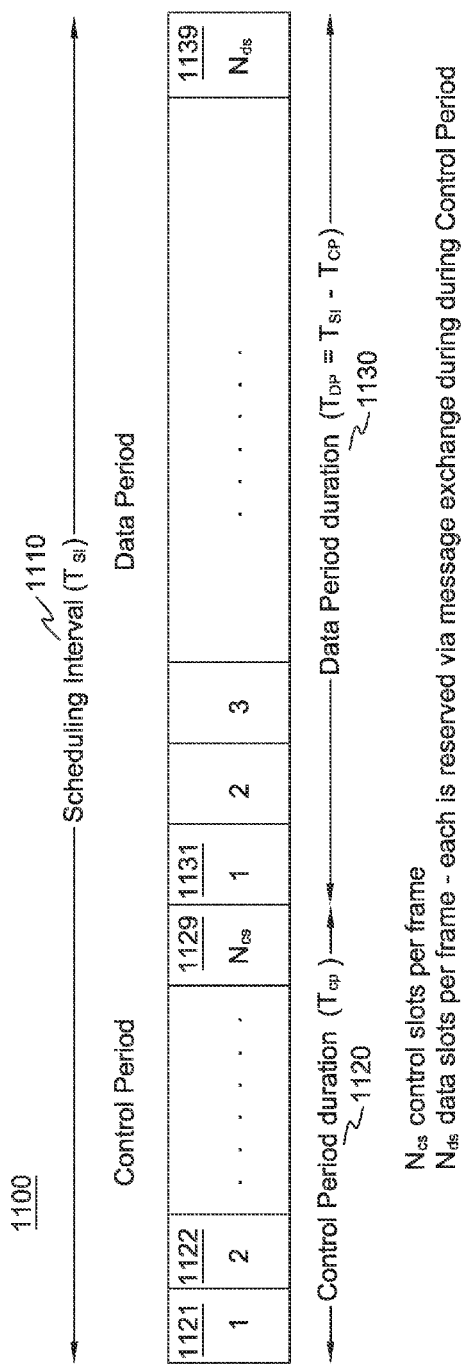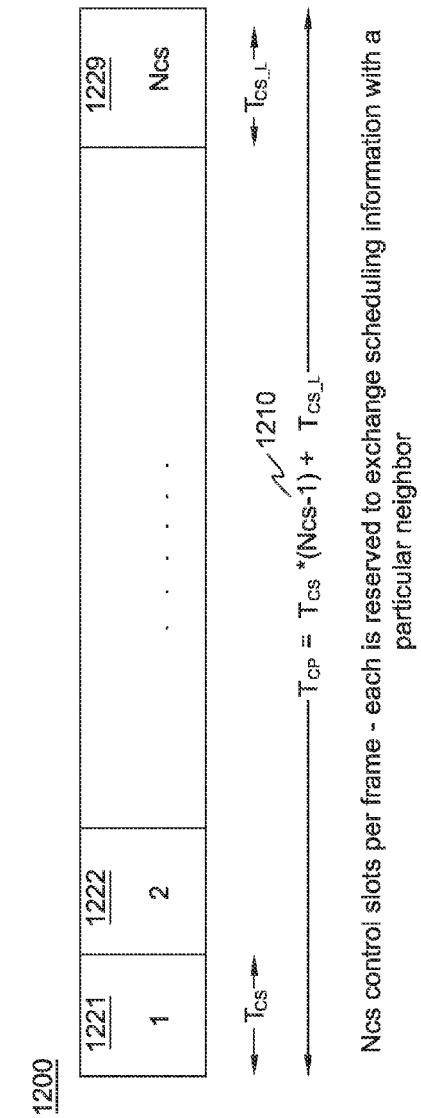

METHOD AND SYSTEM FOR MILLIMETER WAVE HOTSPOT (MMH) BACKHAUL AND PHYSICAL (PHY) LAYER TRANSMISSIONS

CROSS REFERENCE TO RELATED APPLICATIONS

This application is the U.S. National Stage, under 35 U.S.C. § 371, of International Application No. PCT/US2014/060973 filed Oct. 16, 2014, which claims the benefit of U.S. Provisional Application No. 61/891,738 filed Oct. 16, 2013, the contents of which are hereby incorporated by reference herein.

BACKGROUND

It is well known that the capacity demand in cellular networks has been growing exponentially for many years and is expected to continue this way for at least the next decade. While advances in spectral efficiency will continue, the gains that we can expect from these advances are limited. Densification of cellular networks will continue to be the leading source of capacity gains until the use of higher frequencies becomes feasible for access link. Small-cells are currently being used to increase the density of networks and address these capacity problems. This increase in cell density, however, requires a corresponding increase in backhaul cap abilities.

Rolling out fiber to all of these new nodes is cost prohibitive. The Millimeter Wave Hotspot (mmH) project proposes the use of highly directional millimeter (mm) wave links between these small-cell nodes as a way to address this concern. Small cells are expected to be rolled out first in dense urban environments of varying landscapes.

SUMMARY

A method and apparatus are disclosed for communication in a Millimeter Wave Hotspot (mmH) backhaul system which uses mesh nodes. A mmH mesh node may receive a control signal which includes a total number of available control slots. The mesh node may determine the number of iterations of a resource scheduling mechanism that can be made during the time period of all available control slots, signaled by the control signal, based on the number of neighbor nodes for the mesh node. Further, the mesh node may receive control slot information from neighbor nodes, wherein the control slot information includes information about traffic queues and priorities. The mesh node may then perform resource scheduling using the resource scheduling mechanism based on the currently received control slot information and control slot information received in previous iterations of resource scheduling. In an example, the control signal may be received from a mesh controller.

The resource scheduling mechanism may include a resource assignment algorithm. Further, the resource requests and temporary schedules for all priorities may be received in each iteration. Also, the number of control slot may vary based on the neighboring nodes. In an example, the control slot information may include only information concerning a current priority level and lower priority levels. In a further example, the mesh node may schedule higher priority traffic in initial scheduling iterations and lower priority traffic in later scheduling iterations.

The mesh node may also receive one or more signals regarding an initial preamble length. The mesh node may adjust a preamble based on a time between a last packet transmission and a current packet transmission to a neighboring node. The mesh mode may then send transmissions using the adjusted preamble to at least one neighboring node. In an example, the signals regarding an initial preamble length may be received from a central node. In a further example, the preamble length may be based on the content of the transmission. Also, the mesh node may further adjust the preamble based on estimated channel conditions for at least one neighboring node. If the mesh node receives an acknowledgement, the mesh node may send further transmissions using the adjusted preamble. If the mesh node fails to receive an acknowledgement, the mesh node may send further transmissions using a preamble longer than the adjusted preamble.

An mmH node may transmit a plurality of beacons during a beacon transmission interval. Each of the beacons may be transmitted in a different transmit antenna direction and separated by a beacon switch interframe spacing (BSIFS). The node may receive a plurality of beacon responses, each separated by a long interframe spacing (LIFS). The node may then transmit a beacon acknowledgment message in response to at least one of the beacon responses. The beacon acknowledgment message may be separated from the last beacon response by an LIFS.

In an additional embodiment, an mmH node may receive a control slot assignment for communication with a neighbor node and an indication of an initial direction for communication. The node may transmit a request to the neighbor node during the assigned control slot for a data slot for a subsequent transmission to the neighbor node and may receive a response from the neighbor node that includes a data slot for the subsequent transmission.

BRIEF DESCRIPTION OF THE DRAWINGS

A more detailed understanding may be had from the following description, given by way of example in conjunction with the accompanying drawings wherein:

FIG. 11 is a diagram of an example scheduling interval (SI);

FIG. 12 is a diagram of an example control period structure;

DETAILED DESCRIPTION

Figure 1A:
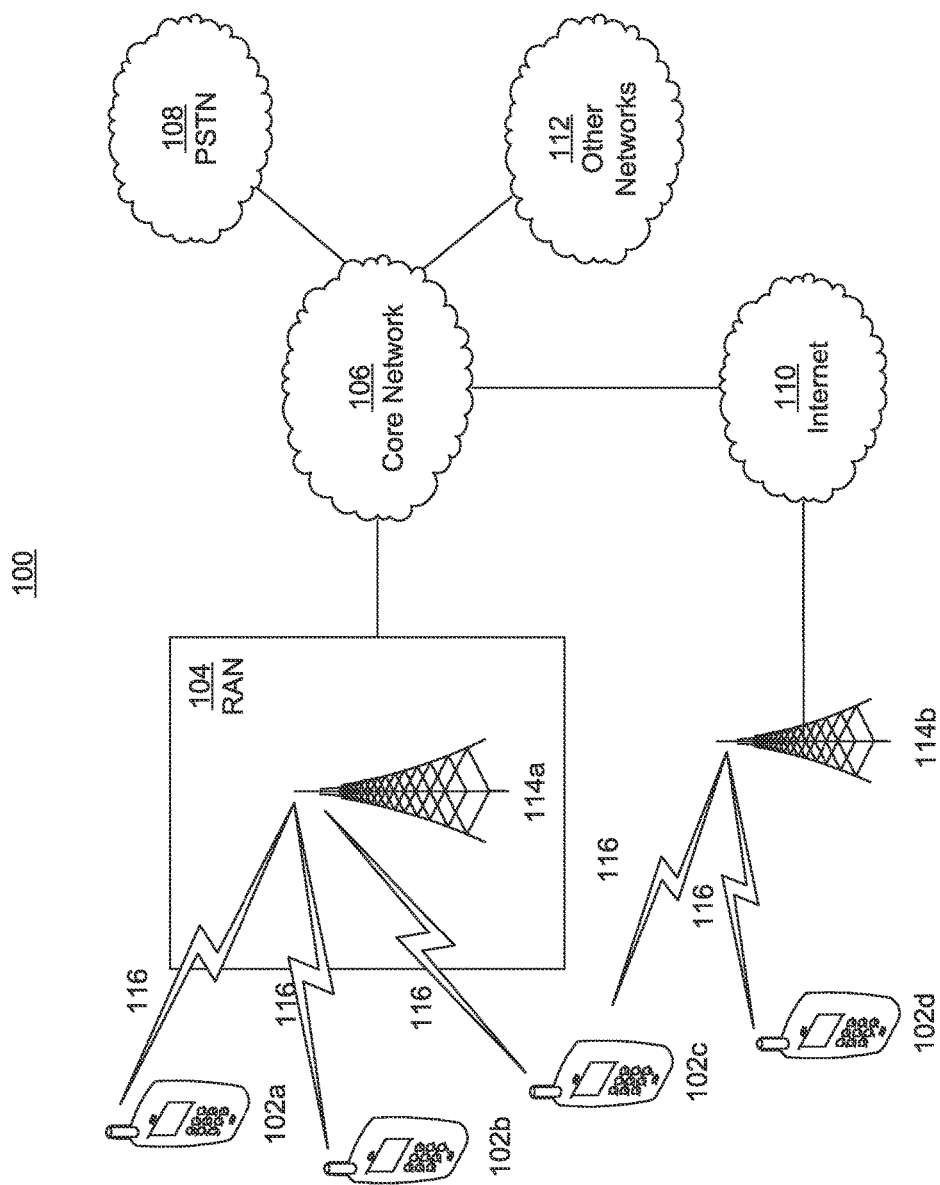
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
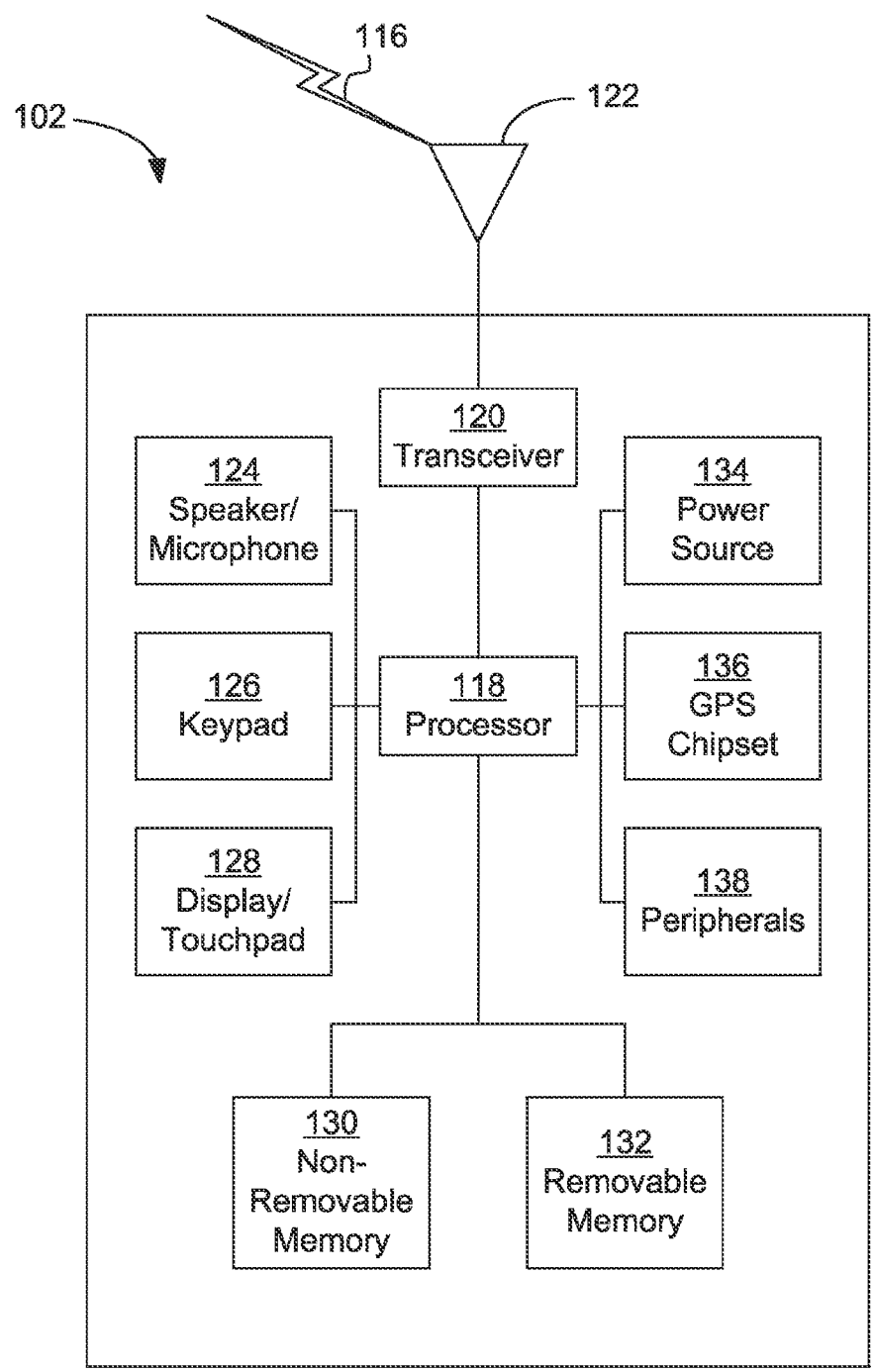
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/ receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
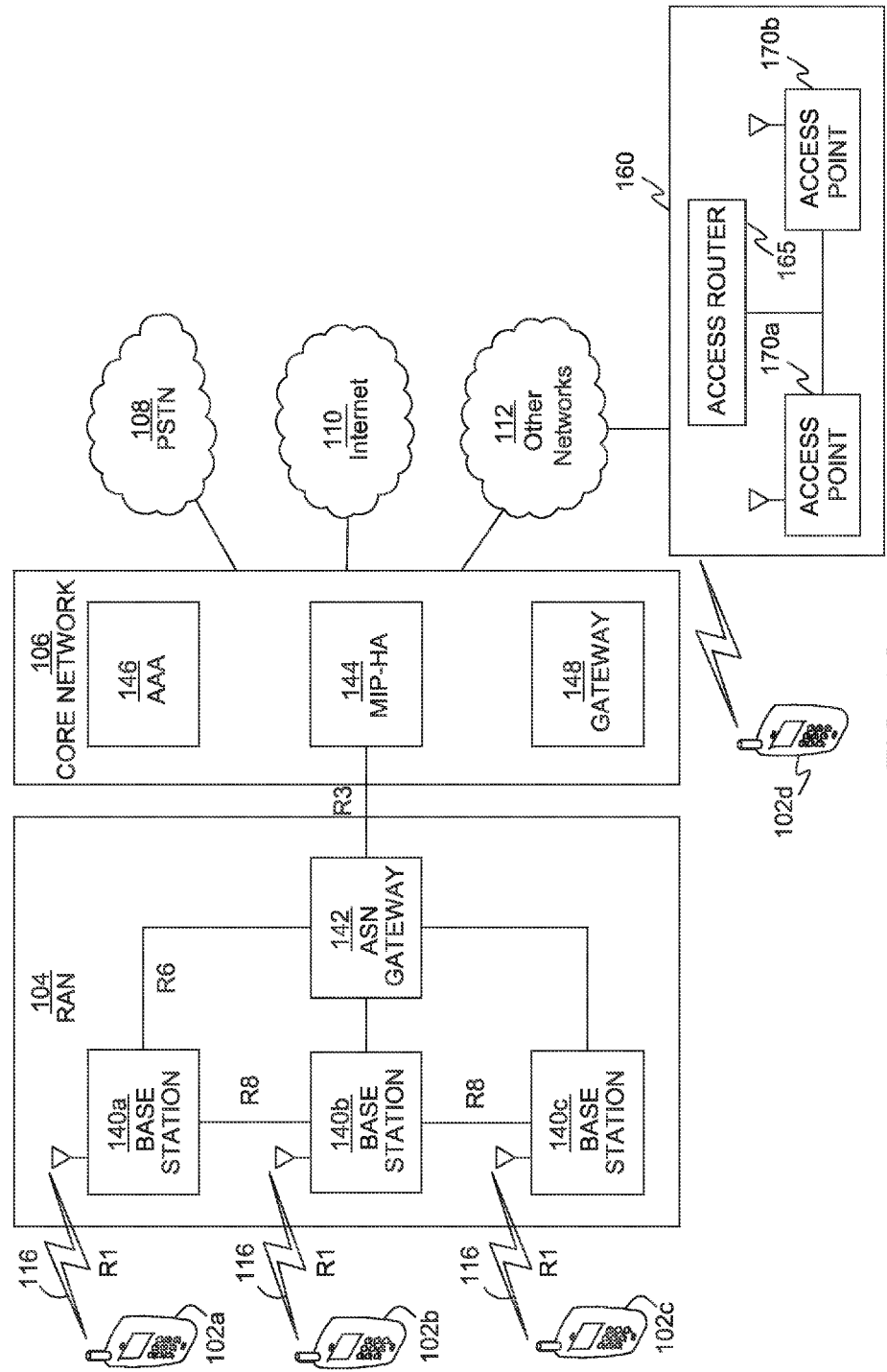
FIG. 1C is a system diagram of an example radio access network and an example core network that may be used within the communications system illustrated in FIG. 1A.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Other networks 112 may further be connected to an IEEE 802.11 based wireless local area network (WLAN) 160. The WLAN 160 shown here may be designed to implement the modified features of the present application. The WLAN 160 may include an access router 165. The access router may contain gateway functionality. The access router 165 may be in communication with a plurality of access points (APs) 170a, 170b. The APs 170a, 170b may be configured to perform the methods described below. The communication between access router 165 and APs 170a, 170b may be via wired Ethernet (IEEE 802.3 standards), or any type of wireless communication protocol. AP 170a is in wireless communication over an air interface with WTRU 102d. WTRU 102 may be an IEEE 802.11 STA, and may also be configured to perform the methods described herein.

Figure 1D:
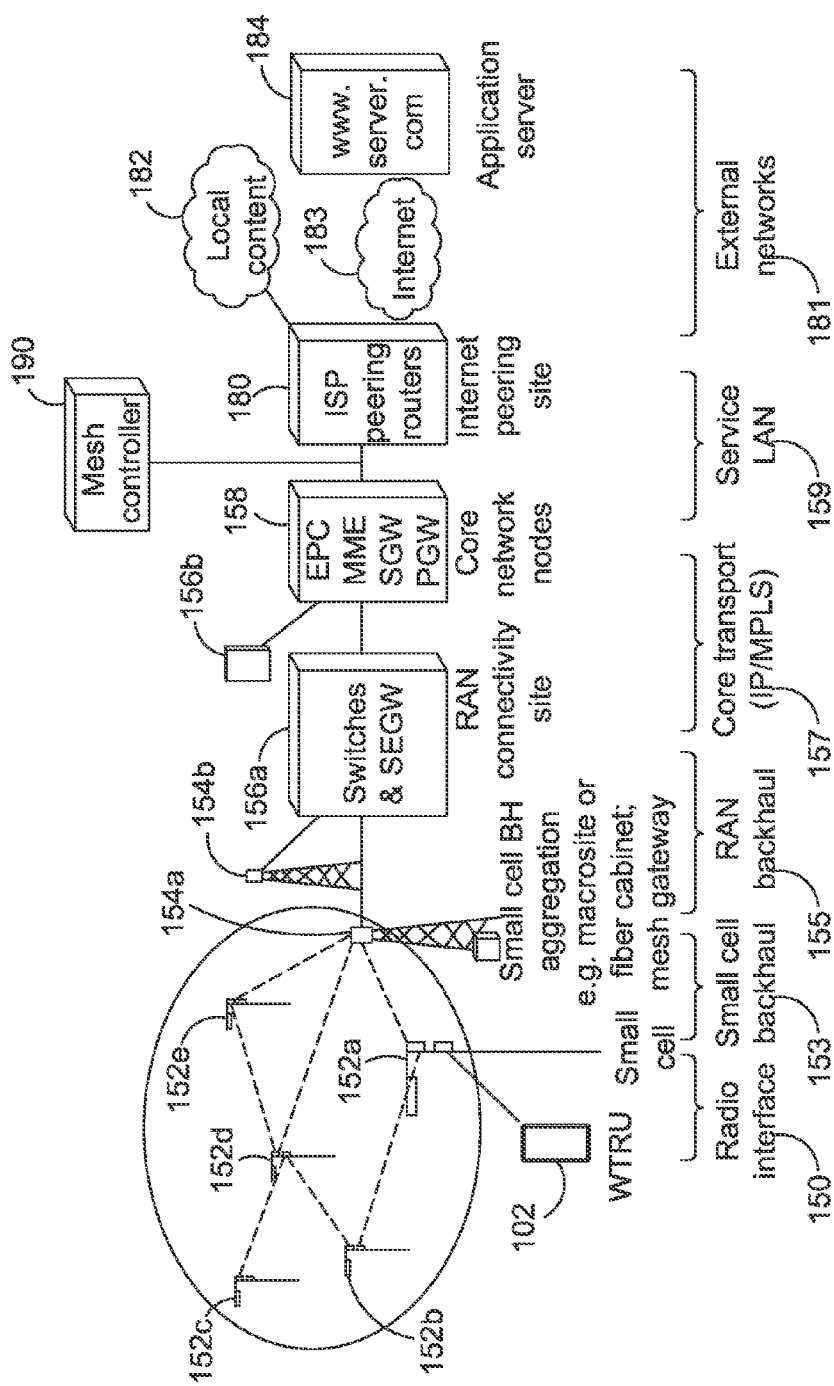
FIG. 1D is a system diagram of an example of a small-cell backhaul in an end-to-end mobile network infrastructure.

FIG. 1D is a diagram of an example of a small-cell backhaul in an end-to-end mobile network infrastructure. A set of small-cell nodes 152a, 152b, 152c, 152d, and 152e and aggregation points 154a and 154b interconnected via directional millimeter wave (mmW) wireless links may comprise a "directional-mesh" network and provide backhaul connectivity. For example, the WTRU 102 may connect via the radio interface 150 to the small-cell backhaul 153 via small-cell 152a and aggregation point 154a. In this example, the aggregation point 154a provides the WTRU 102 access via the RAN backhaul 155 to a RAN connectivity site 156a. The WTRU 102 therefore then has access to the core network nodes 158 via the core transport 157 and to internet service provider (ISP) 180 via the service LAN 159. The WTRU also has access to external networks 181 including but not limited to local content 182, the Internet 183, and application server 184. It should be noted that for purposes of example, the number of small-cell nodes 152 is five; however, any number of nodes 152 may be included in the set of small-cell nodes.

Aggregation point 154a may include a mesh gateway node. A mesh controller 190 may be responsible for the overall mesh network formation and management. The mesh-controller 190 may be placed deep within the mobile operator's core network as it may responsible for only delay insensitive functions. In an embodiment, the data-plane traffic (user data) may not flow through the mesh-controller. The interface to the mesh-controller 190 may be only a control interface used for delay tolerant mesh configuration and management purposes. The data plane traffic may go through the serving gateway (SGW) interface of the core network nodes 158.

The aggregation point 154a, including the mesh gateway, may connect via the RAN backhaul 155 to a RAN connectivity site 156a. The aggregation point 154a, including the mesh gateway, therefore then has access to the core network nodes 158 via the core transport 157, the mesh controller 190 and to ISP 180 via the service LAN 159. The core network nodes 158 may also connect to another RAN connectivity site 156b. The aggregation point 154a, including the mesh gateway, also may connect to external networks 181 including but not limited to local content 182, the Internet 183, and application server 184.

As used herein, control region may refer to a control period and these terms may be used interchangeably. Further, as used herein, scheduling iteration may refer to an scheduling interval (SI) and these terms may be used interchangeably.

Densification of cellular networks may help meet a growing demand for increased capacity, but may also require an increase in backhaul capabilities. The Millimeter Wave Hotspot (mmH) project may use highly directional millimeter (mm) wave (mmW) links between these small-cell nodes to meet backhaul requirements. Unlike other mmW and microwave peer to peer (P2P) systems, the mmH backhaul may comprise a flexible mesh network employing electrically steerable mmW antennas. The electrically steerable antennas may enable low cost, flexible, self-configuring backhaul networks. The wide bandwidths in the mmW spectrum may enable very high data rates. The high directionality of the antennas may imply low interference but also may present challenges to mesh network operation. The proposed mmH system can utilize elements of the current IEEE 802.11ad standard as a baseline for the system design. However, various enhancements and modifications may be preferred beyond what is specified in the standard and several example physical layer (PHY) modifications and other modifications are disclosed herein.

Example PHY modifications are disclosed herein and include the following. Modified modulation and coding sets (MCSs) may enable longer range communications at the minimum required data rate (referred to as a low MCS). A regular periodic superframe structure may enable cellular-like contention free access, long range discovery, and topology formation. Modified beacon and beacon response messages may enable long range discovery with high gain directional antennas on both ends of a link. An SI frame may consist of control slots for exchanges of control messages on a per link basis to negotiate scheduling of data, and data slots (following the control slots) for the scheduled data transmission.

Example signaling to support fast hybrid automatic repeat request (HARQ) is described herein. It may be difficult to achieve the low latency and high throughput requirements over a multi-hop network. To help achieve this, fast re-transmissions with re-transmission combining are introduced. Modified preambles, coding and modulation schemes, and Golay codes are also supported. In many cases, the preambles may be shortened due to the stability of backhaul links and the way in which the links are maintained in the backhaul mesh system.

Modified coding and modulation schemes are introduced to support the modified control and beacon messages (as well as the modified low MCS). Long low-density parity-check codes (LDPCs) may be applicable to backhaul and known to have better performance. In examples, these are disclosed herein for data packets.

The preambles used in the mmW backhaul system may be constructed of Golay sequences similar to IEEE 802.11ad, but may be modified to enable a node to screen out (or fast detect) IEEE 802.11ad transmissions. Furthermore, the system may be configured to use a different set of Golay codes to further mitigate interference between IEEE 802.11ad networks as well as other from other nodes in own or other mm backhaul networks Since highly directional antennas may be used on a limited set of links, the backhaul system may be predominantly noise limited. Therefore, power control may be mainly geared towards limiting the received power to not go much beyond that require by the largest MCS. Initial power control may be conducted during discovery. Because there may be less opportunity for scheduling around interference in control slots, control slot power control may be based on the reliability of the control messages.

The examples disclosed herein capture a PHY design for mmW mesh networks intended to provide small-cell backhaul for dense deployments. The PHY design may be based on the IEEE 802.11 Directional Multi-Gigabit amendment, IEEE 802.11ad. Examples are described that may introduce modifications to the existing specifications to better enable the envisioned directional mesh networks that are likely to be acceptable to the IEEE 802.11 community, but still not impose severe limitation on the overall directional mesh network performance.

The examples disclosed herein provide a preliminary PHY specification that may be capable of supporting the range and data rate requirements of the mmW backhaul system. It also provides a preliminary PHY specification that may be capable of supporting fully scheduled directional mesh networks.

The IEEE 802.11ad standard is used as a baseline for the newly proposed mmH backhaul system design. The required enhancements described herein may be summarized as follows.

A modified beacon period structure may include various enhancements to enable longer discovery and communication range, support mesh formation, and better support contention free access. A modified SI and control period design may be used to maintain mesh links and negotiate data field transmission-reception schedules. A shortened preamble design is in some cases allowable due to the inherent stability of the backhaul links and because each mesh link is maintained by frequent control message exchanges. A modified low MCS design may meet the requirement for longer communication range. In an example, the 802.11ad MCS1 data rate may be higher than is required in many cases. Longer codewords generally may have better performance and be also feasible in backhaul where there are generally larger amounts of data available per packet. A data header for a data packet may require changes but may be of similar size and performance of the 802.11ad SC header. Regarding HARQ and end-to-end latency, the multi-hop mesh network may need to have high reliability and low latency above the media access control (MAC) layer. Greater reliability may be provided through retransmissions, but the latency requirements may leave little latency budget. Retransmission combining may help ensure few re-transmissions are needed.

Modified complementary Golay codes for the backhaul (BH) may minimize interference with the 802.11ad codes already in use in un-coordinated 802.11ad networks and help mitigate interference between nodes of same or other BH network. Finally, due to the inherent low interference likely in the mmW BH, links may be typically noise limited (or error vector magnitude (EVM) limited). Furthermore, transmission and reception directions may be limited to those of a small set of semi-static links. Power control can be mostly limited to cases of receiver max power limits or cases of specific link-link interference, but may still require enhancement to 802.11ad.

The various transmission periods mentioned above may be logically ordered into a superframe. One of the major differences of the modified superframe compared to the unmodified 802.11ad superframe may be the scheduled transmission architecture adopted for the mmH project.

Figure 2:
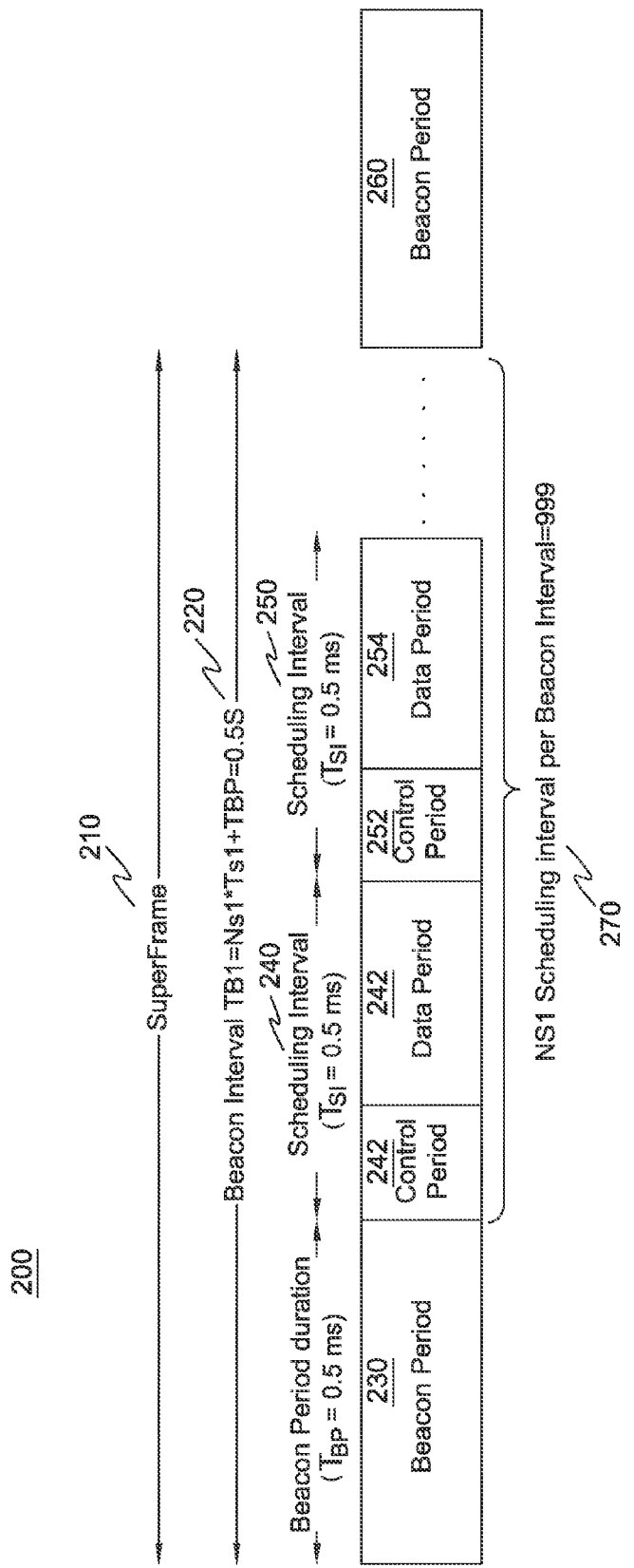
FIG. 2 is a diagram of an example superframe structure.

FIG. 2 is a diagram of an example superframe structure. In an example, the superframe structure 210, including a Beacon Interval 220, may be split into two major components: a Beacon Period 230, which may be used for new node discovery, mesh formation, and other purposes, and an SI 270 which may be used to negotiate the scheduling of data slot resources between connected nodes, and for data packet transactions.

As shown, each SI 240, 250 may be further split into a Control Period 242, 252 and a Data Period, 244, 254. There may be multiple SIs 240, 250 per superframe. Exemplary values for the various superframe timing parameters are listed in Table 1.

TABLE 1

Superframe Timing Parameters

| Parameter | Value |
|---|---|
| $F_C$: SC chip rate | 1760 MHz |
| $T_C$: SC chip time | 0.57 ns = $1/F_C$ |
| $T_{BP}$: Beacon Period duration | 0.5 ms = 880000*$T_C$ |
| $T_{SI}$: Scheduling Interval duration | 0.5 ms = 880000*$T_C$ |
| $N_{SI}$: Max. Number of Scheduling Intervals per Beacon Interval | Configurable [1 . . . 999] |
| $T_{BI}$: Beacon Interval duration (Superframe Duration) | ($T_{BP}$ + $N_{SI}$* $T_{SI}$) = [1.0 ms . . . 0.5 s] |

The Beacon Period 230 may be composed of a beacon followed by possible message exchanges in response to beacon reception. A further Beacon Period 260 may follow Beacon Period 230. The Beacon Period 230 may be used for long range node discovery, node configuration, node admission, and mesh formation. Since the system may intend to make use of very high antenna gains for long range communications and not place a bound on the maximum gain, the discovery procedure may make use of high gain antennas at both the transmitter and the receiver. This may require a modified search algorithm compared to IEEE 802.11ad which does not simultaneously use high gain antennas at transmission (Tx) and reception (Rx).

Figure 3:
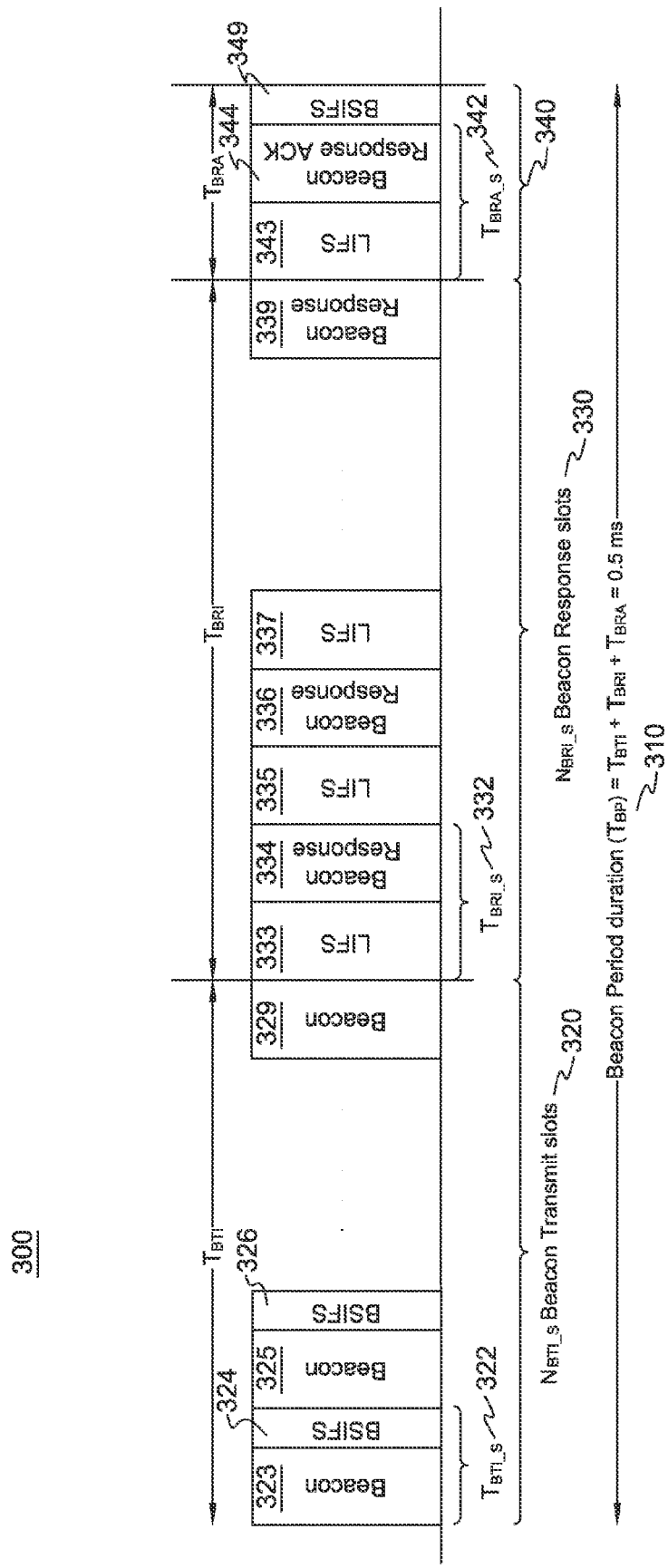
FIG. 3 is a diagram of an example Beacon Period.

FIG. 3 is a diagram of an example Beacon Period. As shown in the transmissions 300, the Beacon Period 310 may be split into three major components: a Beacon Transmission Interval (BTI) 320, a Beacon Response Interval (BRI) 330, and a Beacon Response Acknowledgement (BRA) 340. Each BTI may be split into multiple BTI slots 323, 325, 329 which may each be separated by the Beacon Switch Inter-Frame Spacing (BSIFS) 324, 326 to facilitate antenna beam direction switching between beacon transmissions. The space may be kept short (~500 nSec) since such switching should be achievable. In an example, digital control interfaces and network architectures may need to be created to enable this fast switching, e.g., phase shift values for all phase shifters in the phased array antenna (PAA) could be preloaded in look-up tables (LUTs) and triggered by a fast event trigger. Further, a BTI slot (BTI_S) 322 may contain a BTI slot data (BTI_SD) 323 and a BSIFS 324.

Attached nodes may transmit the beacon message over multiple transmit antenna directions, one direction per BTI_S. The sweep over directions may not be completed in one BTI, but may require multiple BTI's. The antenna gain may not be the maximum gain possible with the used antenna. If the size of the antenna is large compared to that required to discover at the maximum distance, the antenna beam may be widened so that the total sweep time to cover the full sweep range is reduced compared to the maximum gain beam. The search pattern may be determined to cover the full search range with no more than Ksearch dB (e.g., 3 dB for Tx and Rx antennas) loss due to Tx and Rx antenna pointing error with a minimal number of beams. New nodes may listen for beacon message in one particular receive antenna direction for each Beacon Interval.

The BRI 330 may be similarly split into slots 334, 336, 339 and separated by a Long Inter-Frame Spacing (LIFS) 333, 335, 337 to account for a range of propagation delays for the new node response. The node wishing to join the network may respond to only the node that provided the best signal strength over its listening period and may use the Tx beam that is its best estimate of the best beam to use based on the Rx beams it used to listen for the BTI. Further, a BRI slot (BRI_S) 332 may contain an LIFS slot 333 and a BRI slot data (BRI_SD) 334.

The attached node may sweep its 'listening' Rx beam directions in the same order that was used when transmitting in the BTI during the BRI. The new node may have the option to transmit in one or multiple slots for the response message. For the one slot example, the new node may transmit the response in only the slot that corresponds to the attached node's transmit direction that resulted in the best received beacon. The one slot example may be used when the new node estimates that any miss calibration between the Tx and Rx beam directions (at its own PAA and an attached node's PAA) or asymmetry between Tx and Rx beam capabilities would not affect the choice of the best beam of the attached node to respond on.

For the multiple slot example, the new node may transmit the response in multiple slots. This mode may be used when the choice of the best beam to respond on is uncertain (e.g., received signal strength indicators (RSSIs) from multiple directions are within a certain tolerance). In this case, the node may respond on up to three BRI_Ss. For example, the node may respond on BRI_S 332 and two other BRI_Ss.

A final BSIFS 349 at the end of the Beacon Period allows the mesh node to re-orient its beam for the next message transmission. Attached nodes may transmit any beacon acknowledge messages with the best beam estimated from any BRI responses received. The attached node may not transmit a BRA if no BRI messages are correctly decoded. If BRI messages from one or more new nodes are correctly decoded, the attached node may respond for a BRA in the next BRA opportunity to one of the new nodes. If BRIs from multiple new nodes are detected, the beacons may be modified to indicate to new nodes that the expected BRA timing is changed. New nodes may listen for a beacon acknowledge message in the same receive antenna direction used to identify the best beacon.

FIG. 3 shows how the various Beacon Intervals may be further split into Beacon Slots, as described above. Further, a BRA slot (BRA_S) 342 may contain an LIFS slot 343 and a BRA slot data (BRA_SD) 344. The Beacon Intervals may be split into varying number of Beacon slots. In an example, the number of BTI and BRI slots may determine the maximum number of sectors that may be swept through in one Beacon Period.

Figure 4:
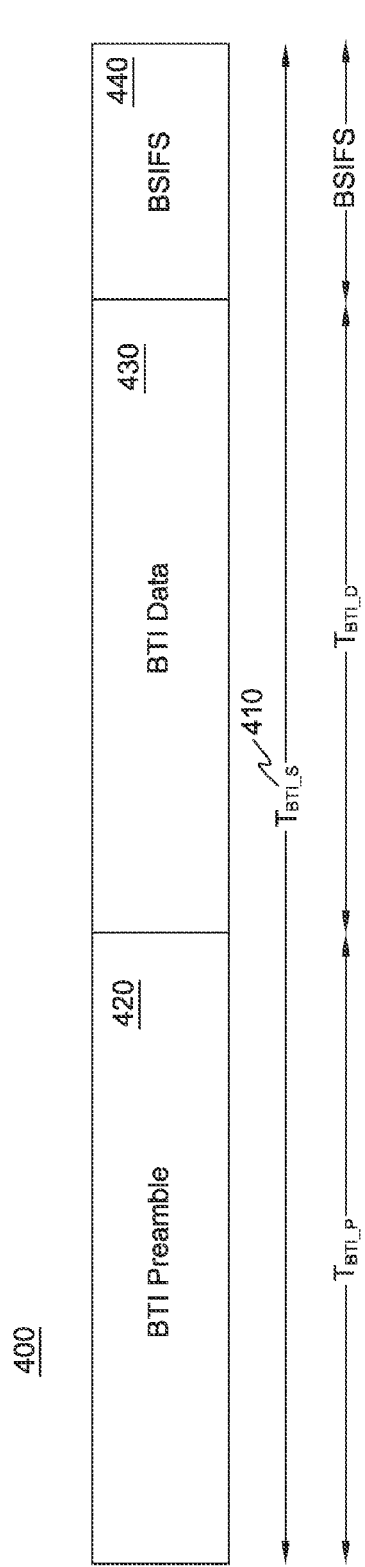
FIG. 4 is a diagram of an example beacon transmission interval (BTI) slot (BTI_S)

FIG. 4 is a diagram of an example BTI_S. In an example, the BTI_S 410 may be split into a BTI preamble section 420, a BTI data section 430, and finally end with a BSIFS section 440. In a further example, the BTI_SD (not shown) may contain the BTI preamble section 420 and the BTI data section 430.

Figure 5:
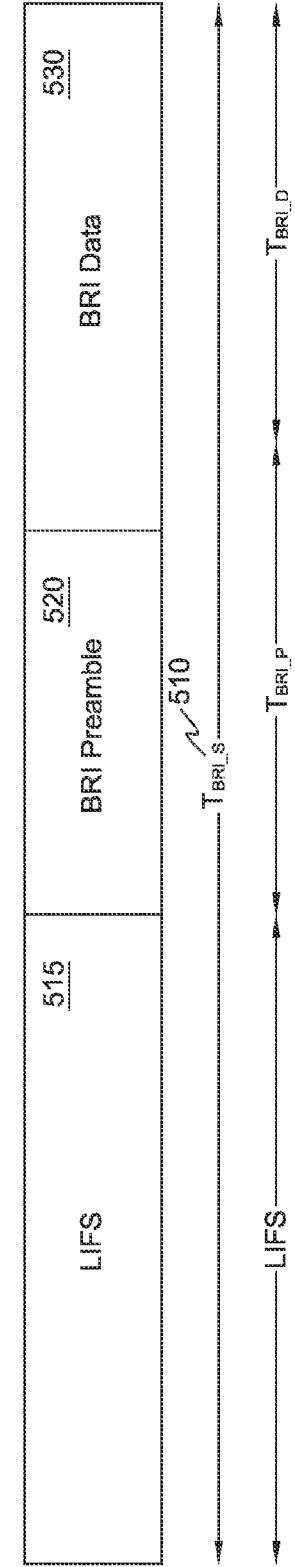
FIG. 5 is a diagram of an example beacon response interval (BRI) slot (BRI_S)

FIG. 5 is a diagram of an example BRI_S. The BRI_S 510 may be similar to the Beacon Transmission slots except that they may lead with the interframe spacing section, LIFS 515. For example, the BRI_S may contain an LIFS 515, a BRI Preamble 520 and BRI Data 530. In a further example, the BRI_SD (not shown) may contain the BRI Preamble 520 and BRI Data 530.

Figure 6:
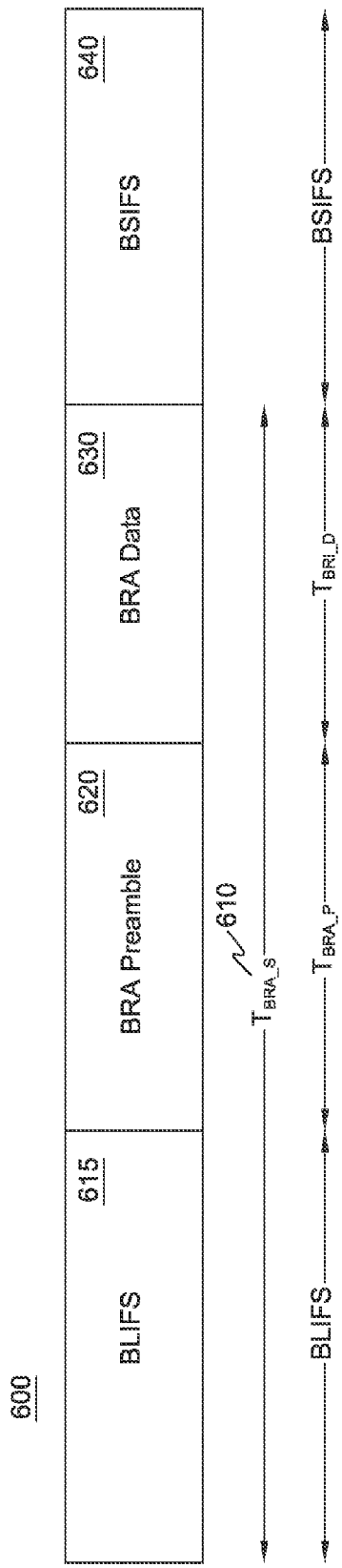
FIG. 6 is a diagram of an example beacon response acknowledgement (BRA) slot (BRA_S)

FIG. 6 is a diagram of an example BRA_S. The BRA_Ss slots may be similar to the BTIs except that they lead with the beacon long interframe spacing section (BLIFS) 615. As an example, the BRA_S may contain a BLIFS 615, a BRA Preamble 620 and a BRA Data 630. In a further example, the BRA_SD (not shown) may contain the BRA Preamble 620 and BRA Data 630. Lastly, the Beacon Period may end with a final interframe spacing, a BSIFS 640 separating the Beacon Period from the SI. Exemplary values for the timing parameters related to FIGS. 3, 4, 5 and 6 are shown in Table 2.

TABLE 2

Beacon Period Timing Parameters

| Parameter | Value |
| --- | --- |
| $N_{BTI\_S} = N_{BRI\_S}$: Number of Beacon Transmission and Beacon Response slots in a Beacon Period | 22 |
| $T_{BTI\_P}$: Duration of Beacon Transmission Preamble | $7552*T_C$ |
| $T_{BTI\_D}$: Duration of Beacon Transmission Data | $7168*T_C$ |
| $T_{BTI\_S}$: Duration of Beacon Transmission Slot | $15744*T_C = T_{BTI\_P} + T_{BTI\_D} + \text{BSIFS}$ |
| $T_{BRI\_P}$: Duration of Beacon Response Preamble | $3328*T_C$ |
| $T_{BRI\_D}$: Duration of Beacon Response Data | $7168*T_C$ |
| $T_{BRI\_S}$: Duration of Beacon Response Slot | $23120*T_C = \text{LIFS} + T_{BRI\_P} + T_{BRI\_D}$ |
| $T_{BRA\_P}$: Duration of Beacon Response Acknowledgement Preamble | $3328*T_C$ |
| $T_{BRA\_D}$: Duration of Beacon Response Acknowledgement Data | $7936*T_C$ |
| $T_{BRA\_S}$: Duration of Beacon Response Acknowledgement Slot | $26016*T_C = \text{BLIFS} + T_{BRA\_P} + T_{BRA\_D} + \text{BSFIS}$ |
| $T_{BTI}$: Duration of Beacon Transmission Interval | $(N_{BTI\_S} * T_{BTI\_S} - \text{BSIFS}) = 345344*T_C$ |
| $T_{BRI}$: Duration of Beacon Response Interval | $(N_{BRI\_S} * T_{BRI\_S}) = 508640*T_C$ |
| $T_{BRA}$: Duration of Beacon Response Acknowledgement Interval | $(T_{BRA\_S} + \text{BSIFS}) = 26016*T_C$ |
| BSIFS: Beam Switch Inter-Frame Spacing | $1024*T_C$ |
| LIFS: Long Inter-Frame Spacing | $12624*T_C$ |
| BLIFS: Long Inter-Frame Spacing | $13728*T_C$ |
| $T_{BP}$: Beacon Period duration | $0.5 \text{ ms} = 880000*T_C$ |

The beacon transmissions in the BTI may be the only messages in the system that may be received without the benefit of some timing information. In this way, the modified short training field (STF) requirements may be similar to that of unmodified 802.11ad. A Start of Packet (SoP) may be detected without benefit of a schedule. Furthermore, there may be no historical reception of packets on which some initial automatic gain control (AGC) or carrier frequency offset (CFO) estimation could be done. However, the IEEE 802.11ad Control PHY (C-PHY) preamble may not be reused since it may allow the new node attempting to join a mesh BH system to waste time receiving IEEE 802.11ad beacons.

Figure 7:
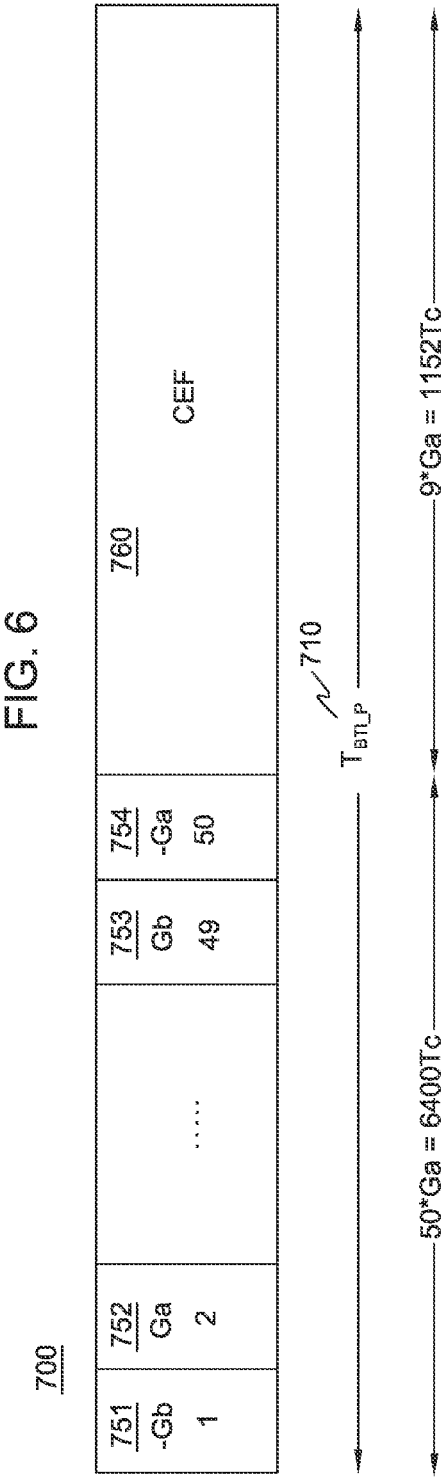
FIG. 7 is a diagram of an example BTI preamble.

FIG. 7 is a diagram of an example BTI preamble. The preamble shown in 700 may use both the Ga 752, 754 and Gb 751, 753 sequences in the STF. The last pair is inverted to mark the end of beacon STF and still use –Ga as the prefix of the channel estimation (CE) field (CEF) 760. The Ga and Gb Golay sequences may also be replaced with other modified Golay sequences with low cross correlations to other Golays used in IEEE 802.11ad as described below. These sequences may also be longer (e.g., 256 bits rather than 128 bits). The specific sequence to use is indicated in the BRA. By modifying the BTI preamble 710 as below, use of the IEEE 802.11ad Golay sequences for Ga and Gb (and other sequences) may remain possible, but selection of modified sequences may be preferable.

Figure 8:
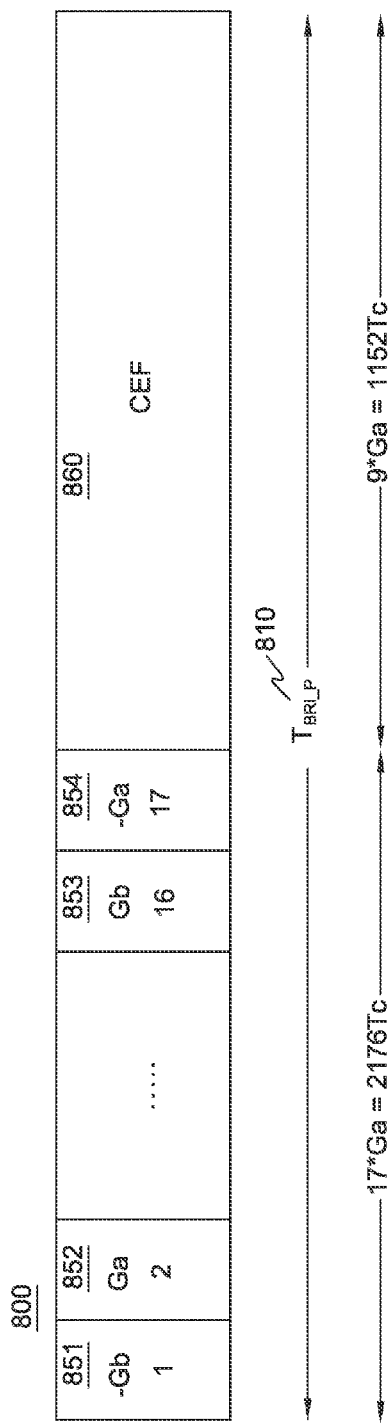
FIG. 8 is a diagram of an example BRI preamble.

FIG. 8 is a diagram of an example BRI preamble. The BRI preamble 800 may use both the Ga 852, 854 and Gb 851, 853 sequences, and may contain a CEF 860. Unlike the beacon transmission messages, the beacon response messages may be received after some timing information has been gained in the BTI. This may allow for a relatively shortened STF period as shown in 800. The BRI preamble duration 810 may have the same duration as one of the 802.11ad preambles, but again may have different structure to permit distinction in the case that 802.11ad sequences are re-used.

Figure 9:
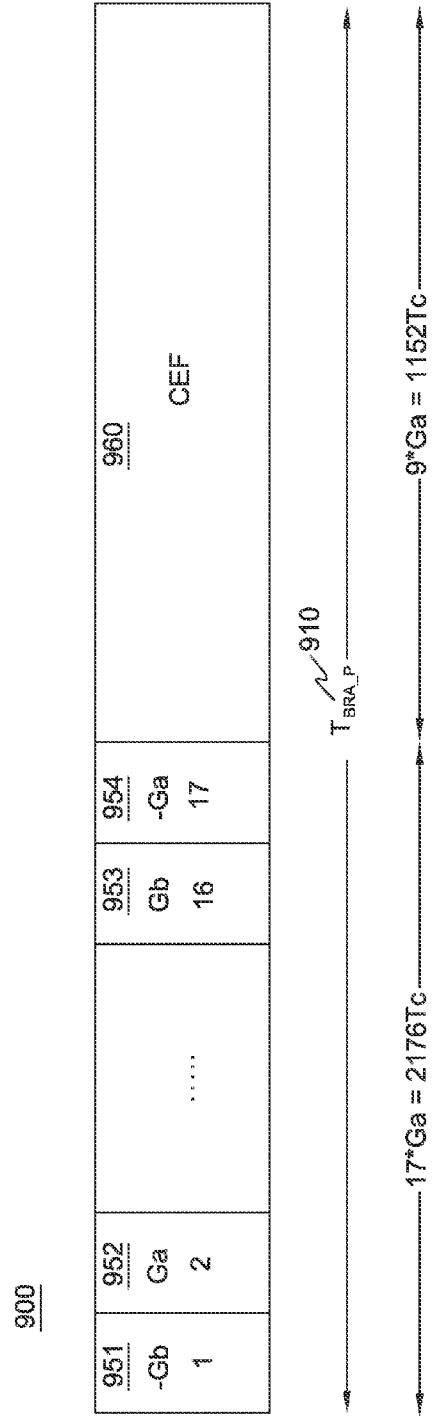
FIG. 9 is a diagram of an example BRA preamble.

FIG. 9 is a diagram of an example BRA preamble. The BRA preamble 900 may use both the Ga 952, 954, and Gb 951, 953 sequences, and may contain a CEF 960. The beacon acknowledge message may use the same preamble as the beacon response messages since it may also have some prior timing information when it is received. In an example, the BTI preamble duration 910 may be the same as the BRA preamble duration 810.

Each beacon period may consist of three beacon message types exchanged between an attached node (A) and new node (B). The BTI message may be transmitted from the attached nodes to the new nodes, (A→B). Elements of the BTI message are described in Table 3. The BRI message may be transmitted from the new nodes to the attached nodes, (B→A). It may use the same Golay sequence set that was received in BTI. Elements of the BRI message are described Table 4. The BRA message may be transmitted from the attached nodes to the new nodes, (A→B). Exemplary elements of the BRA message are described Table 5.

TABLE 3

BTI Message

| Order | Field | Size [Bits] | Description |
|---|---|---|---|
| 1 | Network ID | 16 | Full or partial network ID including operator ID. New node may use this in PLMN selection and filtering |
| 2 | Node ID | 12 | ID of beacon transmitting node within the network. |
| 3 | Sector ID | 8 | ID of the beam being transmitted. Unique within the BTI, but non-unique between BTIs |
| 4 | Max Sectors | 8 | Total number of sectors (or beams) that the beacon transmitting node may transmit to provide coverage over the sweep range |
| 5 | Timestamp | 8 | Full or partial time information of the transmitted message to approx. 64 chip resolution. May be used to measure air propagation time between message exchanging nodes |

TABLE 3-continued

BTI Message

| Order | Field | Size [Bits] | Description |
|---|---|---|---|
| 6 | Beacon Response Offset | 3 | Indicates the next available BRI during which mesh node will listen for new node's Beacon response. The BRI immediately following the current BTI may not be available for new node response reception because it may have been previously reserved for an association procedure with another new node, interference measurement, etc. |
| 7 | BRI use code | 3 | Indicates the purpose for subsequent BRI. Valid codes may include: available for new node beacon response (default), interference measurement, other new node association, etc. |
| 8 | Tx Power Info | 12 | Beacon Tx power, EIRP. Max EIRP |
| 9 | Control slots | 2 | Number of control slots per control period {5, 6, 7, 8} May alternatively go in the BRA |
| 10 | Reserve | 16 | Reserved for future use |
| 11 | FCS | 24 | Frame Check CRC sequence |
|  | Total | 112 |  |

TABLE 4

BRI Message

| Order | Field | Size [Bits] | Description |
|---|---|---|---|
| 1 | New node ID | 48 | MAC address of the responding node. Network may check its database for node capabilities and if node may be admitted. |
| 2 | Additional capability class info | 8 | Configured capabilities not learnable from MAC address |
| 3 | Mesh node ID echo | 12 | Beacon transmitting node's ID is echoed back to ensure that the pair are mutually ID'd. |
| 4 | Timestamp echo | 8 | Beacon transmitting node's Timestamp is echoed back so that air propagation time may be computed. |
| 5 | Gateway Indication | 1 | This may prevent a gateway node from directly connecting to another gateway node. |
| 6 | RSSI | 4 | Power of received beacon |
| 7 | Delta Rx gain | 2 | Difference between Rx gain and Max Rx gain |
| 8 | Reserve | 13 | Reserved for future use |
| 9 | FCS | 16 | Frame Check CRC sequence |
|  | Total | 112 |  |

TABLE 5

BRA Message

| Order | Field | Size [Bits] | Description |
|---|---|---|---|
| 1 | Node ID | 12 | Responding node is given its node ID for this network. A node ID of 0 is not accepted into network. If node is accepted, the following bits are interpreted as: |

TABLE 5-continued

BRA Message

| Order | Field | Size [Bits] | Description |
|---|---|---|---|
| 2 | Rx node ID echo (Hash) | 24 | MAC address of receiving node echoed back to ensure mutual node ID Hash of 48 bit address to 24 bits. Hash function is TBD. |
| 3 | Time Adjust | 8 | Offset to apply when transmitting to this network node |
| 4 | Schedule | 8 | Indicator of control slots the new node should initially listen to in linking to this network node |
| 5 | Channel | 2 | Used to indicate a channel to use for initial schedule message exchange. |
| 6 | Power adjust for control messages | 4 | Power adjust for subsequent control message transmission relative to BRI |
| 7 | Configuration message | 12 | System information and new node configuration data (e.g., Channel Quality Indicator (CQI) table definition) |
| 8 | Initial control slot | 3 | Indicates to new node what control slot to initially use on this link |
| 9 | Reserve | 15 | Reserved for future use |
| 10 | Golay Sequence Indicator | 4 | Specifies a set of Golay sequences to use for Ga and Gb sequences. The Golay Sequence Indicator may indicate what set the new node should use for its subsequent transmissions on this link. |
| 11 | FCS | 24 | Frame Check CRC sequence |
|  | Total | 112 | |

Coding and modulation of the BTI, BRI, and BRA (collectively called the beacon messages) may be similar to C-PHY in 802.11ad, potentially making it easier for a node to monitor/discover 802.11ad and mmW backhaul simultaneously. The Beacon MCS (MCSB) may not need the same level of protection.

The beacon messages may be used during the discovery process before beam refinement has taken place. Therefore, the full gain of the Tx and Rx antennas may not be assumed when estimating the discovery range. The discovery range should be commensurate with the low MCS communications range and an antenna configuration to support that range. An example desired range for the low MCS may be 350 m. The discovery range may be at least this range when the same antenna configuration is used.

The required Rx power to reliably receive the beacon may be determined as well (for instance, −70 dBm). However, there may be some differences in the link budget assumptions. First, there may be an additional loss of about ~6 dB to be added due to beam misalignment. Second, there is no strong need to discover in heavy rain (25 mm/hr), which gives a 3.5 dB benefit. The net result may be a loss of about 2.5 dB relative to the Low MCS. Since there is about an 8 dB difference in performance between the low MCS and MCS0 in 802.11ad, there may be an ~5.5 dB margin if MCS0 is used for the beacon messages. The MCS0 data rate is however comparatively low (~27.5 Mbps), and it may be beneficial to use some of that margin to reduce the beacon message duration. This may be accomplished by modifying the IEEE 802.11ad MCS0. Possible methods may include reducing the spreading factor from 32× to 16×, adding a parallel spreading code with 32× spreading, and using quadrature phase-shift keying (QPSK) modulation with 32× spreading.

While each method has it benefits and drawbacks, in an example, the QPSK based method may be selected so that the effective symbol length of 32Tc may be maintained, more than 3 dB signal to noise ratio (SNR) may be expected to be required and Peak-to-Average Power Ratio (PAPR) may not be degraded much. Parallel spreading may also be attractive. From work on the use of Golay sequences for the use in DS CDMA, it is known that good sets of spreading codes based on complementary Golay sequences exist. A set of 32, 32-chip sequences may be found with very good mutual correlation properties. The set may be selected to also have good correlation properties relative the IEEE 802.11ad Golay codes.

Other possible modifications include a reduction in payload compared to the MCS0 1st LDPC codeword. This may provide some additional margin to either extend the range slightly beyond the new low MCS range or permit wider beams to be used in the discovery process.

Figure 10:
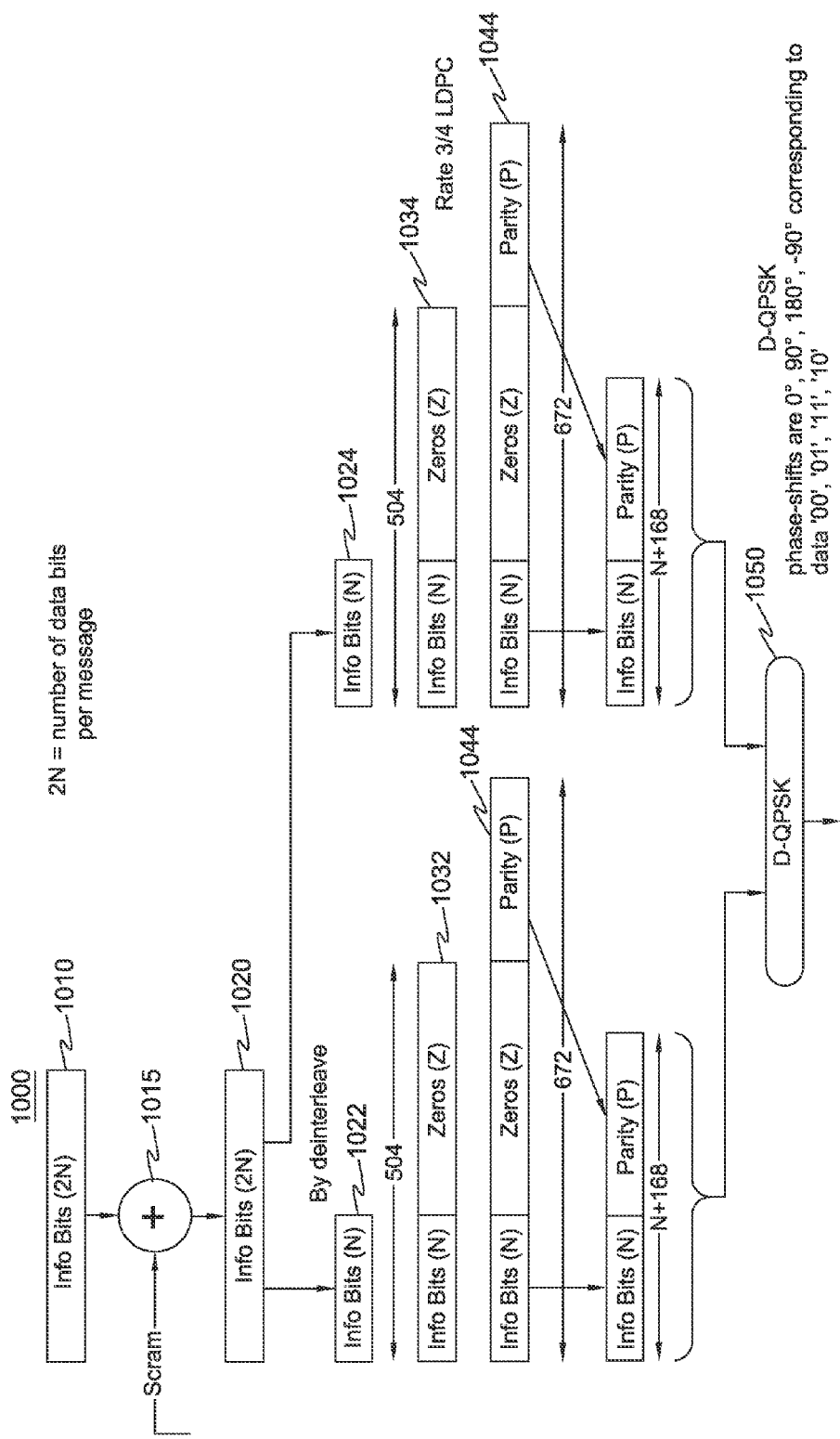
FIG. 10 is a diagram of an example process for coding and modulation for beacon messages.

FIG. 10 is a diagram of an example process for coding and modulation for beacon messages. At the beginning of an example process 1000, the beacon message 1010 may be scrambled 1015 starting with the 5th bit, where the scrambler may be initialized with $\{x1, x2, x3, x4, 1, 1, 1\}$. The result is a sequence b 1020. The scrambled beacon message 1020 may be split into two equal length sequences b1 1022 and b2 1024 of length L. Each sequence b1 1022 and b2 1024 may be padded with zeroes 1032 and zeroes 1034 to a length of 504 total bits. The padded sequences may be coded with the rate ¾ LDPC code to produce the code words $C^m = (b^m_1, \ldots, b^m_L, 0, \ldots, 0, p^m_1, \ldots, p^m_{168})$, $m = \{1, 2\}$, which may include parity (P) bits 1044. The codewords may then have the zeros removed $c^1 = p^1_1, \ldots, b^1_L, p^1_1, \ldots, p^1_{168},)$, $c^2 = (b^2_1, \ldots, b^2_L, p^2_1, \ldots, p^2_{168})$. The two codewords $c^1$ and $c^2$ may be concatenated to create the sequence $c^3 = (c^1, c^2)$. The new sequence, $c^3$, may be grouped into 2-bit symbols to create $c^4_{(k)} = (c^3_{(2k-1)}, c^3_{(2k)})$. The sequence $c^4_{(k)}$ may then be converted into a complex data stream according to the mapping function $$\{c^4(k) \xrightarrow{f} s(k)\}$$

given by the following:

$$'00' \to e^{j\frac{\pi}{4}},$$

$$'01' \to e^{j\frac{3\pi}{4}},$$

$$'11' \to e^{-j\frac{3\pi}{4}},$$

and $$'10' \to e^{-j\frac{\pi}{4}}.$$

The pi/4 differential QPSK modulated signal, d(k), 1050 may then be created as: $d(k) = s(k) \cdot d(k-1)$. In an example, d(0) may be defined to be $e^{j0}$ so that the first symbol $d(1) = s(1)$. The sequence may be spread 1060 using the designated length 32 spreading codes to create:

$$r(k) = G_a((k-1) \bmod 32) d\left(\left\lfloor \frac{(k-1)}{32} \right\rfloor\right). \quad \text{Equation (1)}$$

As stated above, one of the major differences in the mmH architecture compared to the IEEE 802.11ad baseline is the use of a regularly scheduled structure for multiple access as opposed to the contention based and contention free access methods specified for IEEE 802.11ad. Therefore, a modified scheduling period and data transfer period may be required. This is referred to as a SI and may contain both a Control Period and a Data Period.

FIG. 11 is a diagram of an example SI. The Control Period 1120 may be used to negotiate the scheduling of data slot resources between the various connected nodes. During each SI 1110 and for all nodes, a three message exchange may occur between the node and all of its neighbors. The exchange may include buffer status reports, grant requests, grants, channel quality information, Acknowledged (ACK)/Not Acknowledged (NACK) information and other information to assist in scheduling. Since failure to correctly decode control messages may result in no data slot grant/allocation on a particular link as well as loss of link maintenance data, these messages may be provided with extra coding protection relative to regular data transmissions.

The Control Period 1120 may be split into multiple Control Slots, 1121, 1122 through 1129. The Data Period 1130 may be similarly split into multiple Data Slots, 1131 through 1139 that may be allocated to the nodes based on the negotiating procedure defined in the Control period 1120. Various exemplary timing parameters related to the SI are shown in Table 6.

TABLE 6

Scheduling Interval Timing Parameters

| Parameter | Value |
|---|---|
| $N_{CS}$: Number of Control Slots per Control Period | 5 default (configurable to 6, 7, 8) |
| $N_{DS}$: Number of data slots per Data Period | 32 |
| $T_{CP}$: Duration of Control Period | Default 109952*$T_C$ |
| $T_{DP}$: Duration of Data Period | Default 770048*$T_C$ |
| $T_{SI}$: Duration of Scheduling Interval | 880000*$T_C$ = $T_{CP}$ + $T_{DP}$ = 0.5 ms |

Figure 16:
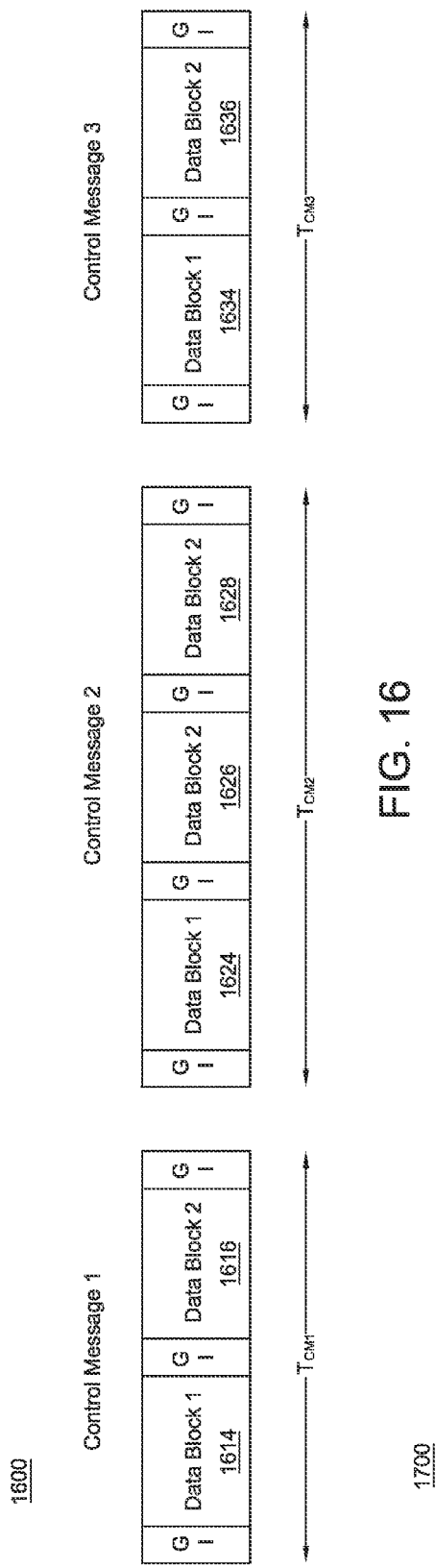
FIG. 16 is a diagram of example control slot messages.

FIG. 12 is a diagram of an example control period structure. In an example each Control Period 1210 may be split into multiple Control Slots, such that each node 1, 2 . . . N in the network may be assigned at least one Control Slot, 1221, 1222 . . . 1229 respectively, for each of its connected neighbors. The Control Slots may be further split into three sections to accommodate a three message exchange sequence. An example of a message exchange sequence is shown in FIG. 16.

Figure 13:
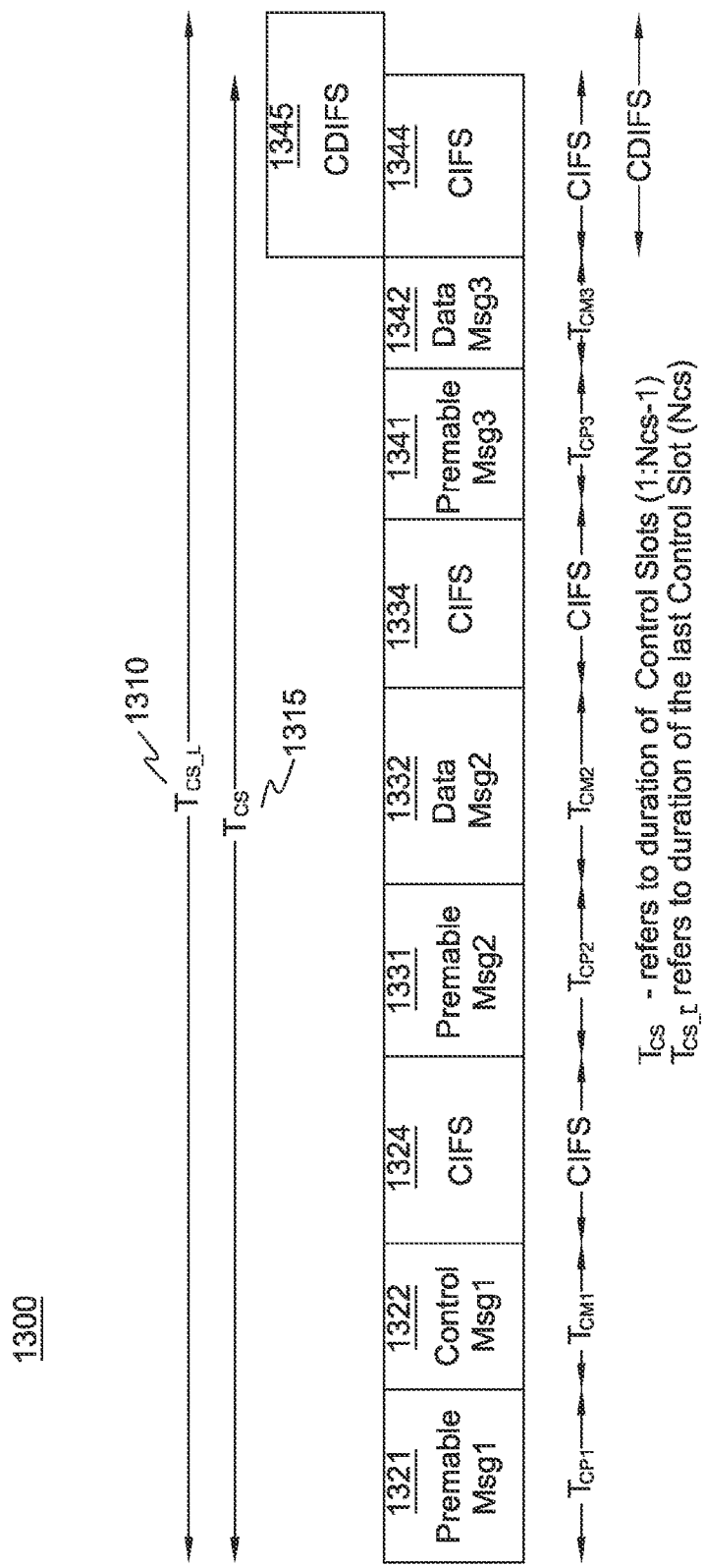
FIG. 13 is a diagram of an example control slot structure.

FIG. 13 is a diagram of an example control slot structure. In an example, each message may include a preamble section for synchronization 1321, 1331, 1341, a data section 1322, 1332, 1342, and an interframe spacing section 1324, 1334, 1344 used to avoid interference due to propagation delays. In an example, a data section 1322 may be a control message. Finally, the figure also shows that the interframe spacing section in the last Control Slot 1345 may be slightly longer than the others which may result in the difference between Duration of Control Slot 1315 and Duration of Last Control Slot 1310. Exemplary timing parameters for the default configuration of Number of Control Slots (NCS=5) are shown in Table 7.

TABLE 7

Default Control Period Timing Parameters

| Parameter | Value |
|---|---|
| $N_{CS}$: Number of Control Slots per Control Period | 5 |
| $T_{CP1}$: Duration of Control Message 1 Preamble | 2304*$T_C$ |
| $T_{CM1}$: Duration of Control Message 1 | 1088*$T_C$ |
| $T_{CP2}$: Duration of Control Message 2 Preamble | 2304*$T_C$ |
| $T_{CM2}$: Duration of Control Message 2 | 1600*$T_C$ |
| $T_{CP3}$: Duration of Control Message 3 Preamble | 640*$T_C$ |
| $T_{CM3}$: Duration of Control Message 3 | 1088*$T_C$ |
| CIFS: Control Message Inter-frame Spacing | 4322*$T_C$ |
| CDIFS: Control Data Inter-frame Spacing | 4324*$T_C$ |
| $T_{CS}$: Duration of Control Slots (1: $N_{CS}$ − 1) | 21990*$T_C$ |
| $T_{CS\_L}$: Duration of Last Control Slot | 21992*$T_C$ |
| $T_{CP}$: Duration of Control Period (See also Table 6) | 109952*$T_C$ = $T_{CS}$ * ($N_{CS}$ − 1) + $T_{CS\_L}$ |

As explained above, three separate messages may be defined in the control period of the SI. The messages may be prepended with a preamble that consists of both an STF and a CEF. One difference from the unmodified 802.11ad packet structure is that there may be no distinction between the header and the data region. The number of SC-PHY data blocks assigned to the control messages may be Ncb(n), where n={1,2,3} to indicate the control message number. Ncb(n) may be system parameters that are either fixed or are carried in the beacon or beacon ACK messages. The major difference, however, has to do with the preamble size, which may be shortened compared to the unmodified 802.11ad preamble size.

In the case of the first two messages the STF may be shortened. Specifically, control message 1 may have a shortened STF. Further, control message 2 may have a shortened STF.

Figure 14:
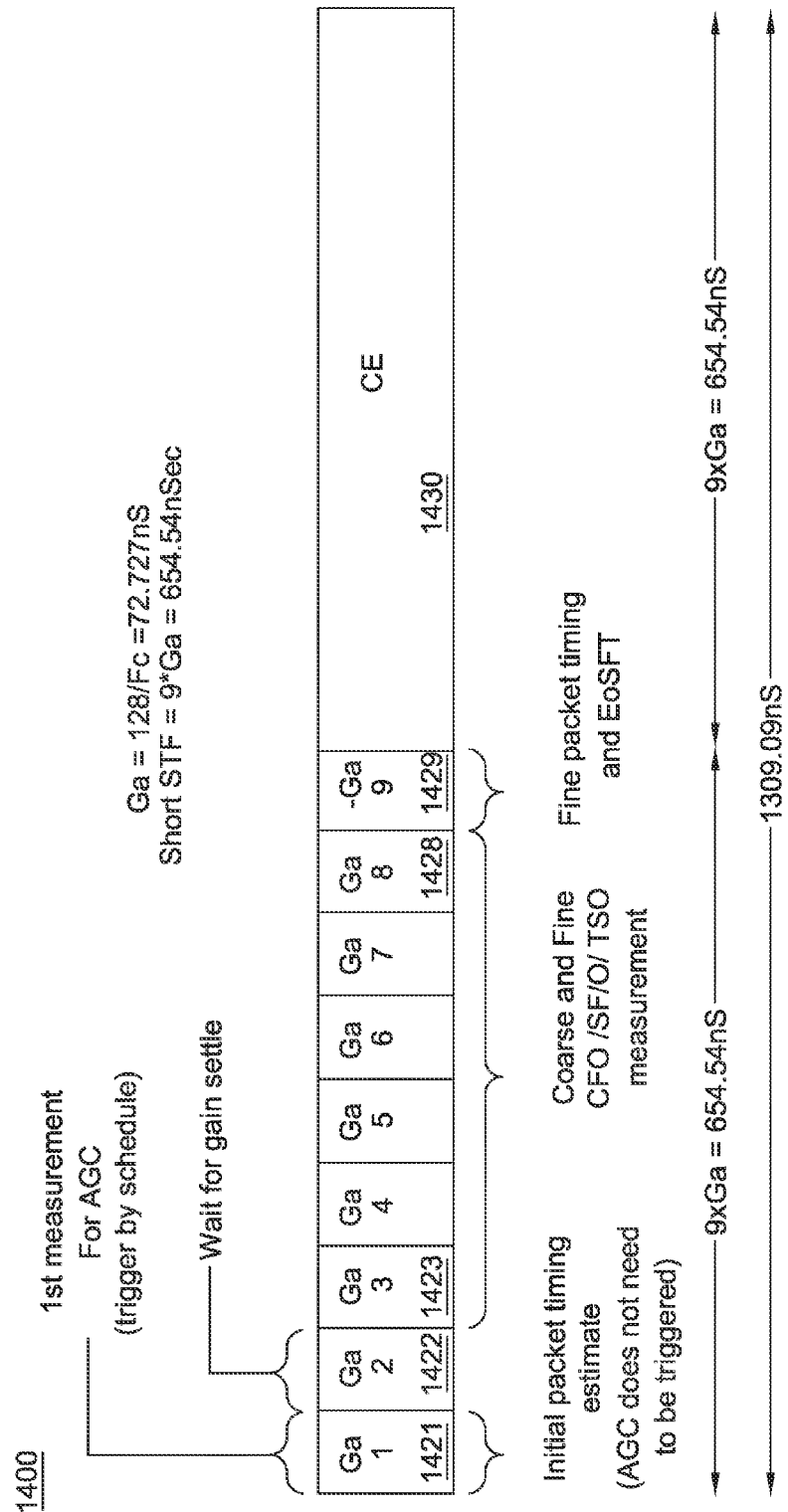
FIG. 14 is a diagram of an example preamble for control messages 1 and 2.

FIG. 14 is a diagram of an example preamble for control messages 1 and 2. The STF may be shortened for control messages 1 and 2, shown as message 1400, for several reasons. In an example, control messages 1 and 2 may be shortened because the SoP detection may not be necessary since the beginning of the message packet, for example, Ga 1 1421, may be scheduled. However, some initial timing information may still be required. The packet may start in parallel to the AGC (i.e., AGC does not need to be triggered by SoP since the schedule can trigger it).

In a second example, control messages 1 and 2 may be shortened and the AGC may not need to start from the beginning. Each link may be used in each backhaul frame (every 0.5 mSec), and backhaul links may be pretty stable, so one AGC cycle may be sufficient. In a further example, there may be a wait for the gain to settle in Ga 2 1422. If the AGC keeps a per-link memory, the initial gain may not need to change much.

In a third example, control messages 1 and 2 may be shortened and clocks may have less time to drift, so per-link CFO/sampling frequency offset (SFO) estimates may be maintained in much the same way as the AGC keeps track of per-link gains. The exact length for CFO/SFO may vary, but may use six Ga sequences, for example Ga 3 1423 though Ga 8 1428 (2 less than Blu Wireless Technology (BWT)) The six Ga sequences may be used in examples and simulations disclosed herein. In a further example, the message may contain the fine packet timing and End of Short training Field (EoSTF) of –Ga 9 1429 which may be followed by the CE field 1430.

Figure 15:
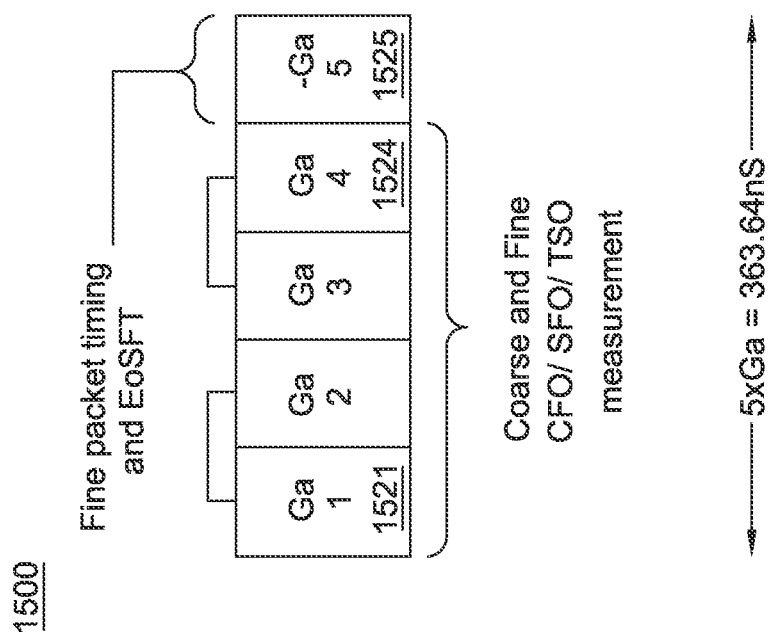
FIG. 15 is a diagram of an example preamble for control message 3.

FIG. 15 is a diagram of an example preamble for control message 3. The example depicts a preamble for control message 3 1500, where the STF may be even further reduced and the CEF may be totally eliminated. This additional shortening may be allowable since message 1 was received a short time ago and the channel estimate, timing, and CFO are still good. However, some fine timing, CFO, and time offset/phase correction may still be needed due to Tx/Rx switching, for example Ga 1 1521 through Ga 4 1524, hence the inclusion of 5 Ga sequences for the preamble which may further include the fine packet timing and EoSTF –Ga 5 1525.

Each node in the mesh network may be assigned at least one control slot for each of its connected neighbors. Each such link defined between a pair of neighbors may also be assigned an initial direction for control message exchanges, for example, node A transmits to node B first.

FIG. 16 is a diagram of example control slot messages. The example control slot messages 1600 may be transmitted in sequence. At a high level the control slot messages may be as follows.

For control message 1 (A→B), Node A may request grant of data slots to use for a transmission to Node B. Node A may acknowledge the reception of data from Node B in the previous SI. The example control message 1 shown in FIG. 16 may be spread over two data blocks 1614 and 1616 based on Table 15, and may be configurable as described in Table 15. The data blocks 1614 and 1616 may be surrounded by Guard Intervals (GIs).

For control message 2 (B→A) Node B may request grant of data slots to use for a transmission to Node A. Node B may acknowledge the reception of data from Node A in the previous SI. Node B may grant resources to Node A based on the request from message 1. The example control message 2 shown in FIG. 16 may be spread over three data blocks 1624, 1626 and 1628 based on Table 15, and may be configurable as described in Table 15. The data blocks 1624, 1626 and 1628 may be surrounded by GIs.

For control message 3 (A→B), Node A may grant resources to Node B based on the request from message 2. The example control message 3 shown in FIG. 16 may be spread over two data blocks 1634 and 1636 based on Table 15, and may be configured as described in Table 15. The data blocks 1634 and 1636 may be surrounded by GIs.

The exemplary detailed message contents and the corresponding bitmaps are shown in Table 8, Table 9, and Table 10 for both high compression and minimal compression options. Compression may refer to use of a compact notation that may limit the range of values that a signal may indicate. If, for example, an error is detected in a message that carries grant request information (e.g., message 1 and message 2 carry Buffer Status Reports (BSRs), etc.) then a grant in the following message may not be made and an indication of the frame check sequence (FCS) error may be included in the responding messages. An error in decoding message 1 or 2 may be signaled by sending all 1's in the Grant field (an invalid Grant field) in message 2 or 3, respectively.

TABLE 8

Control Slot Message 1 (A → B)

| Field | Minimal Compression Size [Bits] | Description |
|---|---|---|
| BSR | 13 (Using a LUT for 3 QoS queues 0-32) | This is a resource request from A to B. It may be signaled as a combination of requested data slots and MCS/CQI where the last known good CQI indicates the approx. number of bits per data slot (a default value may be used if there is no last known good CQI). Resources may not be requested for data that is expected to be transmitted in semi-statically scheduled resources. Note: For High Compression mode the available slot length may also be added. |
| MCS/CQI | 4 | Estimate of the channel quality from Node B to Node A, and may be signaled in terms of a requested MCS level. Note: MCS levels >12 may be reserved for indication of special purpose messages. |
| Tx Bitmap | 32 | Indication of available data slots for Node A to transmit to Node B. Each bit may refer to a data slot. Note: For High Compression mode this information is conveyed in the BSR. |
| ACK | 2 or 9 | Node A may acknowledge successful reception of data packets from B in the previous scheduling interval. Option 1 (default): [2 bits]   1-bit acknowledge for entire MAC   Protocol Data Unit (MPDU)   1-bit acknowledge for persistent   traffic PHY Protocol Data Unit   (PPDU) Option 2: [9 bits]   8-bit acknowledgement.     1-bit per PPDU, given maximum     of 8 MPDUs per PPDU.   1-bit acknowledge for persistent   traffic PHY Protocol Data Unit   (PPDU) |
| FCS | 12 | Frame Check CRC sequence |
| Total | 63 or 70 | |

TABLE 9

Control Slot Message 2 (B → A)

| Field | Minimal Compression Size [Bits] | Description |
|---|---|---|
| BSR | 13 (Using a LUT for 3 QoS queues 0-32) | This is a resource request from B to A. It may be signaled as a combination of requested data slots and MCS/CQI. Note: For High Compression mode the available slot length is also added. |
| Tx Bitmap | 32 | Indication of available data slots for Node B to transmit to Node A. Each bit refers to a data slot. Note: For High Compression mode this information may be conveyed in the BSR. |
| ACK | 2 or 9 | Node B may acknowledge successful reception of data packets from A in the previous scheduling interval. Option 1: [2 bits]   1-bit acknowledge for entire   MAC Protocol Data Unit (MPDU)   1-bit acknowledge for persistent   traffic PHY Protocol Data Unit   (PPDU) |

TABLE 9-continued

Control Slot Message 2 (B → A)

| Field | Minimal Compression Size [Bits] | Description |
|---|---|---|
| | | Option 2: [9 bits]<br>8-bit acknowledgement.<br>  1-bit per PPDU, given maximum of 8 MPDUs per PPDU<br>  1-bit acknowledge for persistent traffic PHY Protocol Data Unit (PPDU) |
| Grant | 32 | Node B may grant data transmission slots to Node A based on its request and constraints due to previous allocations to other nodes.<br>Minimal Compression Mode<br>  Grant bitmap<br>High Compression Mode<br>  Grant Start + Grant Length |
| MCS/CQI | 4 | Estimate of the channel quality from Node A to Node B and may be signaled in terms of a requested MCS level.<br>Note: MCS levels >12 may be reserved for indication of special purpose messages. |
| FCS | 12 | Frame Check CRC sequence |
| Total | 100 or 107 | |

TABLE 10

Control Slot Message 3 (A → B)

| Field | Minimal Compression Size [Bits] | Description |
|---|---|---|
| Grant | 32 | Node A may grant data transmission slots to Node B based on its request and constraints due to previous allocations to other nodes.<br>Minimal Compression Mode<br>  Grant bitmap<br>High Compression Mode<br>  Grant Start + Grant Length |
| FCS | 12 | Frame Check CRC sequence |
| Total | 44 | |

A Control Period does not exist in the current IEEE 802.11ad standard. Therefore, a modified coding method may be required for the messages shown above. In an example, the coding method correlates well with the 802.11ad baseline and at the same time meet the requirements of the modified control messages. For example, given the varying sizes for the three control messages along with the relatively high level of protection required, the coding method may support a varying number of payload bits and code rates. The coding method also supports message repetition over a certain number of data blocks as well as message splitting across data blocks, which provides additional examples for payload protection other than relying only on code rate choice. Exemplary parameters that relate to the various coding options are shown in Table 11.

TABLE 11

Coding Parameters

| Parameter | Value | Description |
|---|---|---|
| Nmp | 1-322 | Number of message payload bits |
| Nrep | 1-inf | Number of additional data blocks used when using message repetition. |
| Nmf | 1-322 | Number of message fragments used when using message splitting. |
| Nmfp | 1-322 | Number of message fragment payload bits in a particular message fragment. |
| R | [½, ⅝, ¾, 13/16] | LDPC mother code rate. |
| PuncMode | {MinZeroPad, MinCodeRate} | For a given Nmfp and choice of R, the PuncMode is given.<br>Note: This allows proper rate matching to bring the 672 bits from the LDPC encoder into the 448 bits available per data block. |
| Nmfp_max | Default is 110, but can go as much as 322 | Maximum number of message fragment payload bits. |

Both message splitting and message repetition may be used to offer more protection as mentioned above, however message splitting may be further required when $\{Nmp > Nmfp\_max\}$. For example, if $\{Nmp > Nmfp\_max\}$, the message may be split into Nmf message fragments, where $$Nmf = \left\lceil \frac{Nmp}{Mmfp\_max} \right\rceil, \quad \text{Equation (2)}$$

and each message fragment of Nmfp bits may be coded separately, where $$Nmfp(x) = \left\lfloor \frac{Nmp}{Nmf} \right\rfloor + \alpha, \quad \text{Equation (3)}$$

$$\alpha = \begin{cases} 1, & x = 1: \left[ \left(\frac{Nmp}{Nmf}\right) - \left(\left\lfloor \frac{Nmp}{Nmf} \right\rfloor\right) \right] Nmf \\ 0, & x = Nmf \end{cases}, \quad \text{Equation (4)}$$

and $$x = 1: Nmf. \quad \text{Equation (5)}$$

For the case of $\{Nmp \leq Nmfp\_max\}$, Nmf=1.

Repetition, as stated, may be configured independently based on the desire to add protection for the payload bits. For Nrep>0, the additional data blocks may be constructed by creating another version of the codeword with different puncturing and inverting data blocks with odd repetition numbers, and concatenating them. In this sense, the rate matching block may produce two versions of the rate matched codeword that the repetition block may alternate between.

Finally, for a given number of message fragment payload bits (Nmfp), different choices of R may be available with a corresponding puncturing mode. Representative options for each message fragment are given in Table 12.

TABLE 12

LDPC Code Rate and Puncture Mode Option per Message Fragment Size

| min (Nmfp) | max (Nmfp) | LDPC Code Rate [R] | | | |
|---|---|---|---|---|---|
| | | ½ | ⅝ | ¾ | 13/16 |
| 1 | 56 | MinZeroPad | MinZeroPad | NA | NA |
| 57 | 98 | MinCodeRate | MinZeroPad | MinZeroPad | NA |
| 99 | 112 | MinCodeRate | MinCodeRate | MinZeroPad | MinZeroPad |
| 113 | 140 | NA | MinCodeRate | MinZeroPad | MinZeroPad |
| 141 | 161 | NA | MinCodeRate | MinCodeRate | MinZeroPad |
| 162 | 280 | NA | MinCodeRate | MinCodeRate | MinCodeRate |
| 281 | 322 | NA | NA | MinCodeRate | MinCodeRate |

As shown in Table 12, certain exemplary combinations of message fragment size and code rate may be supported by a given puncture mode. The main properties of each of the puncturing modes may be as follows.

For the MinZeroPad, each 448-bit code block may be split into two 224-bit parts. The systematic bits may be repeated twice, once in each half of the 448-bit code block. Some of the parity bits may be repeated depending on the number of systematic bits being used. The number of parity bits repeated may be as many as all and as little as none. In order to obtain greater diversity in the repeated parity bits assuming that Nrep>0, a puncture offset parameter, PO, may be defined such that a different combination of parity bits may be repeated for each repeated code block.

For the MinCodeRate, the 448-bit code blocks may not be split as in the MinZeroPad method. The parity bits may not be repeated. Some of the systematic bits may be repeated depending on the number of parity bits being used. The number of systematic bits repeated may be as many as all and as little as none. In order to obtain greater diversity in the repeated systematic bits assuming that Nrep>0, even numbered data blocks may repeat the systematic bits starting at the beginning of the message and odd numbered data blocks may repeat the systematic bits starting at the end of the message.

Although exemplary minimum and maximum message fragment sizes may be extracted from Table 12, a more direct mapping of the representative size range for each puncturing mode is shown in Table 13.

TABLE 13

Minimum and Maximum Message Fragment Sizes

| LDPC Code Rate | MinZeroPad | | MinCodeRate | |
|---|---|---|---|---|
| | Min message size | Max message size | Min message size | Max message size |
| ½ | 0 | 56 | 56 | 112 |
| ⅝ | 0 | 98 | 98 | 196 |
| ¾ | 56 | 140 | 140 | 280 |
| 13/16 | 98 | 161 | 161 | 322 |

Figure 17:
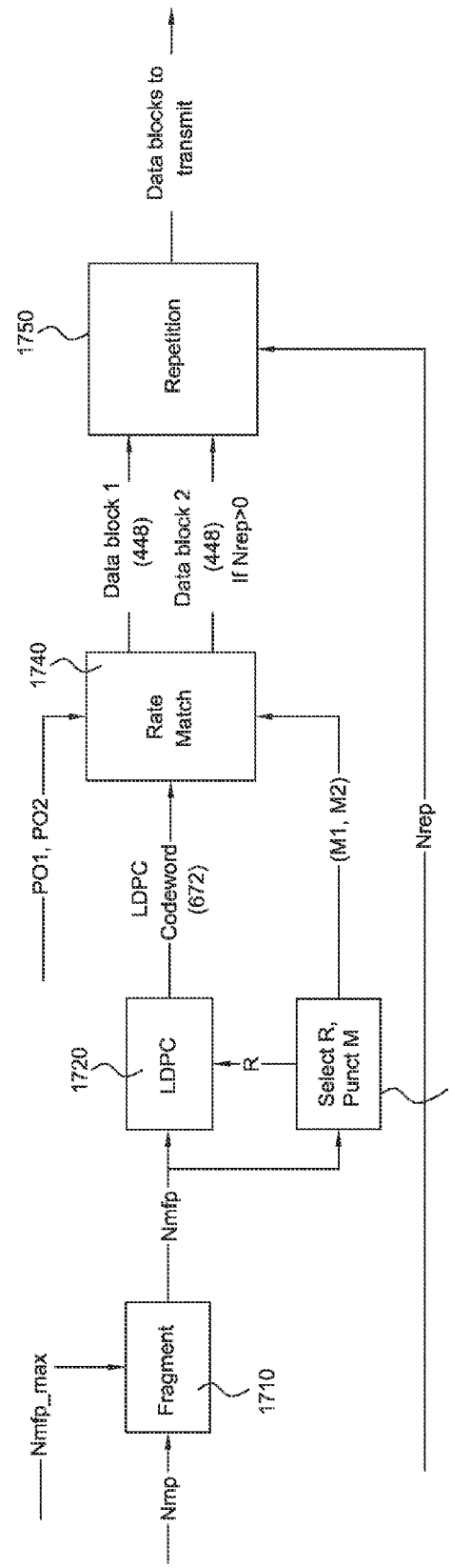
FIG. 17 is a diagram of an example high level message processing block diagram.

FIG. 17 is a diagram of an example high level message processing block diagram. In the example, the message is first fragmented 1710. Then the Nmfp may be processed 1720 to create the LDPC codeword. The code rate and puncture mode may also be determined in 1730. Based upon the determined code rate and puncture mode, the LDPC processed message fragments may be rate matched 1740. The output of which may be processed through a repetition step 1750. This may result in the data blocks to be transmitted.

Figure 18A:
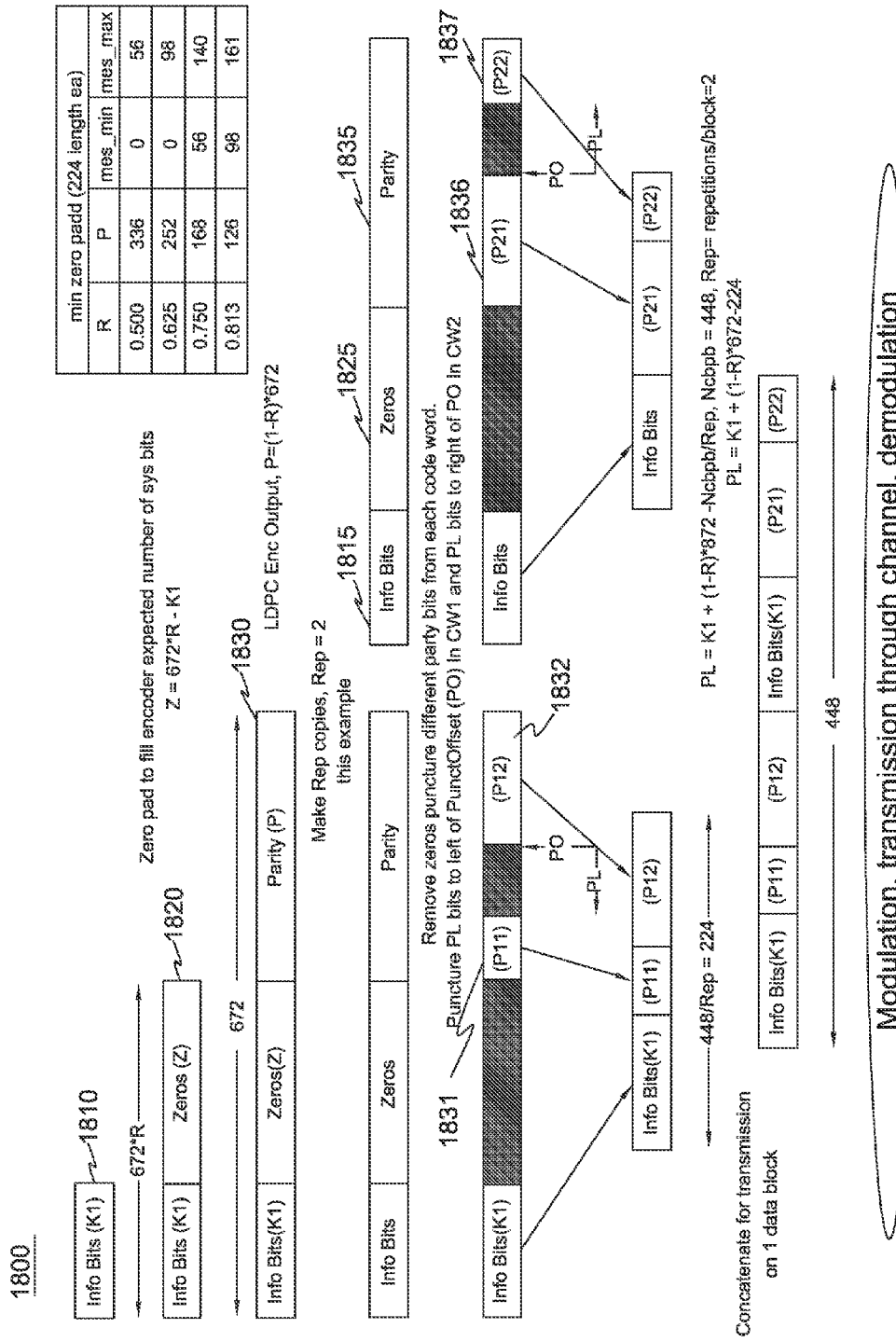
FIG. 18A is a diagram of an example of encoding for control messages using MinZeroPad.

FIG. 18A is a diagram of an example of encoding for control messages using MinZeroPad. Coding may be done on a per message fragment basis. The message fragments 1810 may first be encoded into the PHY bits of one single carrier (SC) block with $N_{GI}$ symbols. The number of PHY bits in a SC block $N_{CBPB}$ may depend on the modulation type, and exemplary values are shown in Table 14. The number of SC blocks used for the entire transmission may be $1+N_{rep}(n)$ for message n. The bits may be scrambled and encoded as follows.

The input message bits including the FCS bits ($b_1, b_2, \ldots, b_{N_{mfp}}$), where $N_{mfp}$ is the payload of the message fragment being processed, may be scrambled as described below and illustrated in FIG. 20 with the initialization vector (IV) given, starting from the first bit, to create $d_{1s}=(q_1, q_2, \ldots q_{N_{mfp}})$. The LDPC codeword $c=(q_1, q_2, \ldots, q_{N_{mfp}}, 0_1, 0_2, \ldots, 0_Z, p_1, p_2, p_{N_p})$ may be created by concatenating Z zeroes 1820 to the $N_{mfp}$ bits of $d_{1S}$ and then generating the parity bits 1830 $p_1, p_2, p_{N_p}$ such that $Hc^T=0$, where H is the parity check matrix for the rate R LDPC code specified in IEEE 802.11ad. Note that $Z=672R-N_{mfp}$ and $N_p=672(1-R)$. Parity bits 1831, 1832, 1835, 1836 and 1837 may also be used.

In an example, a code rate ½ may be used for two repetitions (Rep=2) for K1=1-56. In a further example, code rate ½ may also be used for one repetition (Rep=1) for K1=56-122, but a higher rate may also be used per Table 13 and the table in FIG. 18A. In an example, information bits K1 may all be repeated. Further parity bits may be preferentially punctured by placing the Puncture Offset (PO) to the right of the center of each codeword (CW). In FIG. 18A, P11 1831 may be a subset of P21 1836 and P22 1837 may be a subset of P12 1832. As a result, P11 1831 and P22 1837 may be repeated bits. Although not illustrated in FIG. 18A and FIG. 18B, below, data scrambling, repetition scrambling and fragment concatenation may apply to the encoding.

The Information Bits 1815 may be preserved whereas the zeroes 1825 may be removed. Bits $N_{mfp}+1$ through 672R and the parity bits P0-PL through P0-1 of the codeword c may be removed to create the sequence $cs1=(q_1, q_2, \ldots, q_{N_{mfp}}, p_1, p_2, \ldots, p_{P0-PL-1}, p_{P0}, \ldots, p_{N_p})$ and then XORed with a pseudo-random noise (PN) sequence that is generated from the linear feedback shift register (LFSR) used for data scrambling defined in IEEE 802.11ad. The LFSR may be initialized to the all ones vector. Bits $N_{mfp}+1$ through 672R and the parity bits P0 through P0+PL-1 of the codeword c may be removed to create the sequence $cs2=(q_1, q_2, \ldots, q_{N_{mfp}}, p_1, p_2, \ldots, p_{Po-1}, p_{P0+PL}, p_{P0+PL+1}, \ldots, p_{N_p})$. Note that $$L = N_{mfp} + 672(1-R) - \frac{N_{CBPB}}{2}$$

and $$\left|P0 - \frac{N_P}{2}\right| + PL < \frac{N_P}{2}$$

may be satisfied.

The sequences cs1 and cs2 may be concatenated to form the sequence (cs1, cs2). The resulting $N_{CBPB}$ bits may then be mapped as π/2-BPSK as described in IEEE 802.11ad. The $N_{GI}$ guard symbols may then be prepended to the resulting $N_{CBPB}$ bits as described in IEEE 802.11ad. The results of the encoding may then be modulated and transmitted through the channel.

Figure 18B:
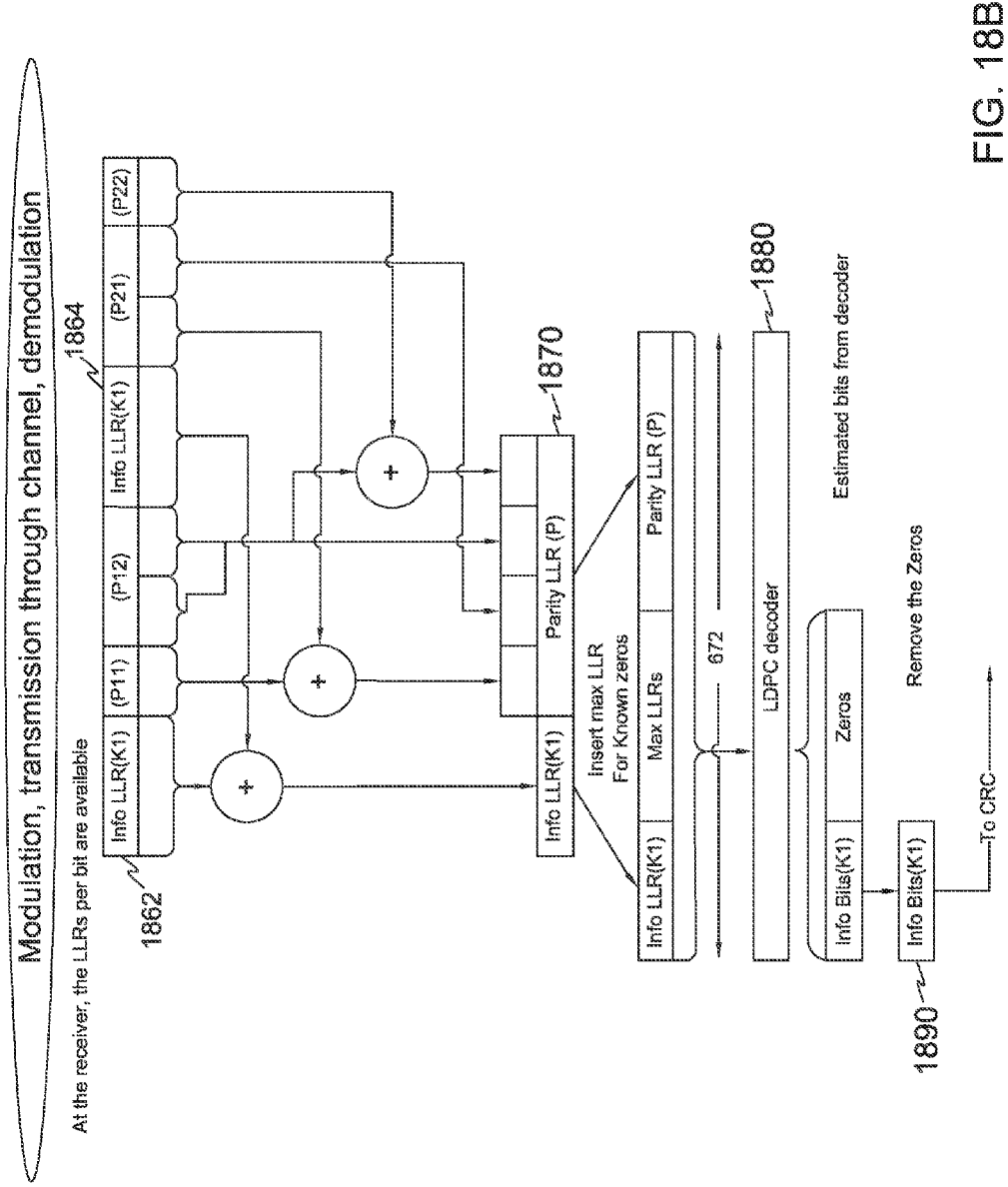
FIG. 18B is a diagram of an example of decoding for control messages using MinZeroPad.

FIG. 18B is a diagram of an example of decoding for control messages using MinZeroPad. In an example, the process is effectively the reserve of the encoding process. Demodulation of the transmission results in a sequence which may contain a number of copies of information bits and punctured parity bit which corresponds to the number of repetitions performed in the encoding process. In an example, two information messages 1862 and 1864 may be included in the result of the transmission. At the receiver, the logarithm likelihood ratios (LLRs) per bit may be available. The punctured parity 1870 may then be recombined. The combination may then be decoded with the LDPC decoder 1880 and the parity may be further removed. The zeroes may then be further removed leaving only the information bits 1890. The information bits 1890 may then be sent to the cyclic redundancy check (CRC).

TABLE 14

Values of $N_{CBPB}$

| Modulation Type | $N_{CBPB}$ |
| --- | --- |
| π/2 - BPSK | 448 |
| π/2 - QPSK | 896 |
| π/2 - 16QAM | 1792 |

Control message coding and modulation for the MinCoderate puncturing method is disclosed herein. Coding may be done on a per message fragment basis. The message fragments may first be encoded into the PHY bits of one SC block with $N_{GI}$ symbols. The number of PHY bits in a SC block $N_{CBPB}$ may depend on the modulation type, and exemplary values are shown in Table 14. The number of SC blocks used for the entire transmission may be $1+N_{rep}(n)$ for message n.

Figure 19A:
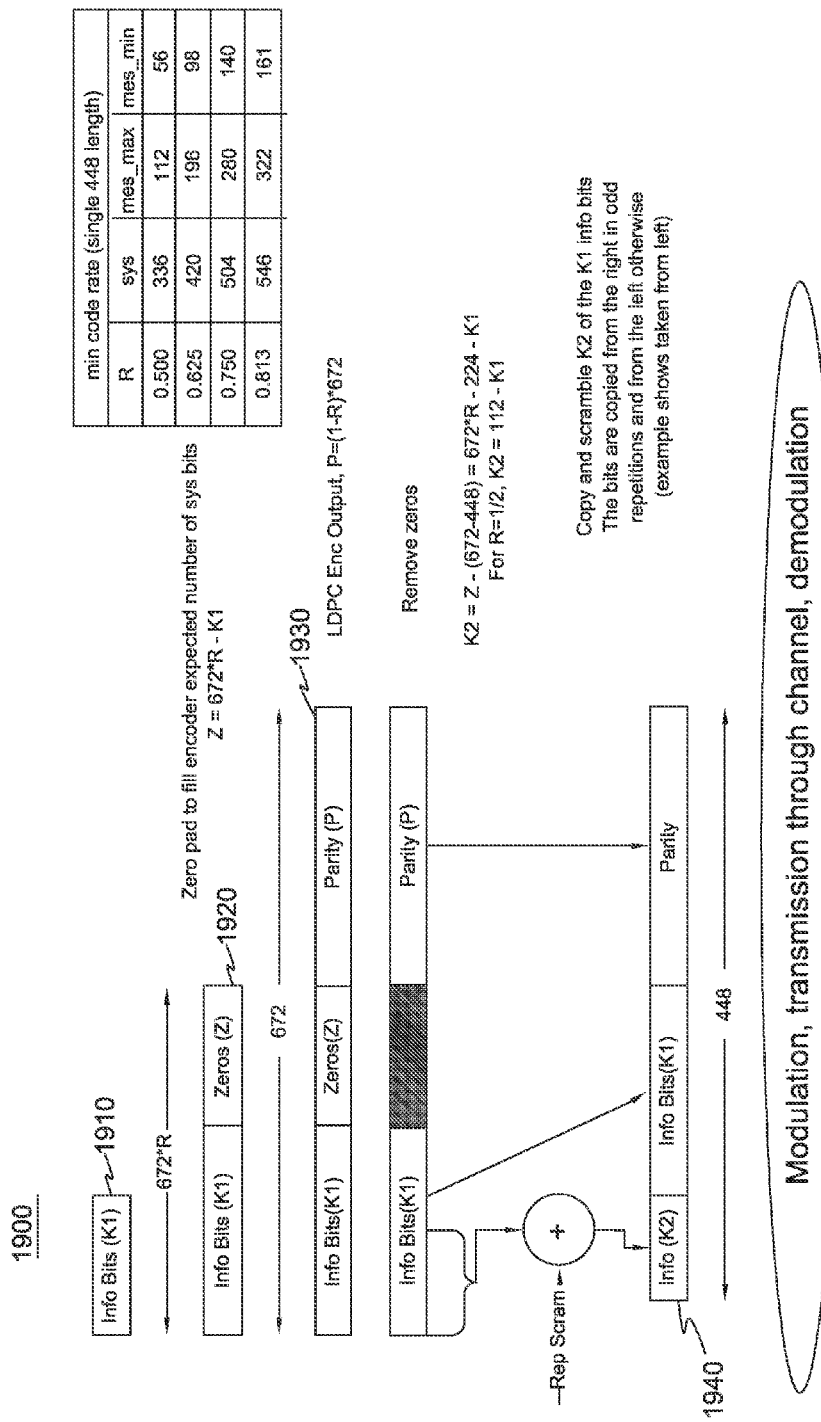
FIG. 19A is a diagram of an example encoding for control messages using MinCodeRate.

FIG. 19A is a diagram of an example encoding for control messages using MinCodeRate. The example shows how MinCodeRate may scramble and encode message bits. The input message 1910 bits may include the FCS bits ($b_1$, $b_2$, ..., $b_{N_{mfp}}$), where $N_{mfp}$ is the payload of the message fragment being processed, and may be scrambled with the IV, as described below and illustrated in FIG. 20. The scrambling may start from the first bit, to create $d_{1S}=(q_1, q_2, ..., q_{N_{mfp}})$.

The LDPC codeword $c=(q_1, q_2, ..., q_{N_{mfp}}, 0_1, 0_2, ..., 0_Z, p_1, p_2, p_{N_p})$ may be created by concatenating Z zeroes 1920 to the $N_{mfp}$ bits of $d_{1S}$ and then generating the parity bits $p_1$, $p_2$, $p_{N_p}$ 1930 such that $Hc^T=0$, where H is the parity check matrix for the rate R LDPC code specified in IEEE 802.11ad. Note that $Z=672R-N_{mfp}$ and $N_p=672(1-R)$.

Bits $N_{mfp}+1$ through 672R (the zero bits) may be removed to obtain $c1=(q_1, q_2, ..., N_{mfp}, p_1, p_2, ..., p_{N_p})$. For $mod_2(N_{rep})=0$, as described below and illustrated in FIG. 20 with the IV given, the method may remove and scramble the first $N_{sysRep}$ bits of the sequence c1. These bits may be appended to the beginning of c1 to create the sequence $c2=(q^s_1, q^s_2, ..., q^s_{NsysRep}, q_1, q_2, ..., q_{N_{mfp}}, p_1, p_2, ..., p_{N_p})$. Otherwise, as described below and illustrated in FIG. 20 with the IV given, the method may remove and scramble the last $N_{sysRep}$ bits of the sequence c1. These bits may be appended to the beginning of c1 to create the sequence 1940 $c2=(q^s_{N_{mfp}-N_{sysRep}+1}, q^s_{N_{mfp}-N_{sysRep}}, q^s_{N_{mfp}}, q_1, q_2, ..., q_{N_{mfp}}, p_1, p_2, ..., p_{N_p})$. For example $$N_{sysRep} = Z - (672 - N_{CBPB}) = 672R - \frac{N_{CBPB}}{2} - N_{mfp}, \text{e.g.,}$$

$$\left\{ \text{For } R = \frac{1}{2}, N_{sysRep} = 112 - N_{mfp} \right\}.$$

The resulting $N_{CBPB}$ bits may be multiplied with $-1 \, mod_2(N_{rep})$ where $N_{rep}=0, 1, ... N_{rep}(n)$, and then mapped as π/2-BPSK as described in IEEE 802.11ad. The $N_{GI}$ guard symbols may then be prepended to the resulting $N_{CBPB}$ bits as described IEEE 802.11ad. The resulting sequence may then be appended after the sequence created for the first data block. After modulation, the resulting sequence may then be transmitted through the channel.

In an example, a code rate ½ may be used for two repetitions (Rep=2) for K1=1-56. In a further example, code rate ½ may also be used for one repetition (Rep=1) for K1=56-122, but other code rates are also possible. Further, in an example, the K2 bits may be copied from the left.

Figure 19B:
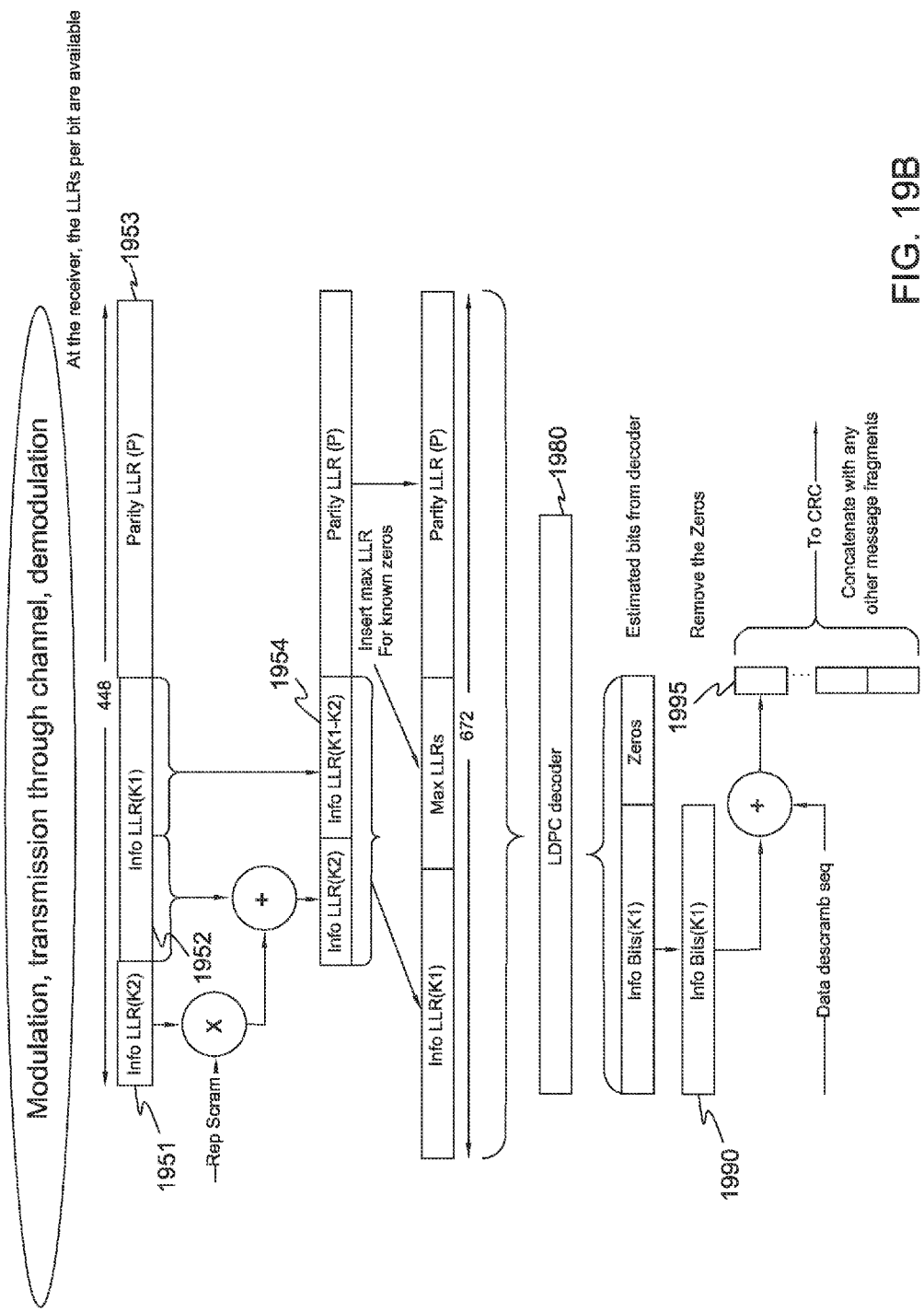
FIG. 19B is a diagram of an example decoding for control messages using MinCodeRate.

FIG. 19B is a diagram of an example decoding for control messages using MinCodeRate. The process for decoding is effectively the reverse of encoding. After demodulation, the sequence may include the scrambled information 1951, the information bits that were not scrambled 1952 and the parity bits 1953. The encoding process may then be further reversed resulting in information bits 1954. The sequence may then be decoded by the LDPC decoder 1980 and the zeroes may be removed resulting in information bits 1990. The information bits may then be further descrambled resulting in 1995. These bits may then be sent to the CRC and concatenated with any other message fragments.

The Coding and Modulation procedures described above may support a variety of message lengths. In addition, the coding procedure for each message length may be further modified to support varying performance requirements. As such, given the exemplary message lengths detailed in Tables 8-10, simulations may be used to determine the particular coding and modulation parameters to be used.

The control messages may require high protection relative to regular data transmissions. With this, in an example, a set of coding parameters may give performance at least as good as the header performance shown in FIG. 42. Table 15 lists representative initial tentative coding options based on example simulations performed. There are multiple viable options may be chosen and the specific option to be used may be signaled in the beacon period.

TABLE 15

Control Message Coding Parameters

| Message Number | Compression Mode | Puncture Mode | Number of Message Fragments | Block Repetition | Code Rate |
| --- | --- | --- | --- | --- | --- |
| 1 | Minimal | MinZeroPad | 2 | None | ⅝ |
| 2 | Minimal | MinZeroPad | 3 | None | ½ |
| 3 | Minimal | MinZeroPad | 2 | None | ½ |

The control message scrambler may have a larger period than the normal header/data scrambler. The larger length may provide a larger IV so that every message in a backhaul superframe may have a distinct IV. For example there may be 1000 frames/superframe, 5 control slots per frame, 3 messages per control slot for a total of 15,000 control message per superframe or 14 bits. Furthermore, offsets into the scrambler may be desired that will not cause the scrambler to repeat its sequence. The offsets may provide distinct sequences based on the node or link identifications (IDs). In this way, two conditions may be satisfied. In one example condition, the scrambling sequences may be well mixed over the superframe. In another example condition, a node that is out of sync with the network (e.g., using the wrong control slot) may have a low probability of falsely thinking it received a grant to transmit without explicitly sending node IDs in the messages.

To accommodate a large number of local link identifiers, an additional 10 bits of LFSR may be added. In some circumstances there may not be 2-tap feedback solutions to the 24-bit m-sequence generator, a 25-bit LFSR may be defined with 2-taps (there may be two different 2-tap, 25-bit LFSRs with maximal length sequences). One such example is provided by the primitive polynomial: $S(x)=x^{25}+x^{22}+1$, and is illustrated in FIG. 20.

Figure 20:
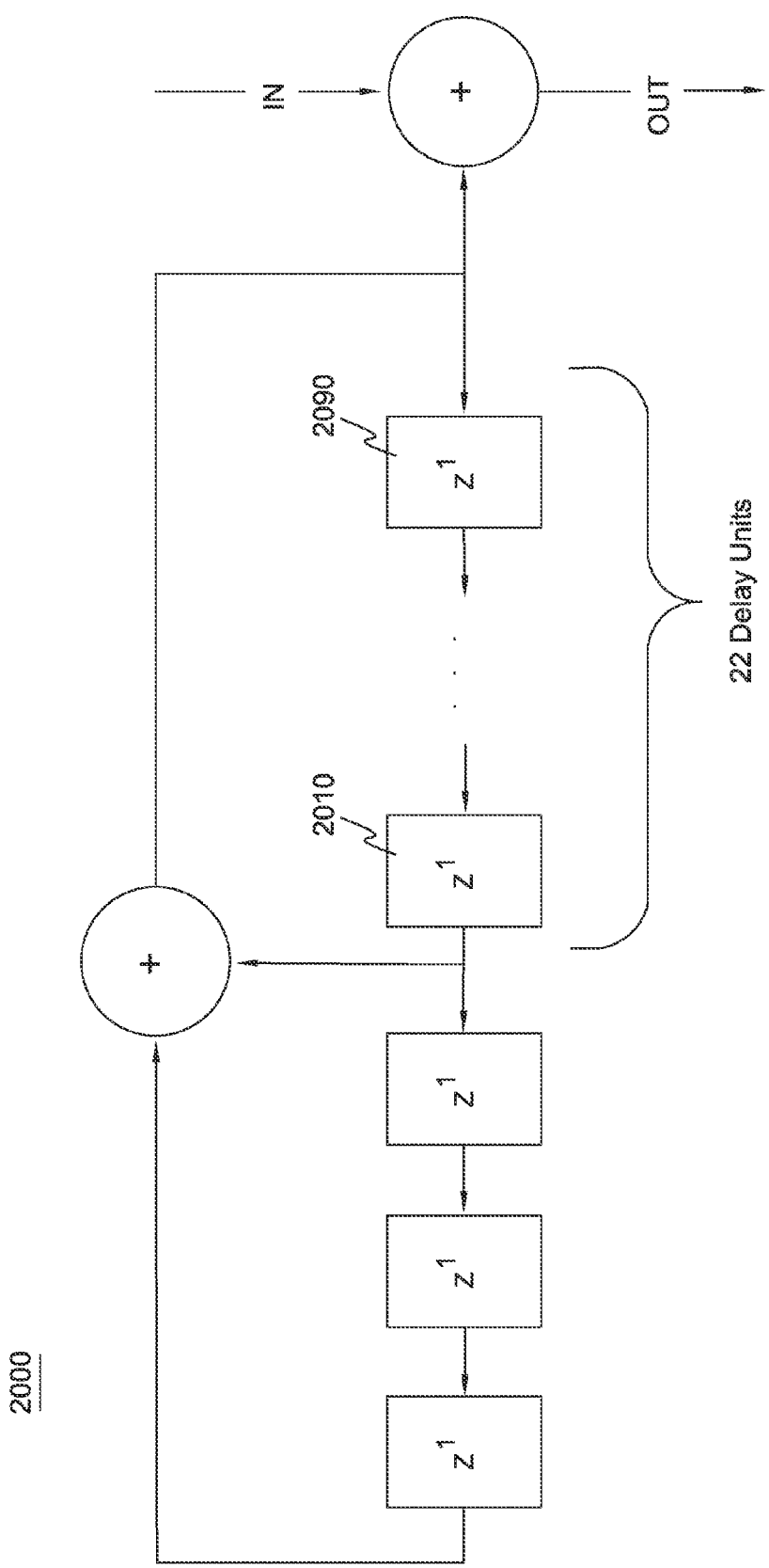
FIG. 20 is a diagram of an example long control message scrambler.

FIG. 20 is a diagram of an example long control message scrambler. The control message scrambler 2000 may include twenty-two delay units, such as delay units 2010 through 2090. The control message scrambler initialization 2000 may be determined by the following:

$$IV=1+\mathrm{mod}_{2^{25}-1}(IV_{seed}+LOC_{rx\_id}+m+3s+N_s b), \quad \text{Equation (6)}$$

where $IV_{seed}$ is an optional 5-bit parameter signaled in the beacon response ACK message and is a function of the beacon transmitter ID. $LOC_{rx\_id}$ may be a globally non-unique, but locally unique ID given to the new node used to distinguish nodes of the local mesh. With scrambling based on $LOC_{rx\_id}$, the ID may not need to be explicitly transmitted (message not decodable if different $LOC_{rx\_id}$ used). m is the Message Number−1 {0,1,2}. s is the Control Slot Number−1, b is the SI (SI Number−1) {0, 1, . . . , 999}, and $N_s$ is Number of Control Slots.

A backhaul network requires support of service-level agreements (SLAs). In packet backhaul networks, these SLAs determine if the guaranteed throughput and latency requirements are met. This may be achieved by utilizing committed information rate (CIR) and excess information rate (EIR) terminology.

CIR is the average guaranteed capacity to be given to a data flow under normal conditions. Under operating conditions, the capacity should not fall below the CIR. EIR is the upper bound allowed above CIR rate. In order to provide differentiated services in the backhaul network, multiple classes of service or QoS are supported in the small-cell backhaul network.

In order to maximize the amount of higher priority traffic for directional mesh backhaul networks, scheduling support may be required to enable iterative scheduling to achieve this in a purely distributed manner. As a result, the directional mesh backhaul may be capable of handling bursty traffic while respecting the corresponding QoS/class of service.

In one embodiment, the total number of control slots (N) in the Control Period may be determined a-priori, may be common to all the mesh nodes in the network and may remain constant for a specific configuration of the network. For a mesh node in the network with K neighbors, there are at most M=floor(N/K) complete iterations of control slots, where each neighbor is allotted one control slot per iteration. This allows each node to exchange scheduling information with its neighbors more than once per SI. Each of these control slots may involve a three-way message exchange between the nodes. The three-way message exchange was discussed above.

As the number of control slots may be common for all mesh nodes in the network, there may be instances where the number of neighbors may be lower than the number of available control slots. The network may also configure more control slots than the highest number of possible neighbors allowed for each mesh node to enable more than one exchange of control slot information in order to achieve better differentiated class of service and allocation of CIR data over EIR. This allows for the possibility of iterative scheduling. Iterative scheduling enables priority-based resource reservation to be performed dynamically in each SI. If traffic priorities are known, then higher priority traffic may be scheduled in the initial scheduling iterations while lower priority data may be scheduled in later scheduling iterations. If traffic classification based on CIR and EIR labelling is available, then CIR traffic may be scheduled in initial scheduling iterations followed by EIR traffic scheduling.

The multiple scheduling iterations may be used for prioritized resource reservation in several different ways. In one embodiment, resource requests and schedules associated with one or few priority levels may be exchanged in a particular scheduling iteration. Here, resources may be allotted for high priority traffic first and then any remaining resources may be allotted to lower priority traffic. This may ensure that all the nodes have exchanged required information about higher priority traffic with their neighbors and may allow for this traffic to be scheduled before allowing lower priority traffic, thereby avoiding reversal of traffic class/QoS prioritization.

In another example, mesh nodes may send their resource requests and temporary schedules for all priorities in each scheduling iteration. Then, the receiver may determine the schedule for the current priority level based on the received resource requests and previously scheduled resources for higher priority traffic. Fairness among different priority levels may be ensured by exchanging more information about different priority traffic in each scheduling iteration.

In another example, where information about current priority level and lower priorities may be exchanged, the control signaling overhead may be reduced. Further, the scheduling information exchanged may be in the form of bitmaps to reduce the message sizes, but this may eliminate the priority information of previously scheduled traffic. Consequently, a trade-off is possible between control message overhead and traffic prioritization efficiency.

Figure 21:
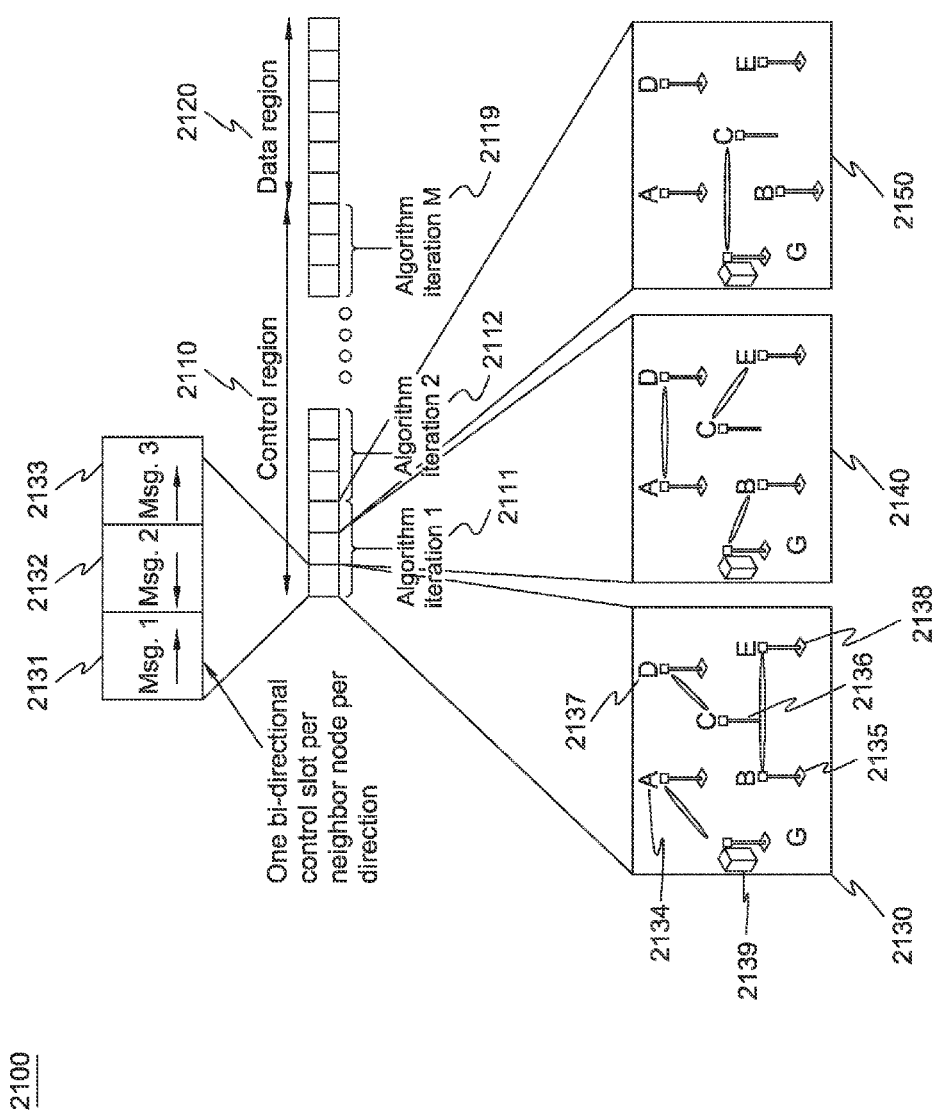
FIG. 21 is a diagram of an example iterative resource scheduling mechanism.

FIG. 21 is diagram of an example of an iterative resource scheduling mechanism. The resource scheduling mechanism 2100 may apply to control slots, for example control slots in a control region 2110 or control period. A data region 2120 may follow the control region 2110. Here, the control region 2110 has sufficient control slots for M iterations 2111, 2112 and 2119 of the scheduling algorithm. Each iteration 2111, 2112 and 2119 may include a sufficient number of bi-directional control slots for each mesh node to exchange scheduling information with each of its neighbors. The exchange of scheduling information with each neighbor may occur in a three message sequence, including message 1 2131, message 2 2132 and message 3 2133. In an example, the neighbors may exchange control slot information in this way. The number of control slots for iterative scheduling may vary from neighbor to neighbor. In an example, during consecutive periods, 2130, 2140, 2150, in algorithm iteration 1 2111, each node may communicate with a different one of its neighbor nodes. For instance, in the period 2130, node G 2139 may exchange information with neighbor node A 2134, Node B 2135 may communicate with neighbor Node E 2138 and Node C 2136 may communicate with neighbor Node D 2137. All neighbors may not be allotted a control slot in each scheduling iteration. The number of iterations for a particular neighbor may depend on the number of active traffic priority levels associated with it or the number of active neighbor nodes. In an exemplary embodiment, signals, such as a control signal, are received by a mesh node from a mesh controller. Further, in an exemplary embodiment, the resource scheduling mechanism may include a resource scheduling algorithm.

Figure 22:
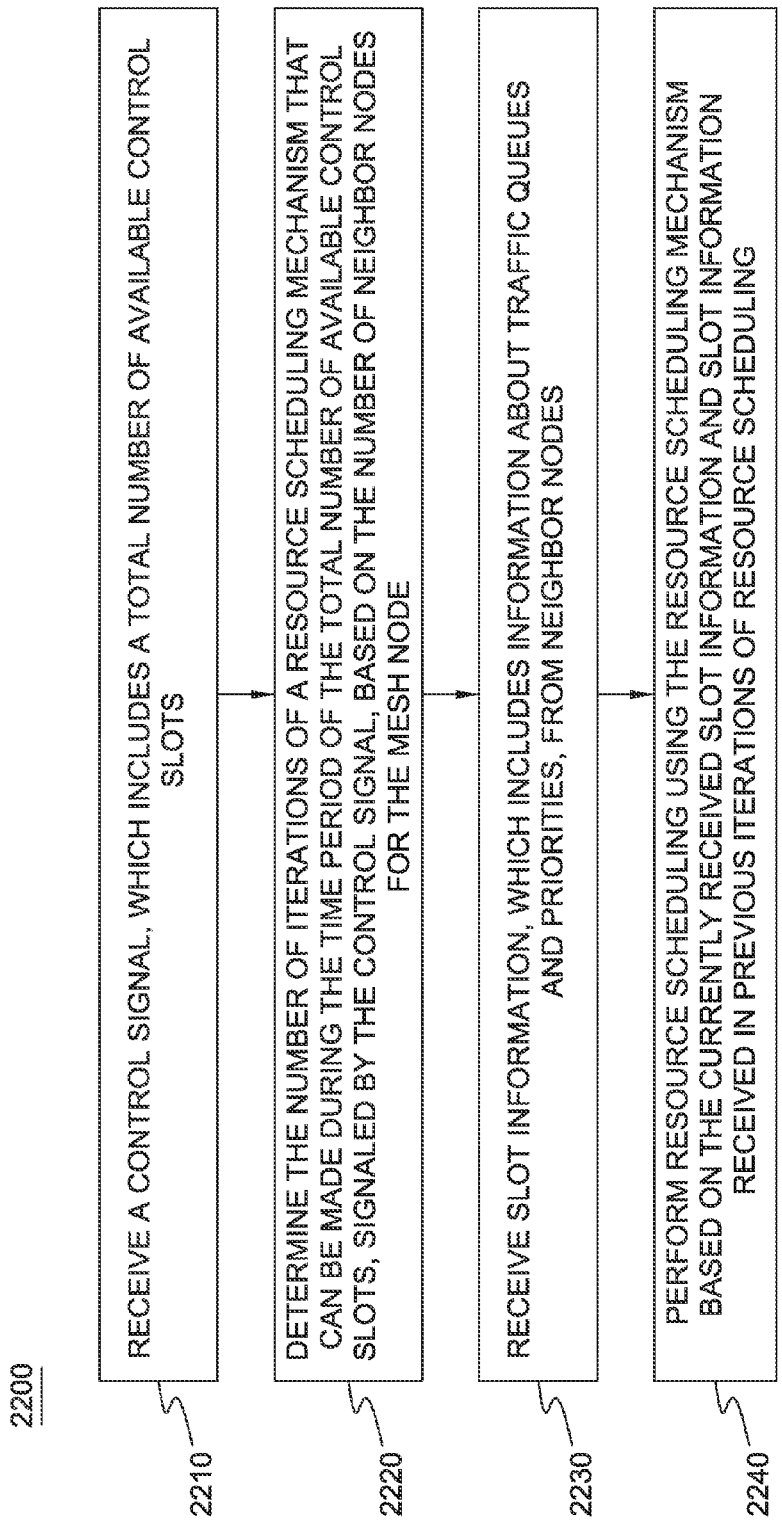
FIG. 22 is a diagram of an example process flow for performing resource scheduling using the resource scheduling mechanism.

FIG. 22 is a diagram of an example process flow for performing resource scheduling using the resource scheduling mechanism. In an example, the process 2200 may begin when a mesh node receives a control signal which may include the number of available control slots 2110. The control signal may be received from a mesh controller. The number of available control slots may be determined by the network. The node may then determine 2220 the number of iterations of a resource scheduling mechanism that can be made during the time period of the total number of available control slots. The node may maximize the number of possible iterations based on local topology. In an example, the node may determine the number of iterations based on the number of available neighbor nodes for the mesh node. The node may then receive 2230 control slot information from neighbor nodes. This information may include information about one or more of traffic queues, priorities and channel conditions. The node may then perform resource scheduling 2240 using the resource scheduling mechanism. The resource scheduling may be based on current control slot information, as well as control slot information received in prior resource scheduling iterations. In a further example, the resource scheduling may also be based on current traffic information and historic traffic loads.

Figure 23:
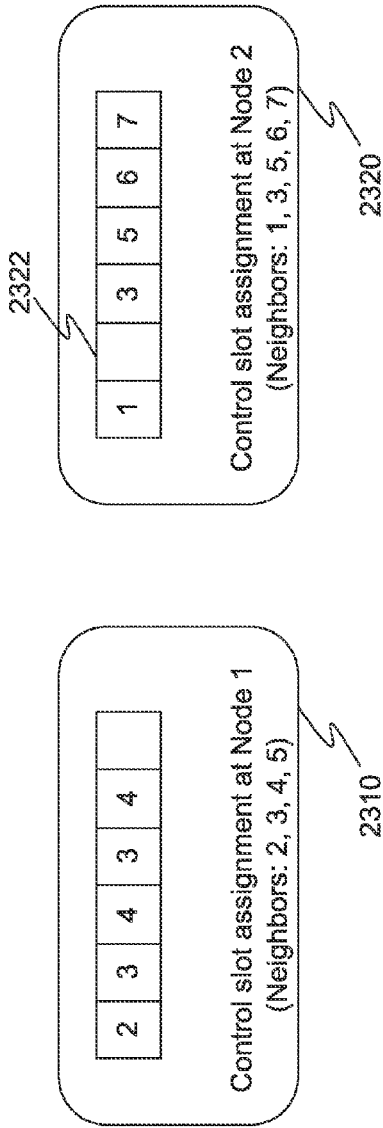
FIG. 23 is a diagram of an example control slot assignment with a different number of control slots for different neighbors.

FIG. 23 is a diagram of an example control slot assignment with a different number of control slots for different neighbors. It shows an example where a mesh node may allocate a different number of scheduling iterations to different neighbors due to a varying neighbor count for one of the neighbors. Here, Node 2 2320 may not be accommodated in the second iteration by Node 1 2310 because there are no common control slots between the two nodes that are unallocated slots, such as 2332. Further node 1 2310 may not communicate with node 2 2320 using its last unallocated slot as node 2 has allocated node 7 for that slot. The number of scheduling iterations and control slot allocations may be changed between nodes by a control slot reassignment procedure described below.

In an example, if there are insufficient slots in the control period for a complete iteration of the resource scheduling mechanism or scheduling algorithm, then slots may be assigned to a sub-set of the neighbors. As a result, resource scheduling may include maintaining relative fairness.

Figure 24:
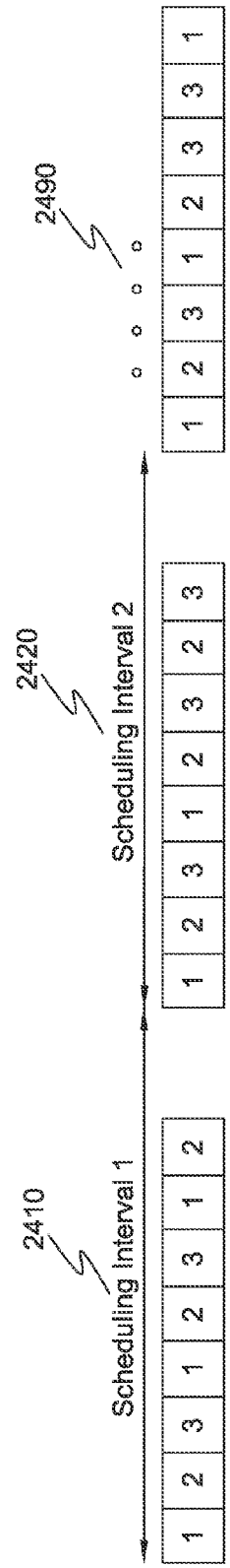
FIG. 24 is a diagram of an example of iterative scheduling with insufficient control slots.

FIG. 24 is a diagram of an example of iterative scheduling with insufficient control slots. In this example, the number of control slots may not be an exact multiple of the number of neighbors that a mesh node has. Here, the last two control slots are distributed among the three neighbors and this distribution may be rotated in successive scheduling iterations to maintain relative fairness. The scheduling iterations may include SIs, such as SIs 2410, 2420 and 2490. The control slot assignment may be pre-determined and communicated to all the affected nodes but may be changed occasionally due to topology or traffic pattern changes.

Mesh nodes may use the Control Slot Reassignment procedure to re-arrange control slots allotted to their neighbors. This may be required when new nodes join the network, when there is node or link failure and when the number of priority levels used by the scheduling algorithm needs to be changed. This may be accomplished by exchanging a series of messages between the affected nodes.

The procedure may start with the requesting node sending a Control Slot Reassignment Request message to the affected neighbors. The neighbors may then respond with Control Slot Reassignment Response message, which includes information about their available control slots. The requesting node may send a Control Slot Reassignment Confirm message to the neighbors with the new control slot assignments. The neighbors may respond with a Control Slot Reassignment Confirm message to confirm receipt of the new assignment.

Figure 25:
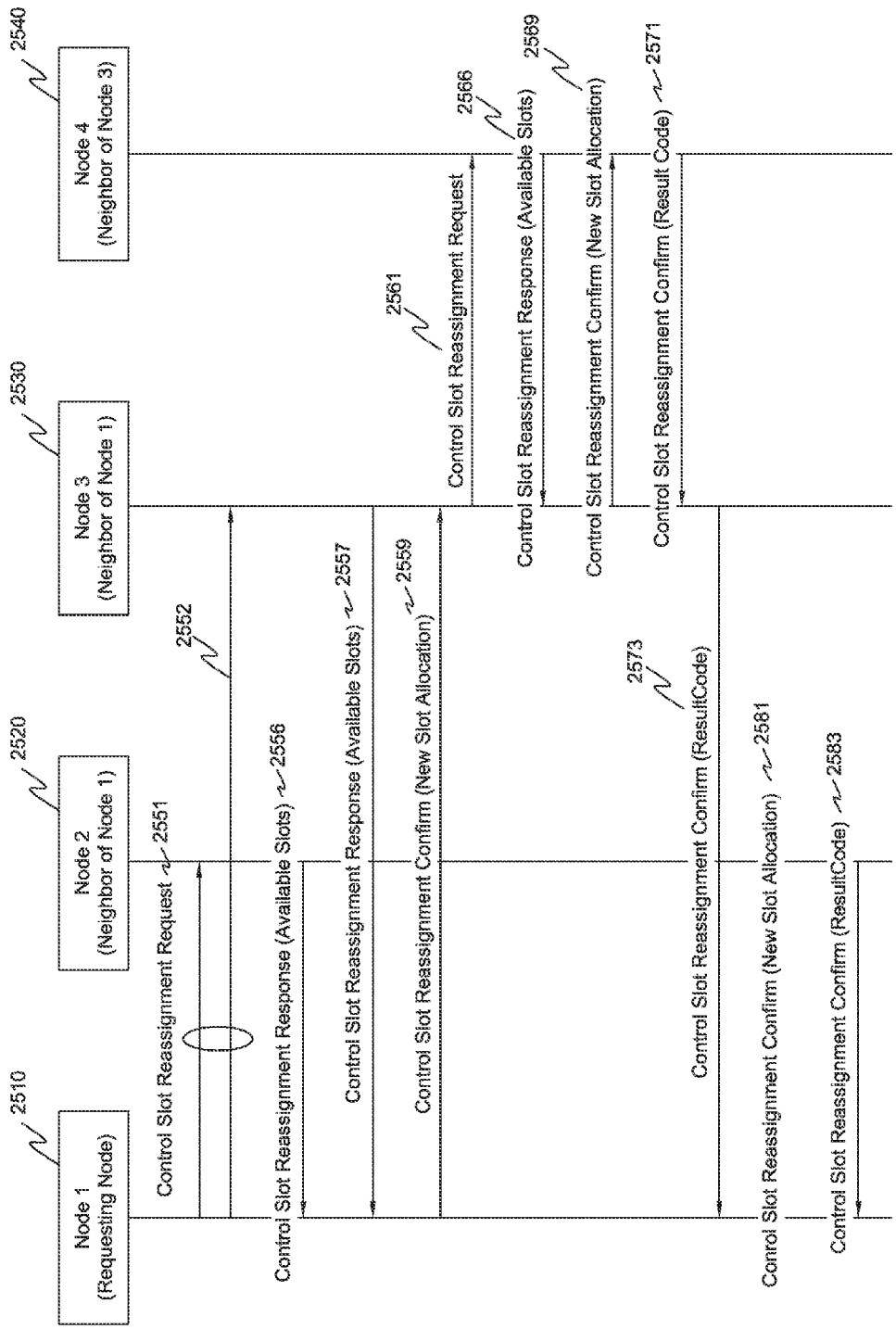
FIG. 25 is a diagram of an example Control Slot Reassignment procedure.

FIG. 25 is a diagram of an example Control Slot Reassignment procedure. In the example, Node 1 2510 has Nodes 2 2520 and Node 3 2530 as neighbors, and may send Control Slot Reassignment Requests 2551 and 2552 to them, respectively, to initiate the procedure. Nodes 2 2520 and 3 2530 may respond with their available control slots in Control Slot Reassignment Response frames 2556 and 2557 respectively. In this example, Node 1 2510 may send a New Slot Allocation 2559 to Node 3 2530, included in Control Slot Reassignment Confirm message, that may require Node 3 2530 to further re-assign slots with its other neighbor, Node 4 2540. Consequently, Node 3 2530 may send Control Slot Reassignment Request 2561 to Node 4 2540 and complete the Slot Reassignment communications with Node 4 2540 (Control Slot Reassignment Response 2566, Control Slot Reassignment Confirm 2569 and Control Slot Reassignment Confirm Result Code 2571), before responding to Node 1 2510 with Control Slot Reassignment Confirm message 2573. Then, Node 1 may send Control Slot Reassignment Confirm message 2581 to Node 2 2520, including New Slot Allocation 2581, and receive a Control Slot Reassignment Confirm message 2583 with the ResultCode that indicates the status of the reassignment.

The Control Slot Reassignment procedure may also be utilized to revoke one or more control slots allocated to a neighboring node if the mesh node identifies that it needs to allocate these control slots to one or more of its other neighbors or newly formed neighbors. In a further example, the Control Slot Reassignment procedure may be coordinated by a mesh controller, such as a Central Mesh Controller, by sending appropriate messages to affected mesh nodes. This message may include time instance at which the new configuration will take into effect.

Small-cells are expected to be rolled out first in dense urban and urban environments. Given the varying landscape of dense urban and urban environments, the small-cell mesh backhaul connectivity for each mesh node may vary significantly from one part of the network to the other. Configuring the entire mesh network with constant amount of control slots may incur large overhead in parts of the network where connectivity is low. On the other hand, if fewer control slots are used throughout the network, this may artificially limit the number of links a mesh node can form even though there are good quality links that can be formed in certain parts of the network. To avoid this and to enable appropriate scaling of control period based on local mesh connectivity for each mesh node, variable control periods may be used.

Different parts of the mesh network may use different number of control slots, and consequently variable Control Period sizes. A Domain may be defined as a contiguous collection of mesh nodes that share the same Control Period size. At the boundary between different Domains may lie mesh nodes that use different Control Period sizes to communicate with different neighbors. Such mesh nodes may belong to more than one Domain as they need to communicate with mesh nodes that belong to two or more domains.

A mesh network may start off with a default number of control slots that may be either pre-configured in the mesh nodes and read during start-up, or optionally communicated by the mesh controller, if one exists. The default or initial Control Period size may be changed later either in a distributed manner or via central messaging. To change the Control Period size in a distributed manner, the requesting node may send a Control Period Reconfiguration Request message to all or a subset of its neighbors. The size change may be confirmed when the neighbors respond with a Control Period Reconfiguration Confirm message. In the centralized approach, the mesh controller may send Control Period Reconfiguration Request message to all or some mesh nodes to change the Control Period size, by adding or removing control slots. The boundary nodes may use different number of control slots with neighbors belonging to different Domains.

Figure 26:
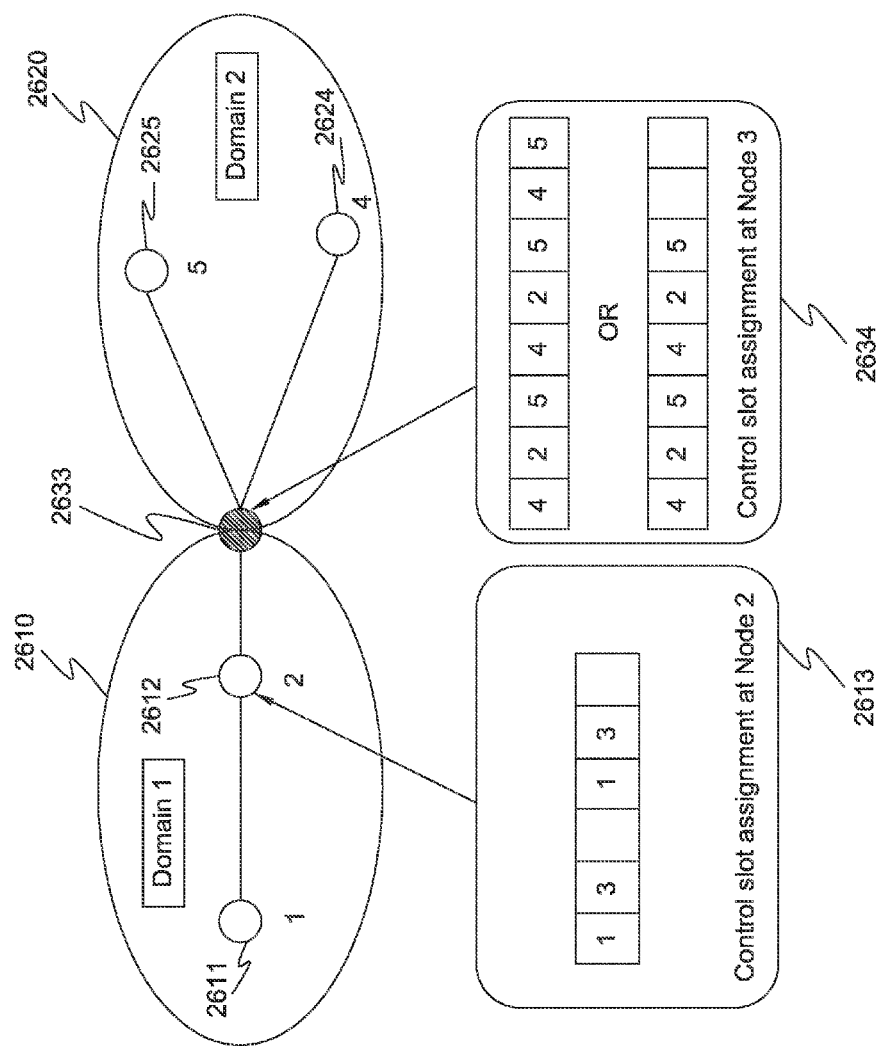
FIG. 26 is a diagram of an example node mesh topology with variable control period sizes.

FIG. 26 is a diagram of an example node mesh topology with variable control period sizes. In an example, Node 1 2611 and Node 2 2612 may belong to Domain 1 2610, while Node 4 2624 and Node 5 2625 may belong to Domain 2 2620. Node 3 2632 may belong to both Domain 1 2610 and Domain 2 2620. Nodes belonging to Domain 1 2610 may use 6 control slots 2613, while those belonging to Domain 2 2620 may use 8 slots 2634. Node 3 2633 may use the first 6 control slots while communicating with nodes belonging to Domain 1 2610 and may use all 8 control slots for communicating with nodes belonging to Domain 2 2620. Node 3 2633 may use the time required for control slots 6 and 7 for data transmissions within Domain 1 2610, if they do not cause interference to Control Period transmissions in Domain 2 2620. Alternatively, all Control Period transmissions may employ a low MCS for additional protection against interference. Node 3 2633 allots control slots to neighbors belonging to Domain 1 2610 (for example Node 2 2612) in the first 6 control slots. For neighbors belonging to Domain 2 2620 (for example Node 4 2624 and Node 5 2625), all 8 control slots may be used. Here two scheduling slot allocation options are shown. In another embodiment, the extra control slots may be left vacant in Domain 2 2620.

The iterative scheduling defined above may be used in conjunction with variable control period sizes to get the additional benefit of differentiated service level scheduling. For instance, the extra slots may be used for scheduling Domain 2 2620 neighbors (for example Node 4 2624 and Node 5 2625), which may execute more iterations of the scheduling algorithm. This situation may arise if Node 3 2633 needs allocations for only two priority levels for Domain 1 2610 neighbors (hence two iterations of scheduling) and three priority levels for Domain 2 2620 neighbors. Another reason could be that some of the nodes in Domain 2 2620 may have more number of neighbors than those in Domain 1 2610, hence requiring more number of control slots. The nodes may be reconfigure the control slot assignment using Control Slot Reassignment procedure 2500 either after or before changing the Control Period size, depending on whether the Control Period size is increased or decreased, respectively.

In a further example, the domains could also be structured to limit the impact of interference of control slots in one domain towards another. In an example case, adjacent domains may have different control period sizes and the data transfer in the domain with smaller control period size may impact the domain with relatively larger control period size. In order to achieve optimal allocation of domain and to manage the impact of interference on control period, the centralized mesh controller may trigger interference measurements at each of the mesh nodes and to determine the interference zone of each mesh node. These interference measurements may be configured so as to determine the impact of interference of each link between a pair of mesh nodes on neighboring links within a conservative distance range and can be further refined based on received measurement reports by the mesh controller. Based on the received interference measurement report from each of the mesh nodes, the mesh controller may determine the domains and what the control period size of each of the domains.

Figure 27:
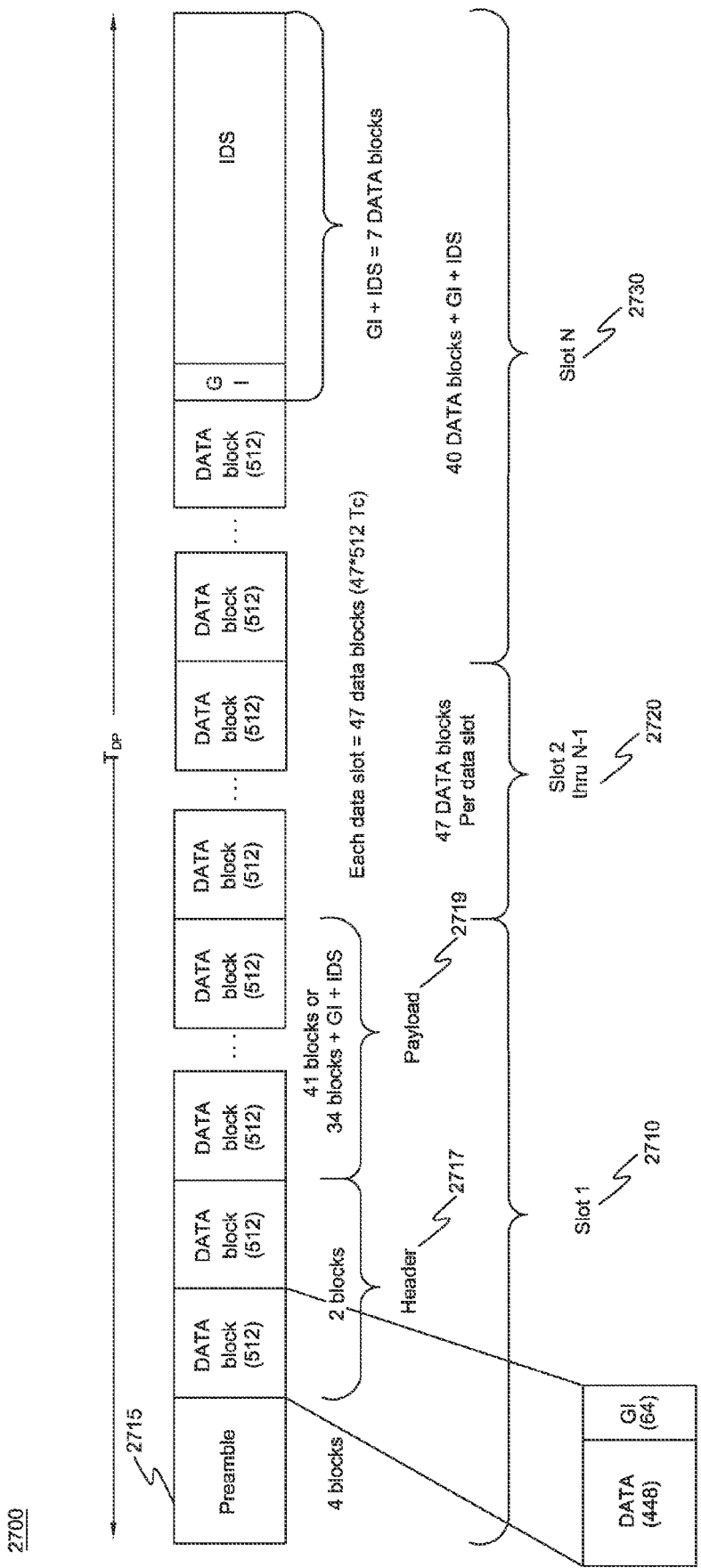
FIG. 27 is a diagram of an example of Data Period Structure.

As shown in FIG. 11 each SI may contain both a Control Period and a Data Period. The Data Period may be further split into $N_{ds}$ Data Slots, where one or more Data Slots are assigned for a particular packet transmission from a node. As will be explained below, these Data Slots may be structured differently based on the size of the packet being delivered. As shown in FIG. 27, the Data Period may contain the following components: a preamble, described below, a header, and a payload. Certain fields in the header may require changes with respect to the unmodified IEEE 802.11ad SC packet. Examples of these changes are detailed in Table 17 below. The payload may include LDPC coded data (possibly longer LDCP codewords, with respect to the unmodified IEEE 802.11ad SC packet). Table 16 shows exemplary related timing parameters for the default case of Ncs=5.

TABLE 16

Default Data Period Timing Parameters

| Parameter | Value |
| --- | --- |
| $N_{DBM}$: Maximum Number of Data Blocks in a Data Slot (Refer to FIG. 23) | 47 |
| $T_{DPR}$: Duration of Data Preamble | $2048*T_C$ |
| $T_{DH}$: Duration of Data Header | $1024*T_C$ |
| IDS: Inter-Frame Data Spacing | $3520*T_C$ |
| $T_{DS}$: Duration of Data Slot | $N_{DBM}*512*T_C = 24064*T_C$ |
| $T_{DP}$: Duration of Data Period | $N_{DS}*T_{DS} = 770048*T_C$ |

The Data Preambles may be substantially shortened compared to the IEEE 802.11ad Data Preambles based on the scheduled access architecture.

FIG. 27 is a diagram of an example of Data Period Structure. In the example period 2700, the header data 2717 may be spread across two data blocks. The first slot 2710 may contain a preamble 2715, a header 2717 and a payload 2719. Subsequent slots, for example slot 2 2720, may contain data blocks. The final slot N 2730 may contain a data block, a GI, and inter-frame data spacing (IDS). Exemplary header fields are specified in Table 17. The coding and modulation may be identical to the IEEE 802.11ad header coding and modulation.

Figure 28:
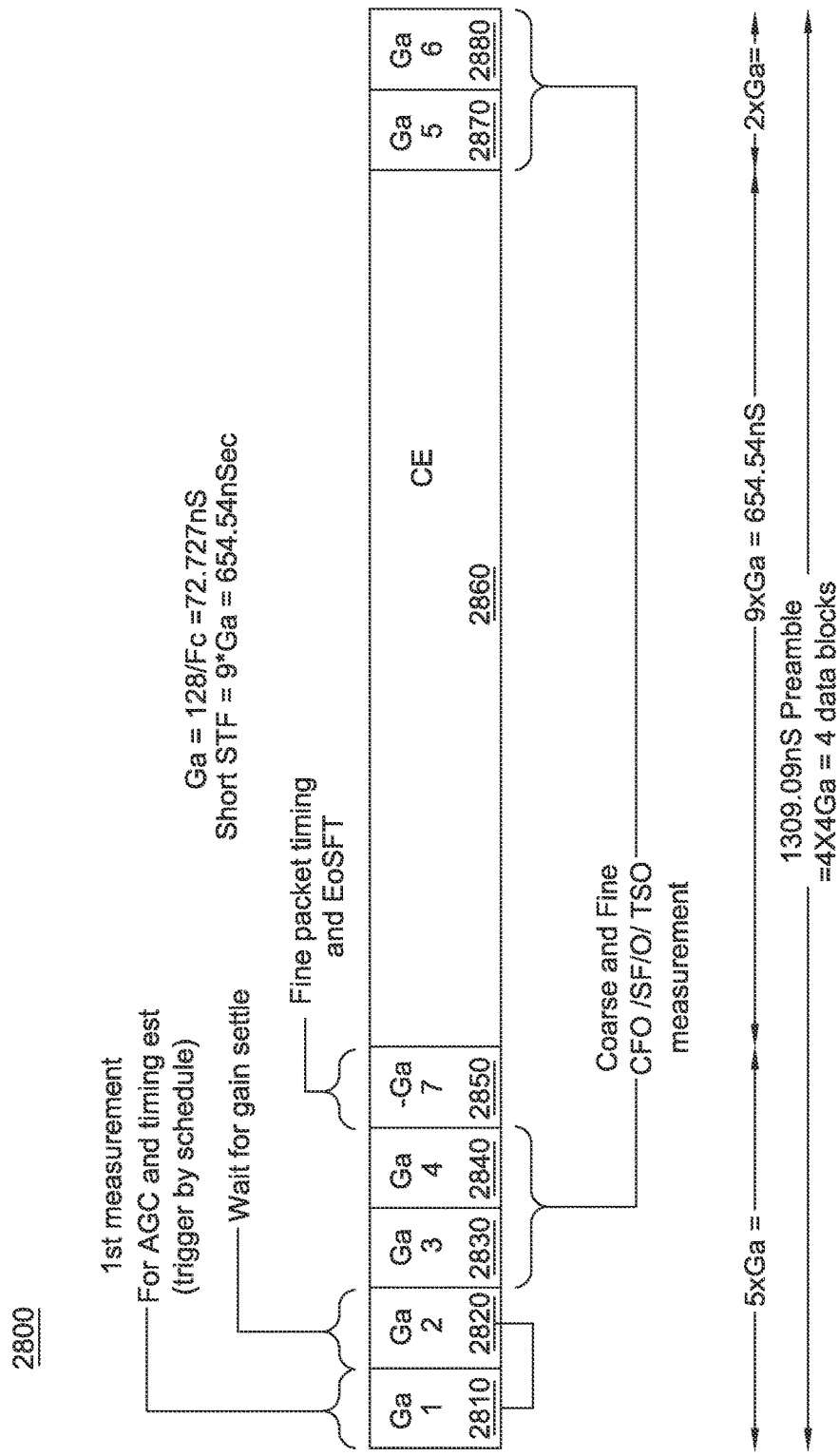
FIG. 28 is a diagram of an example Data Preamble.

FIG. 28 is a diagram of an example Data Preamble. The example shows the shortened preamble 2800, which contains only 7 Ga sequences used for AGC, CFO/SFO, and EoSTF. In an example, the preamble includes Ga 1 2810, Ga 2 2820, Ga3 2830, Ga 4 2840, and –Ga 7 2850, followed by CE block 2860, GA 5 2870 and GA 6 2880. There may also be an additional 9 Ga sequences that are intended to be used for channel estimation.

TABLE 17

Data Header Contents

| Field | Size [Bits] | Description |
|---|---|---|
| MCS | 5 | Index into the currently used MCS table<br>Identifies encoding scheme used to encode the message body.<br>There may be multiple MCS tables for nodes with different capabilities.<br>This may be signaled when a node performs initial association. |
| Length | 18 | |
| Additional PPDU | 1 | Indicates if the current PPDU is immediately followed by another PPDU without a Preamble or Inter-frame spacing.<br>Set to '1' in the first and subsequent PPDUs (if any) that are aggregated.<br>Set to '0' in the last PPDU.<br>As an example, the first PPDU may correspond to persistent traffic, while the second PPDU may contain bursty traffic packets.<br>The current design requires a maximum of 2 PPDUs per SI, however this value may be increased as an alternative implementation option. |
| Re-transmission Indicator | 2 or 4 | Indicates whether the current PPDU is a new transmission or a HARQ re-transmission.<br>Multiple bits may be needed to signal if the current transmission corresponds to persistent or bursty traffic, at a minimum. |
| FEC Indicator | 1 or 2 | Indicates if the long, short, or possibly other specific size LDPC code is used |
| Power Control | 2 | |
| Reserved | 18 or 15 | |
| Beam training info | 5 | Used to initiate and control beam training Length: 3 bits (Number of TRN-T/R subfields appended or requested)<br>Beam Tracking Request: 1 bit (1: beam tracking requested, 0: no beam tracking requested)<br>Packet Type: 1 bit (0: indicates either packet that has TRN-R subfields appended, or that sender is requesting TRN-R subfields be appended in a future response, 1: packet has TRN-T subfields appended.) |
| RSSI | 4 | RSSI of last control message from this link |
| Header Check Sequence (HCS) | 8 | A short CRC sequence may be added to check for decoding errors. |
| Total | 64 | |

A data packet may span multiple Data Slots. In addition each packet may be preceded by a preamble and a header and may end with a GI and IDS. These observations may lead to four possible configurations for a Data Slot in the default configuration of $N_{cs}=5$ and when no beam training is performed.

Figure 29:
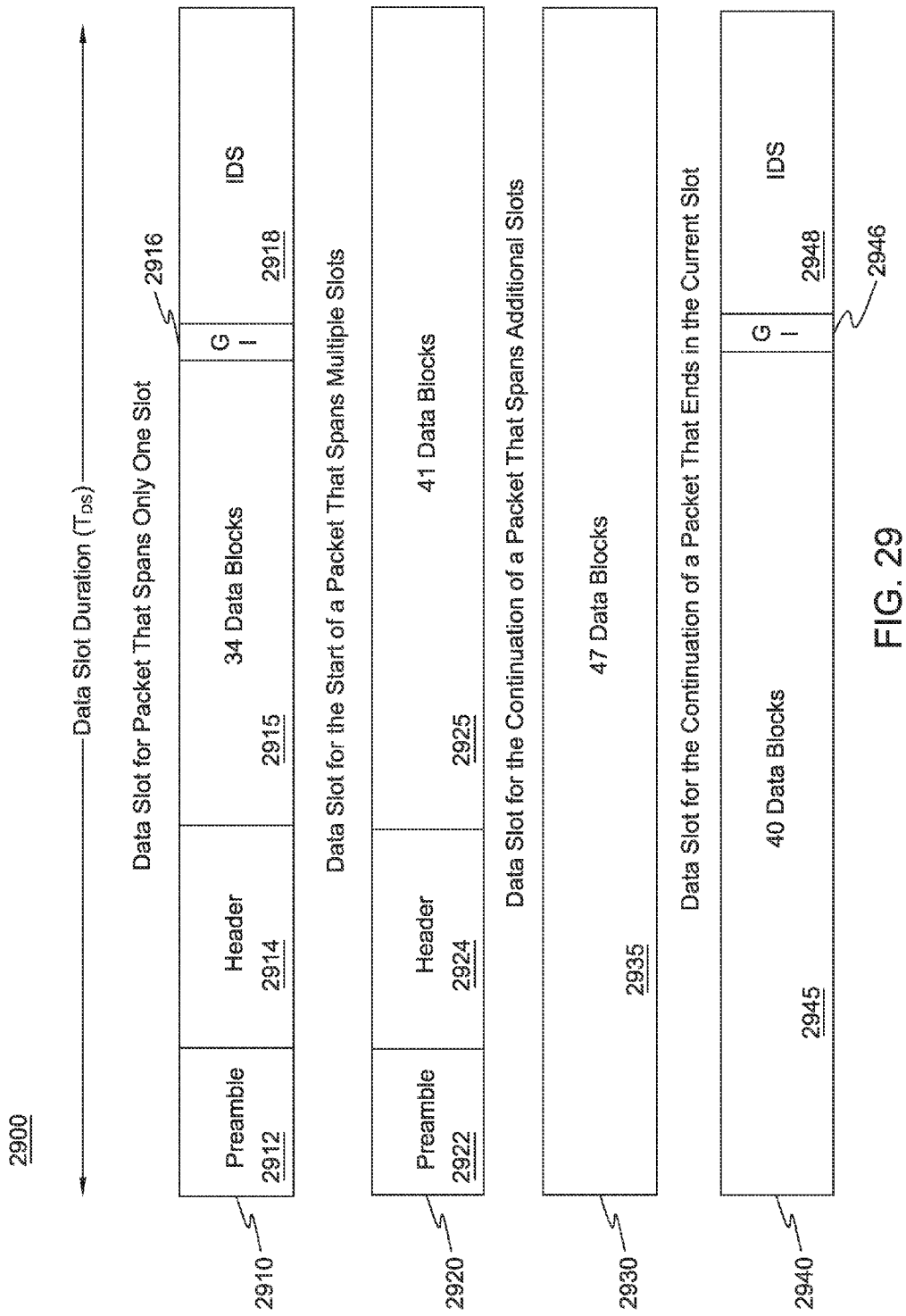
FIG. 29 is a diagram of example data slot scenarios for $N_{cs}$ equal to 5 and no beam refinement.

FIG. 29 is a diagram of an example of Various Data Slot Scenarios for $N_{cs}$ equal to 5 and no beam refinement. In this example four possible scenarios scenario 2910, scenario 2920, scenario 2930 and scenario 2940 are depicted. In the example first scenario 2910, a data slot for the start of packet that spans only one slot (i.e., the data slot is the first and last slot of packet) may start with a preamble of length TDPR, as required for each AGC, Timing Synchronization, and Channel Estimation. The Preamble 2912 may be followed by a Header 2914 of length TDH, which may provide required parameters, shown in Table 17, in order for the node to be able to properly decode the data packet that follows. The Header may be followed by 34 Data Blocks 2915, each of which may contain 448 coded bits followed by a 64 bit GI 2916. The GI 2916 may be used to update the CFO and other related timing parameters. After the GI 2916, the 34 Data Blocks 2915 may be followed by an IDS 2918.

In the second example scenario 2920, a data slot for the start of a packet that spans multiple slots may start with the same Preamble field 2922 and Header field 2924 as described above. The header field 2924 may be followed by 41 Data Blocks 2925. Since the packet may continue into the next Data Slot, there may be no final GI or IDS required.

In the third example scenario 2930, a data slot for the continuation of a packet that spans additional slots (i.e., a slot that is neither the first or last slot of the packet) contains only 47 Data Blocks 2935, since the preamble and header were sent on the previous Data Slot. In addition, since the packet may continue into the next Data Slot, there no final GI or IDS may be required.

In the fourth example scenario 2940, a data slot for the continuation of a packet that ends in the current slot may start with only Data Blocks 2945 as above, however, since the data packet ends in this slot, a GI 2946 and IDS 2948 may both be required. There may be 40 Data Blocks 2945 transmitted in this type of Data Slot.

When beam training is included in a packet, up to ceil$\{K*(4992/512)\}$ data blocks may be lost to beam testing where K is the number of beams. For example when the number of control slots $N_{cs}$ is greater than 5, then ceil$\{(22000/512)*(Ncs-5)\}$=ceil$\{(42.96875)*(Ncs-5)\}$ data blocks may be uniformly removed from the data region, reducing each slot by 1-2 data blocks per slot per added control slot.

The following section considers a modified Low MCS Design at, for example, 160 Mbps. The minimum required MAC-level data rate for the BH may be targeted at 100 Mbps at a range of 350 meters. This may translate to a PHY-level data rate of 160 Mbps using a 62.5% MAC efficiency rate. The current 802.11ad MCS for single carrier (SC) provides PHY data rates in the range of 385 Mbps to 4602 Mbps. These data rates are above the required minimum for BH, however providing these rates may limit the range to less than the desired maximum range of 350 meters. Another potential MCS already specified in IEEE 802.11ad is the CTRL-PHY MCS, which is more robust that any of the SC MCSs. Unfortunately, this MCS option provides a PHY data rate of only 27.5 Mbps, which is well below the target BH data rate.

Table 18 lists the various exemplary parameters used throughout the below description.

TABLE 18

Low MCS Design Parameters

| Parameter | Description |
|---|---|
| Length | Length of PSDU in octets |
| $R_{sc}^{raw}$ | Raw SC-PHY Data Rate |
| $R_T$ | Target bit rate for Low MCS [160 Mbps] |
| $\rho$ | Repetition factor with respect to $N_\rho$ |
| R | LDPC Code Rate [½, ⅝, ¾, 13/16] |

TABLE 18-continued

Low MCS Design Parameters

| Parameter | Description |
| --- | --- |
| $R_e$ | Effective Code Rate |
| $L_{CW}$ | Base LDPC codeword length [672] |
| $N_{CWLM}$ | LDPC codeword length multiplier |
| $L_{FCW}$ | Full LDPC codeword length [$N_{CWLM}L_{CW}$] |
| $L_{IW}$ | Length of Information word |
| $F_C$ | Chip Rate in MHz [1760] |
| $L_{DB}$ | Length of Data Block [512] |
| $L_{GI}$ | Length of Guard Interval [64, 0] |
| $N_\rho$ | Number of Information bits per codeword |
| $N_{DATA\_PAD}$ | Number of zero pad bits appended to the end of the original PSDU |
| $N_{CW}$ | Number of codewords in one PSDU |
| $N_{BLKS}$ | Number of Data Blocks |
| $N_{CBPB}$ | Number of coded bits per Data Block [$L_{DB} - L_{GI}$] |
| $N_{BLK\_PAD}$ | Number of zero pad bits appended to the last Data Block |

In order to determine the number of information bits required per data block to provide a target bit rate, $R_T$, of 160 Mbps, the raw SC-PHY data rate may first be determined. Assuming Binary Phase Shift Keying (BPSK) modulation the raw SC-PHY bit rate may be found to be 1540 Mbps through the following equation:

$$R_{sc}^{raw} = \left(\frac{L_{DB} - L_{GI}}{L_{DB}}\right)F_c \quad \text{Equation (7)}$$

The SC-PHY information data rate, however, may need to take into account the fraction of information bits coming from the LDPC encoder, which may be defined as:

$$R_e = \frac{L_{IW}}{L_{CW}} \quad \text{Equation (8)}$$

Using the two equations above the length of the information word per base LDPC codeword length required, $L_{IW}$, to support the target PHY-level data rate, $R_T$ may be determined as:

$$L_{IW} = \left\lceil \frac{R_T L_{CW} L_{DB}}{F_C(L_{DB} - L_{GI})} \right\rceil \quad \text{Equation (9)}$$
$$= \left\lceil \frac{160 * 672 * 512}{1760(512 - 64)} \right\rceil$$
$$= 70 \text{ bits}$$

With this in mind a modified MCS, referred to as "low MCS" is described herein. This modified MCS may integrate seamlessly with the existing SC-PHY MCSs. An LDPC code rate of ½ may allow for $$\frac{L_{CW}}{2}$$

information bits per base LDPC codeword. Given that the length of the information bits, $L_{IW}$, required for the modified low MCS may be lower than $$\frac{L_{CW}}{2},$$

along with the desire to integrate this modified MCS with the existing SC-PHY MCSs, an extension of the code word shortening and repetition used in the IEEE 802.11ad standard may be used. The next section describes the modifications to the SC-PHY coding procedure required to support the modified low MCS. The coding procedure uses the existing MCSs and may use LPDC code word size of $L_{FCW}=N_{CWLM}L_{CW}$, which is transparent to the coding procedure. The reason for making the LDPC codeword size larger is explained below.

First, the total number of information bits per codeword may be calculated. If low MCS is used, this implies $\rho > 2$ and is calculated as:

$$N_\rho = \left\lceil \frac{R_{BT}L_{FCW}L_{DB}}{F_C(L_{DB} - L_{GI})} \right\rceil, \quad \text{Equation (10)}$$

$$\rho = \frac{L_{FCW}R}{N_\rho}. \quad \text{Equation (11)}$$

Otherwise, $$N_\rho = \left\lceil \frac{L_{FCW}R}{\rho} \right\rceil \quad \text{Equation (12)}$$

Next, the number of data pad bits NDATA_PAD may be calculated using the number of LDPC codewords $N_{CW}$:

$$N_{CW} = \left\lceil \frac{8Length}{N_\rho} \right\rceil, \quad \text{Equation (13)}$$

$$N_{DATA\_PAD} = N_{CW}N_\rho - 8Length. \quad \text{Equation (14)}$$

$N_{CW_{min}}$ may be defined for BRP packets in IEEE 802.11ad. The scrambled PHY service data unit (PSDU) may be concatenated with $N_{DATA\_PAD}$ zeros. They may be scrambled using the continuation of the scrambler sequence that scrambled the PSDU input bits. The procedure for converting the scrambled PSDU data to LDPC codewords may depend on the repetition factor.

If $\rho=1$ (an 802.11ad MCS), the output stream of the scrambler may be broken into blocks of $N_\rho$ bits such that the mth data word is $(b_1^{(m)}, b_2^{(m)}, \ldots, b_{N_\rho}^{(m)})$, $m \le N_{CW}$. To each data word, $n-k=L_{FCW}-N_\rho$ parity bits may be added to create the codeword $c^{(m)}=(b_1^{(m)}, b_2^{(m)}, \ldots b_{N_\rho}^{(m)}, p_1^{(m)}, p_2^{(m)}, \ldots, p_{n-k}^{(m)})$ such that $Hc^{(m)T}=0$.

If $\rho=2$, which implies $$R = \frac{1}{2}$$

only with MCS1 as per IEEE 802.11ad, the data bits in each codeword $(b_1^{(m)}, b_2^{(m)}, \ldots b_{N_\rho}^{(m)})$ may be concatenated with $N_\rho$ zeros to produce a sequence in length of $2N_\rho$, $(b_1^{(m)}, b_2^{(m)}, \ldots, b_{N_\rho}^{(m)}, 0_1, \ldots, 0_{N_\rho})$. The LDPC codeword $c^{(m)}=(b_1^{(m)}, b_2^{(m)}, \ldots, b_{N_\rho}^{(m)}, 0_1, \ldots, 0_{N_\rho}, p_1^{(m)}, p_2^{(m)}, \ldots, p_{2N_\rho}^{(m)})$ may be created by generating the parity bits $p_1^{(m)}, p_2^{(m)}, \ldots, p_{2N_\rho}^{(m)}$ such that $Hc^{(m)T}=0$, where H is the parity matrix for rate ½ LDPC coding specified in IEEE. Bits $N_\rho+1$ through $2N_\rho$ of the codeword c may be replaced with bits from the sequence $b_1^{(m)}, b_2^{(m)}, \ldots, b_{N\rho}^{(m)}$ XORed by a PN sequence that is generated from the LFSR used for data scrambling as defined in IEEE. The LFSR may be initialized to the all ones vector and reinitialized to the same vector after every codeword.

Figure 30A:
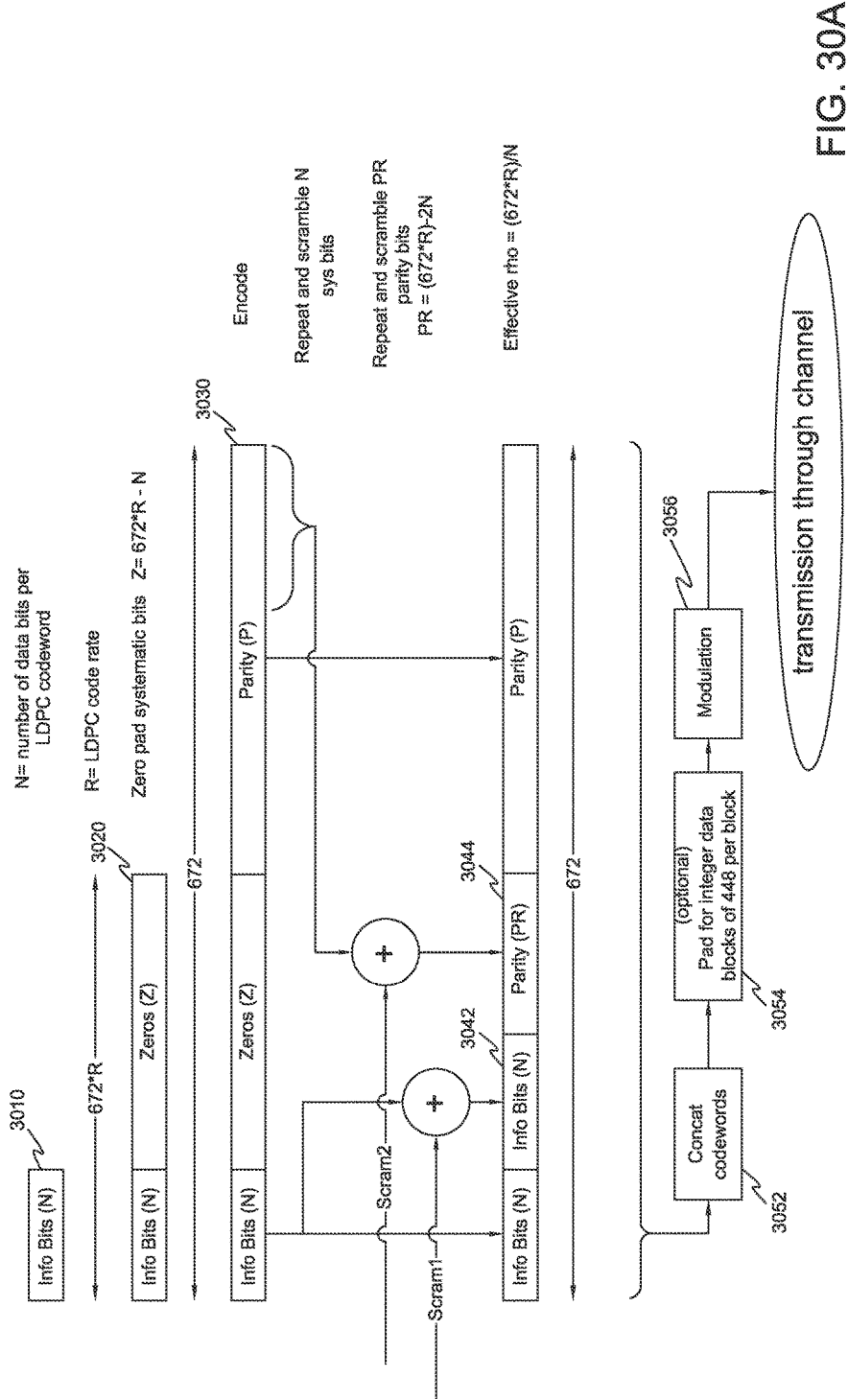
FIG. 30A is a diagram of example encoder bit handling for low MCS.

FIG. 30A is diagram of an example encoder for bit handling for low MCS. If ρ>2 this may indicate a low MCS condition. In this case, the output stream of the scrambler may be broken into blocks 3010 of $N_\rho$ bits such that the mth data word is $(b_1^{(m)}, b_2^{(m)}, b_{N_\rho}^{(m)})$, $m \le N_{CW}$. For example a R value of R=½ may be used, but there may a range of applicable values. Each data word may be concatenated with $N_z = (L_{FCW}R - N_\rho)$ zeros 3020 to produce the following: $(b_1^{(m)}, b_2^{(m)}, \ldots b_{N_\rho}^{(m)}, 0_1^{(m)}, 0_2^{(m)}, \ldots, 0_{N_z}^{(m)})$. The LDPC codewords $c^{(m)} = (b_1^{\rho(m)}, b_2^{(m)}, \ldots b_{N_\rho}^{(m)}, 0_1^{(m)}, 0_2^{(m)}, \ldots 0_{N_z}^{(m)}, p_1^{(m)}, p_2^{(m)}, \ldots, p_{L_{FCW}(1-R)}^{(m)})$ may be created by generating the parity bits 3030 $(p_1^{(m)}, p_2^{(m)}, \ldots, p_{L_{FCW}(1-R)}^{(m)})$ such that $Hc^T = 0$, where H is the parity matrix for rate R LDPC coding specified in IEEE 802.11ad. Bits 3042 $N_\rho+1$ through $2N_\rho$ of codeword c may be replaced with bits from the sequence $(b_1^{(m)}, b_2^{(m)}, \ldots b_{N_\rho}^{(m)})$ XORed by a PN sequence that is generated from the LFSR used for data scrambling as defined in IEEE 802.11ad. The LFSR may be initialized to the all ones vector and reinitialized to the same all ones vector after every codeword. Parity bits 3044 $2N_\rho+1$ through $L_{FCW}R$ of codeword c may be replaced with bits from the sequence $(p_{PR}^{(m)}, p_{PR+1}^{(m)}, \ldots, p_{L_{FCW}(1-R)}^{(m)})$ XOR'ed by a PN sequence that is generated from the LFSR used for scrambling,) as defined in IEEE 802.11ad, where $PR = [(L_{FCW}(1-R)) - (L_{FCW}R - 2N_\rho+1)]$. The LFSR may be initialized to the all ones vector and reinitialized to the same vector after every codeword.

The codewords may then be concatenated 3052 one after the other to create the coded bits stream $c = (c_1, c_2, \ldots, c_{L_{FCW}N_{Cw}})$. The number of symbol blocks, $N_{BLKS}$, and the number of symbol block padding bits, $N_{BLK\_PAD}$, may be calculated as follows:

$$N_{BLKS} = \left\lceil \frac{N_{CW}L_{FCW}}{N_{CBPB}} \right\rceil, \text{ and} \quad \text{Equation (15)}$$

$$N_{BLK\_PAD} = N_{BLKS}N_{CBPB} - N_{CW}L_{FCW}, \quad \text{Equation (16)}$$

where $N_{CBPB}$ is number of coded bits per data block. $N_{CBPB}$ may be taken from IEEE 802.11ad.

The value for $N_{BLKS}$ may be at most equal to the granted $N_{BLKS}$, i.e., the number of data blocks contained the grant for the packet being coded as described above. The coded bit stream may be concatenated with $N_{BLK\_PAD}$ zeros 3054. They may be scrambled with a continuation of the scrambler sequence that scrambled the PSDU data, and modulated 3056 as per IEEE 802.11. The bit streams may then be transmitted through a channel.

Figure 30B:
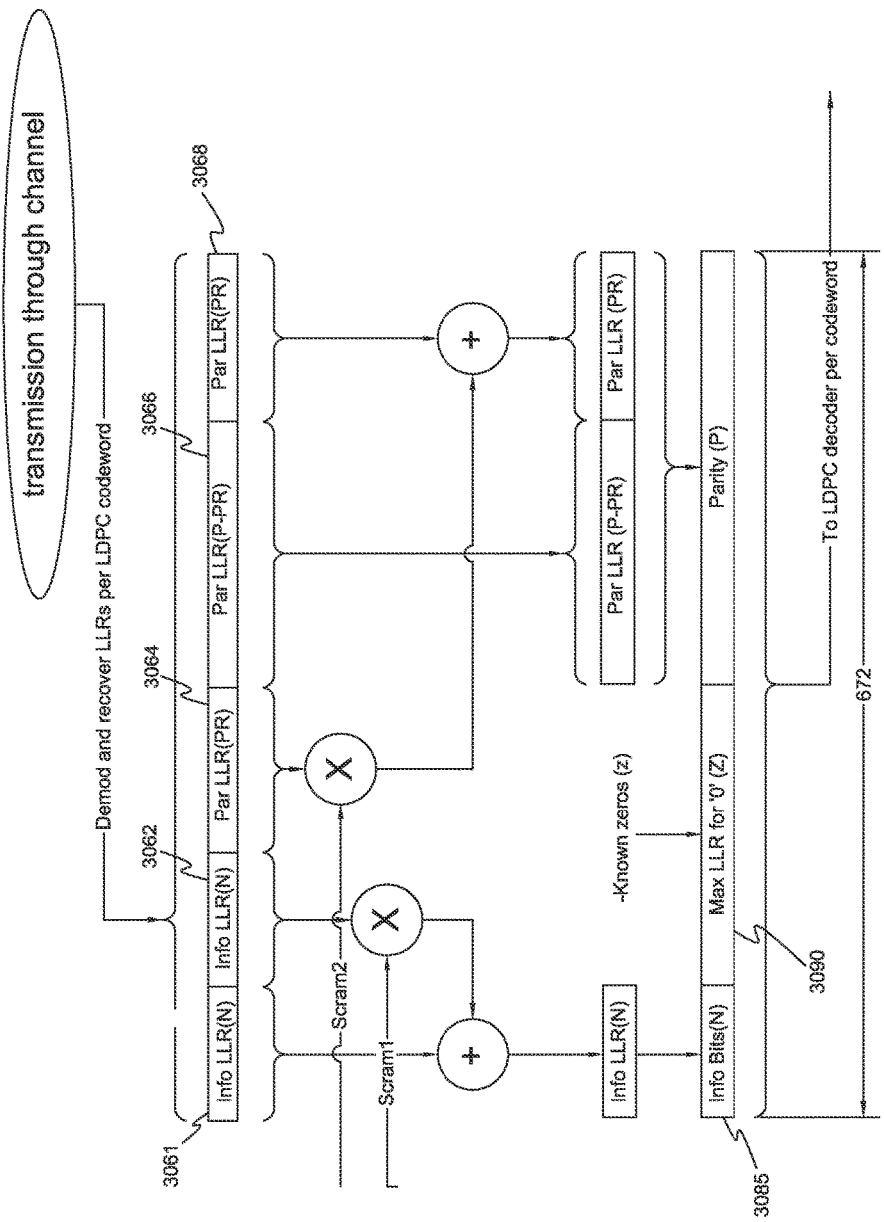
FIG. 30B is a diagram of example decoder bit handling for low MCS.

FIG. 30B is diagram of an example decoder for bit handling for low MCS. The decoding process is effectively the reverse of the encoding process described above. After demodulation, the demodulated sequence may contain Information LLRs (for example, 3061 and 3062) and Parity LLRs (for example, 3064, 3066 and 3068). The Information LLRs may then be descrambled, resulting in 3085. The resulting information bits 3085 may then be combined with Zeroes 3090 and the parity bits. This combination may then be send to the LDPC decoder per codeword.

Longer LDPC codewords are now considered. As mentioned above, the backhaul use case generally has more data available per packet than a typical IEEE 802.11ad use case. The performance generally improves as codeword length increases. For these reasons, in examples longer LDPC codewords may be supported for these backhaul use cases.

In a first example, LDPC codeword length and rate options may be broadcast in beacon message 1 (no negotiation, system wide). In a second option, LDPC codeword length and rate options may be negotiated in discovery message exchange (a.k.a. beacon message exchange). Node capabilities may be determined from its unique ID in the BRI. The network/existing node may decide on the LDPC length based on capabilities of new and existing node and other things, and may include instructions in the beacon ACK. This may be done on a per link basis. LDPC word size may be indicated on a per data packet basis, either in the control message exchange or in the data packet header. In a proposed example, supported Forward error correction (FEC) methods may be included in the capabilities LUT. The attached nodes/network may determine the FEC capabilities from the signaled unique ID of the new node (learn from BRI). All connected nodes may then know the capacities of their neighbors. The FEC method (e.g., LDPC codeword length) may be signaled in the data header per packet.

Considering HARQ and end-to-end latency, the mesh backhaul network may be required to support very low latency packet delivery over at least 5 hops through the mesh. The latency budget may require packets to be delivered within 5 ms with high probability when there are no queuing delays. The system may be designed such that failed packets may be retransmitted in the SI following the SI where the failure occurred. For example, if each SI is 0.5 mSec, the system may permit up to a total of 5 retransmissions of the packet in route to the destination node.

HARQ may be used as a means to ensure this can be achieved without resorting to setting very low target packet error rates (PERs) on each link which could limit the ultimate achievable throughput. Such retransmission may be identical copies to support chase combining or may use multiple redundancy versions.

In chase combining, either soft bits or soft symbols may be buffered for retransmission combining. When a first transmission fails, the re-transmission may be combined (soft bit-wise or symbol-wise addition, possibly weighted for varying SNR between transmissions). In the Additive White Gaussian Noise (AWGN) channel and a given target first transmission PER, the retransmission may enjoy nearly 3 dB of SNR improvement for the purpose of estimating the PER on the retransmission. For example the LDPC codes may cause the 3 dB improvement results to be better PER than simple automatic repeat request (ARQ) retransmission. An example improvement in end-to-end packet delivery for line of sight (LOS) channels with minimal fading is estimated in FIG. 31 with and without HARQ.

The following section gives examples of simulation descriptions. In one example AWGN, the retransmit probability is nearly 3 dB better than the 1st transmit probability for Chase combining, however 2.5 dB will be assumed to allow some margin for practical scenarios. If it is assumed that channels vary slowly compared to the retransmit rate, which is typical for the BH case, then a conservative estimate for the SNR variation for the retransmission should be limited to ~+/−1.5 dB. The overall SNR improvement for the retransmission may then be calculated to be about 1.9 dB.

Each link may use link adaptation techniques to achieve a target PER. For HARQ, the PER of a retransmission may then be computed by interpolating a PER curve from the target PER point to the PER that results with 1.5 dB better SNR. In other words, the retransmit PER may be estimated from the rate ½ LDPC curves by increasing the effective SNR by 1.5 dB relative to the SNR required to obtain the target 1st transmission PER in the legend.

For ARQ, the statistical behavior for each transmission and retransmission may be considered to be independent and identically distributed (iid). With these assumptions ARQ lends itself to analytical analysis similar to a Bernoulli trial as follows. Given the iid characteristics as mentioned above, the probability of a packet being successfully delivered to the final destination node in exactly $N_{SI}$ SIs using $N_H$ hops and having failed $N_F$ times along the way, may be written as follows:

$$\tilde{P}_s^{E2E}(N_{SI}, N_H, N_F) = (P_s)^{N_H}(1-P_s)^{N_{SI}-N_H}\left(\binom{N_H}{N_F}\right), \quad \text{Equation (17)}$$

where $\tilde{P}_s^{E2E}(N_{SI}, N_H, N_F)$ is the probability of a successful end-to-end packet delivery in exactly $N_{SI}$ SIs, using $N_H$ hops and having $N_F$ failures along the way; $N_{SI}$ is the number of SIs used for the end-to-end transmission; $N_H$ is the number of Hops used for the end-to-end transmission; $N_F$ is the number of single-hop failures for the end-to-end transmission, each requiring a retransmission; $P_S$ is the probability of a successful single-hop transmission; and $$\left(\binom{n}{k}\right)$$

is the multiset coefficient, which represents the number of ways that the $N_F$ failures could have occurred over the $N_H$ hops, which is equal to:

$$\frac{(n+k-1)!}{k!(n-1)!}.$$

Furthermore, the probability of a packet being successfully delivered to the final destination node within $N_{SI}$ SIs using $N_H$ hops and having failed $N_F$ times along the way may be found by summing the above probabilities for all successes. The summation starts from $N_H$, which is the minimum number of SIs required to deliver the packet to the destination node, and ends at the maximum number of SIs chosen, $N_{SI}^{max}$:

$$P_S^{E2E}(N_{SI}^{max}, N_H, N_F) = \sum_{i=N_H}^{N_{SI}^{max}} \tilde{P}_s^{E2E}(i, N_H, N_F). \quad \text{Equation (18)}$$

Finally, the probability of the packet not being delivered by the $N_{SI}^{max}$ SI may be written as:

$$P_F^{E2E}(N_{SI}^{max}, N_H, N_F) = [1 - P_S^{E2E}(N_{SI}^{max}, N_H, N_F)] \quad \text{Equation (19)}$$

$$= \left[1 - \sum_{i=N_H}^{N_{SI}^{max}} (P_s)^{N_H}(1-P_s)^{i-N_H}\left(\binom{N_H}{N_F}\right)\right].$$

A closed form expression for the probability of a successful end-to-end packet delivery in the HARQ case has not yet been identified and so simulations may be required. To get below $10^{-7}$ probability of a packet not being received before 10 transmission time intervals (TTIs) in a 5 hop route, ARQ may require a PER target ~2%, but with HARQ a PER target greater than 20% may be supported. The scenario may be further extended to include errors in both link adaptation and accounts explicitly for channel quality variations between 1st and 2nd transmission.

The use of multiple redundancy versions may further improve HARQ performance, but for the backhaul, these gains may be expected to be smaller than for access links. In an example, multiple redundancy versions may be used.

Figure 31:
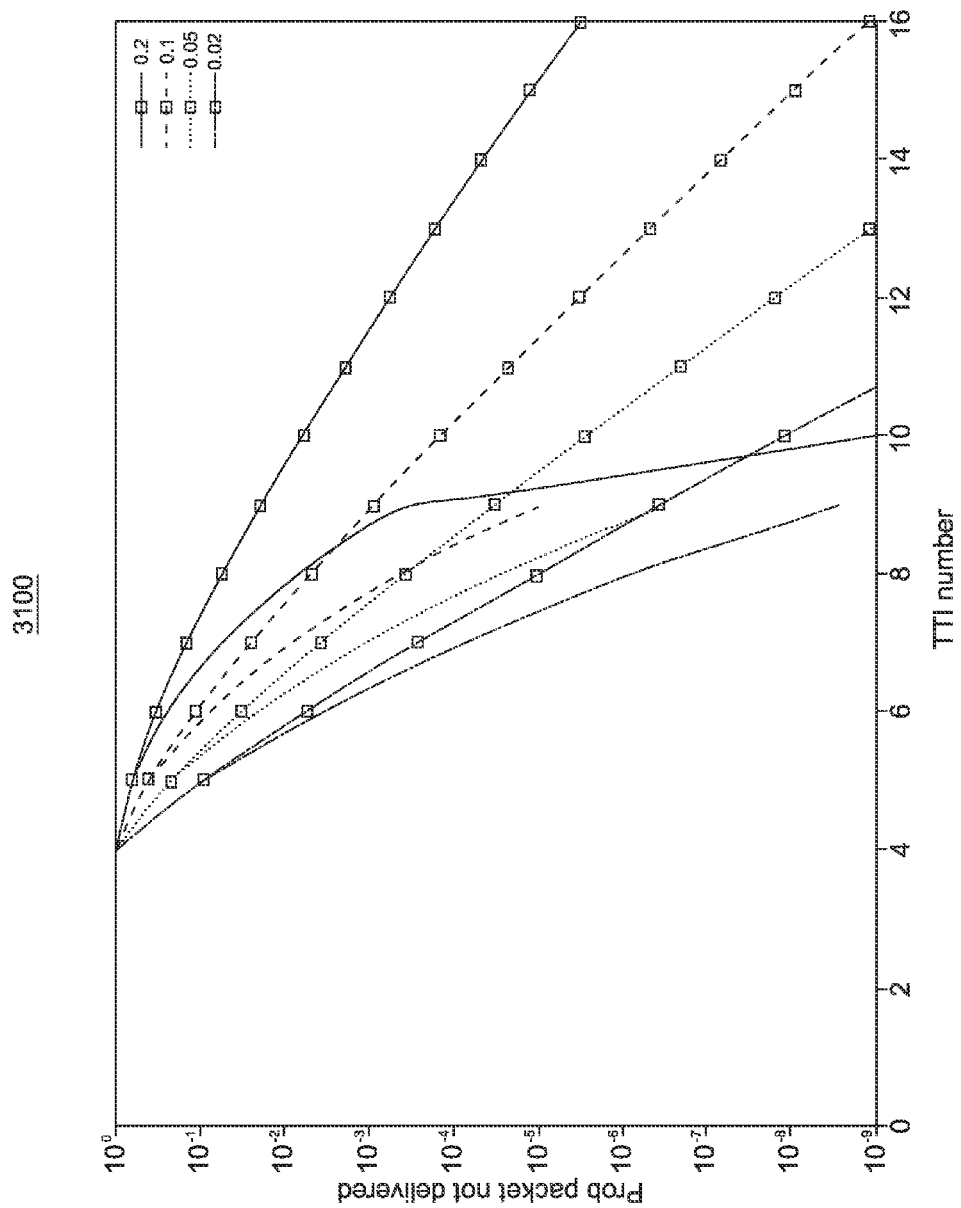
FIG. 31 is diagram of an example Packet Delivery Time Probability with HARQ/ARQ.

FIG. 31 is diagram of an example Packet Delivery Time Probability with HARQ/ARQ. The graph 3100 depicts the probability of a packet not delivered in N TTIs for different PER and 5 hops.

Variable-length preambles for Control Period messages are relevant for backhaul networks due to the static nature of the nodes, and due to relatively high periodicity of message exchange between the nodes. These two conditions imply that the channel between the mmW backhaul nodes remains fairly static between successive message exchanges, and a shorter preamble would suffice for the AGC settling, channel estimation, and other related purposes. Although this variable-length preamble idea is described here in the context of backhaul mesh nodes, it may be applied whenever the change in channel conditions between the transmitting and receiving nodes is less than a particular threshold. This procedure may allow node pairs to determine the best preamble size, based on local channel conditions. In addition it may reduce the control overhead due to the preamble significantly, which is a direct overhead for each PHY layer frame transmission.

Determining the optimal preamble size so as not to impact performance of AGC (channel estimation etc.), and at the same time reducing the preamble size taking into account the static nature of the backhaul links may significantly improve the overall good-put of the system. Further, taking into account when the last data transmission has occurred may further improve the overall good-put of the system.

Figure 32A:
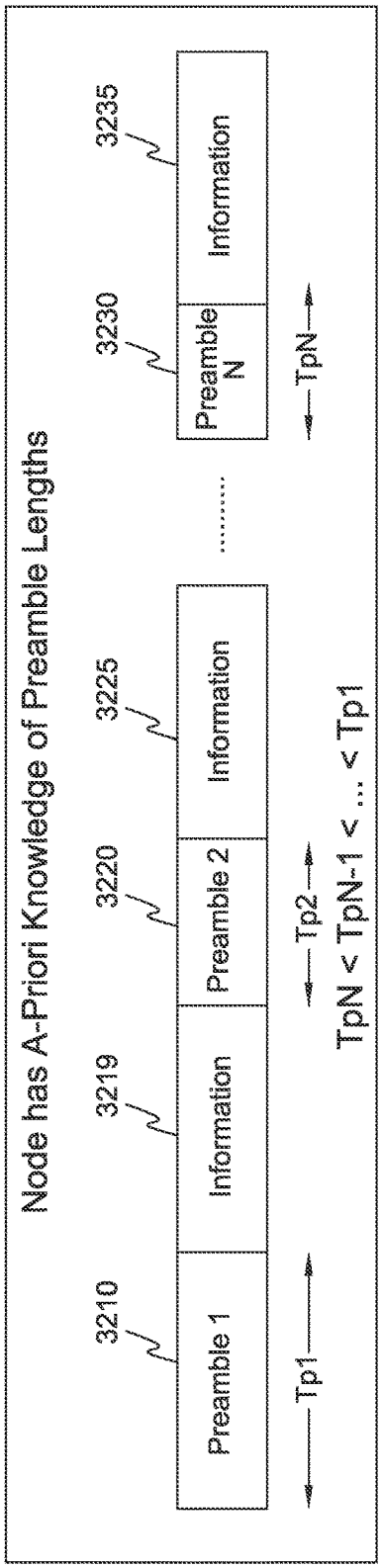
FIG. 32A is a diagram of an example of a variable-length preamble.

FIG. 32A is a diagram of an example of a variable-length preamble. In an example variable-length preamble, the node may have a-priori knowledge of preamble lengths. In this example, when the requirements of the time difference between successive packet transmissions of the same pair of nodes are satisfied, the transmitter may implicitly switch to a shorter length preamble 3220 for the second and subsequent packet N, as long as the duration between successive transmissions is less than some predefined value. In an example a first packet may contain Preamble 1 3210 and Information 3219 and a subsequent packet may contain Preamble 2 3220 and Information 3225. Further, later packets may follow, through a packet which may contain Preamble N 3230 and Information 3235. In an example, the transmitter may switch to a shorter preamble for Preamble 2 3220 and Preamble N 3230, if the duration is less than the predefined value. This predefined value may be signaled as part of initial configuration or can be loaded from memory. The transmitter may choose the appropriate preamble length based on the duration since the last successful transmission to the same receiving node. In a further example, signals regarding the initial preamble length may be received from a central node. In a further example, the preamble length may be based on the content of the transmission. Therefore, there may be multiple possible preamble lengths and the transmitter may choose the appropriate one depending on one or more of several factors.

The receiver may also determine the preamble size in the next transmission from the same node in a similar manner. In an example, the packet is correctly received by the receiver, but an acknowledgement sent in response is not received at the first node. The first node may use a longer preamble if a short preamble timer has elapsed) in the next transmission because the first node failed to receive the acknowledgement. Nevertheless, the second node may still expect a short preamble. In this circumstance, the second node may simply ignore the remaining part of the preamble. If the acknowledgement is received at the first node, then the first node may continue to use the shorter preamble. In a further example, the transmitter may also know the appropriate preamble length based upon the estimated channel conditions, and adjust the preamble length accordingly. In a further example, the transmitter may adjust the preamble length based on local channel conditions.

Figure 32B:
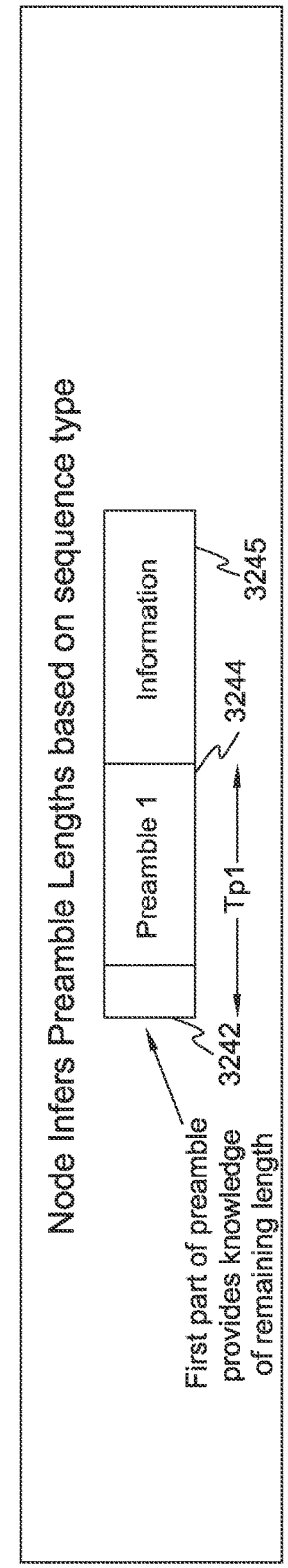
FIG. 32B is a diagram of another example of a variable-length preamble.

FIG. 32B is a diagram of another example of a variable-length preamble. In this second example, the explicit signaling of the preamble length may be at the start of the preamble itself. Accordingly, the preamble may have two parts the first part of the preamble 3242 may indicate the length of the second part 3244. Information 3245 may follow the second part of the preamble 3244. The transmitter may use one out of N possible sequences for the first part of the preamble. The different sequences correspond to N different lengths for the second part of the preamble. The receiver may then determine the preamble length by cross-correlating the first part of the preamble against all N possible sequences. Explicit signaling of the preamble length may make it possible for the transmitter to adapt the preamble length according to local channel conditions. In a further example, the transmitter may also adapt the preamble length to estimated channel conditions. It may also be desirable for the codes used to determine the preamble length to have good auto correlation properties (low non-zero lag peaks) and low cross correlation peaks between members of the possible sequences.

In the third example, the requested preamble length may be signaled by a mesh node to its peer neighboring node. This signaling may either in absolute terms or relative to the preamble length used for the previous transmission from the peer node. This field may be included in the Physical layer (PHY) or Physical Layer Convergence Protocol (PLCP) Header. For example, one example may reserve two bits in the PHY/PLCP Header to indicate requested change in preamble size. Here 00 may represent no change, 01 may represent request for longer preamble and 10 may represent request for shorter preamble size. Accordingly, Node 1 may set the value of this field to 10 to request Node 2 to reduce the preamble length in its next transmission to Node 1, if time limitations are satisfied.

Conversely, if Node 1 fails to correctly decode the previous transmission from Node 2 due to insufficient preamble size, resulting in incorrect channel estimation or failure of AGC to settle, it may request longer preamble in the next transmission from Node 2 by sending a Null-Data frame with the Preamble Length field in the PHY/PLCP Header set to 01. This may provide a closed-loop mechanism for the nodes to adjust the preamble size according local channel conditions. If the duration between successive data transmissions to the same receiving node is larger than a particular limit, then the transmitting node may default to a larger preamble size, irrespective of the request from the receiving node in the previous transmission. In another variation, the requesting node may include the requested preamble length in absolute terms, but this may need a larger field in the Header depending on the number of active preamble sizes.

In example disclosed herein, modified complementary Golay codes are used. The Golay sequences and complementary pairs used in the preamble of the backhaul system may be similar to the ones used in IEEE 802.11ad and may be composed of 128-chip long sequences. Further the code may have a recursive construction. However, the system may support the use of multiple such Golay building blocks and the exact codes used may be selected to have good properties relative to IEEE 802.11ad and to each other. The Golay sequences used in the backhaul system may be designed to have low correlation at any lag to the Ga and Gb sequences of 802.11ad, good auto correlation properties (low non-zero lag peaks), and low cross correlation peaks between members of the possible Golay sequences.

During discovery, each node may be given an index that points to one or more sets of Golay sequences (e.g., a Ga and Gb Golay complementary pair (GCP) of 128 chips). The index may be node or link specific. There are 8-16 different sets of GCPs available for use. During discovery, the new node may be told which Golay index to use to determine which sequences it will use to transmit.

There are $2^M M!$ Golay codes (with GCPs) that can be generated from recursive or direct construction For M=7, that is just over half a million and within reach of exhaustive search for codes with low correlation to the IEEE 802.11ad 128 chip codes.

Figure 33:
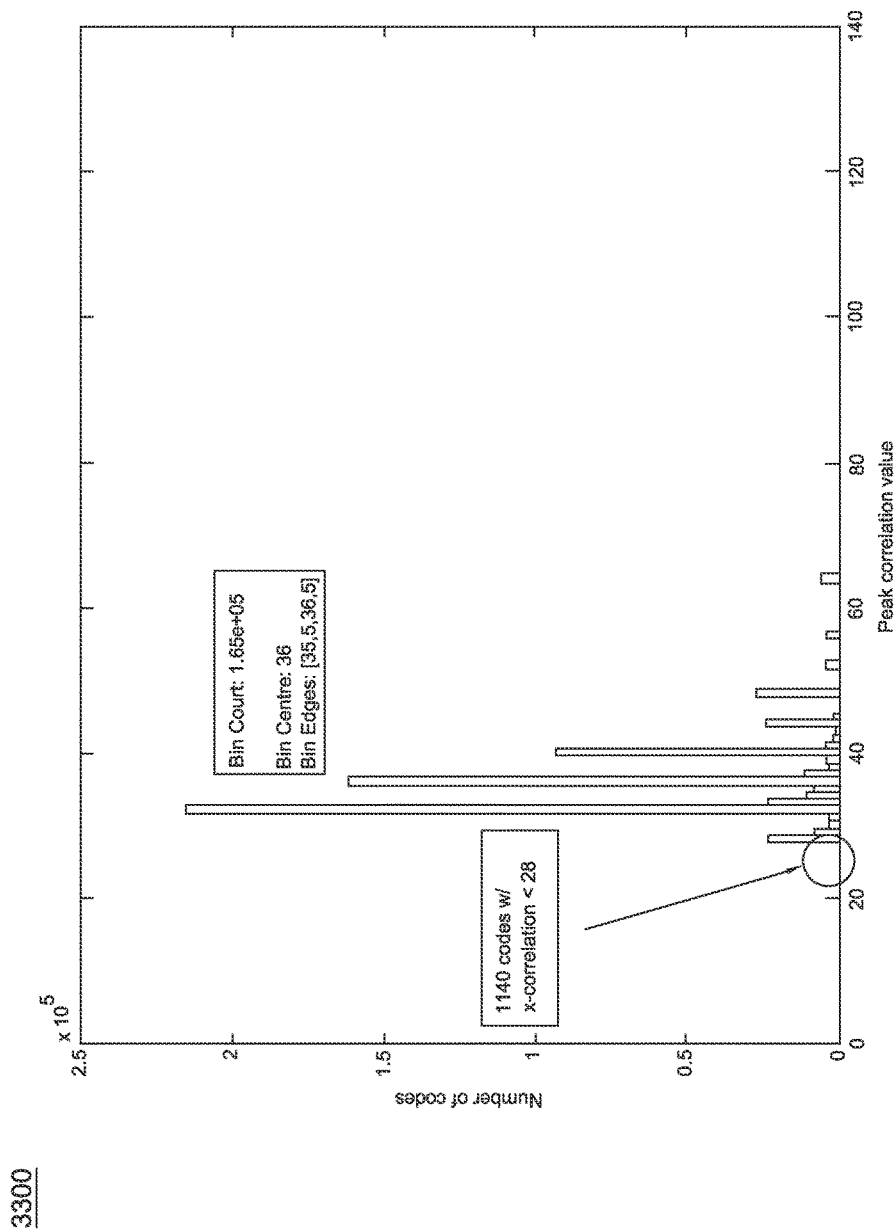
FIG. 33 is a diagram of an example distribution of peak correlations to the IEEE 802.11ad Golay codes.

FIG. 33 is a diagram of an example distribution of peak correlations to the 802.11ad Golay codes. Distribution 3300 shows a peak value distribution of a set of all of the Golay codes of length 128 that can be constructed from the Direct construction method. A set of codes with low cross correlations between IEEE 802.11ad Ga and Gb may be chosen in a further example. Of these codes, 1140 have a peak cross correlation of less than 28 (the minimum correlation values in 24, but the set is small).

From this set, a smaller set of Ga sequences may be found that have low non-zero lag auto correlation peaks so that they may make for good sequences for packet detection without use of the complementary pair. For example, a set of codes is desired such that each of the codes has a maximum peak no more than 5 greater than the sequence with the minimum maximum peak. This may reduce the set to about 190 sequences. While this set is drastically reduced from the original half million, finding a good set of codes, for example 8-16 codes, with good cross correlation properties may not be required as a random search produces reasonably low cross correlation sets. The delays and weights for an exemplary set of 8 GCPs with peak cross correlation of 28 or less is shown in Table 19 and Table 20. Another set of 16 GCPs with peak cross correlation of 34 or less is shown in Table 21 and Table 22. Better search methods may be used to further refine this set but may not be required as the initial selection of Golay codes only show that 'good enough' codes may indeed be found.

After the initial setting of the Golay index, the node may be reconfigured to use a different Golay index via higher layer signaling. The selection of codes is meant to minimize the effects of large cross corrections that could impact packet detection and timing estimates as well as channel estimation due to interfering sequences from IEEE 802.11ad networks, from other nodes within the backhaul network, or from nodes in other backhaul.

TABLE 19

Example Set of Delays for the Generation of 8 GCP with Mutual Xcorr <= 28

| D1 | D2 | D3 | D4 | D5 | D6 | D7 | D8 |
|---|---|---|---|---|---|---|---|
| 1 | 1 | 4 | 4 | 1 | 16 | 1 | 1 |
| 64 | 64 | 64 | 64 | 4 | 8 | 2 | 8 |
| 8 | 8 | 1 | 1 | 16 | 4 | 16 | 16 |
| 2 | 2 | 2 | 2 | 64 | 64 | 8 | 4 |
| 16 | 16 | 8 | 8 | 2 | 32 | 64 | 2 |
| 4 | 4 | 32 | 32 | 32 | 1 | 32 | 64 |
| 32 | 32 | 16 | 16 | 8 | 2 | 4 | 32 |

TABLE 20

Example Set of Weights for the Generation of 8 GCP with Mutual Xcorr <= 28

| W1 | W2 | W3 | W4 | W5 | W6 | W7 | W8 |
|---|---|---|---|---|---|---|---|
| 1 | 1 | -1 | -1 | 1 | -1 | -1 | 1 |
| 1 | 1 | -1 | -1 | -1 | 1 | 1 | -1 |
| -1 | -1 | -1 | -1 | 1 | 1 | 1 | -1 |
| -1 | -1 | -1 | -1 | -1 | -1 | 1 | -1 |
| -1 | -1 | -1 | -1 | 1 | -1 | 1 | -1 |
| -1 | -1 | -1 | -1 | 1 | 1 | 1 | 1 |
| 1 | -1 | -1 | 1 | -1 | -1 | -1 | 1 |

TABLE 21

Example Set of Delays for the Generation of 16 GCP with Mutual Xcorr <= 34

| D1 | D2 | D3 | D4 | D5 | D6 | D7 | D8 | D9 | D10 | D11 | D12 | D13 | D14 | D15 | D16 |
|---|---|---|---|---|---|---|---|---|---|---|---|---|---|---|---|
| 1 | 1 | 16 | 2 | 16 | 1 | 1 | 1 | 1 | 4 | 1 | 1 | 1 | 1 | 16 | 16 |
| 2 | 64 | 8 | 64 | 8 | 64 | 2 | 64 | 16 | 64 | 4 | 64 | 8 | 16 | 8 | 8 |
| 64 | 8 | 1 | 1 | 1 | 2 | 4 | 16 | 4 | 1 | 16 | 8 | 16 | 2 | 1 | 4 |
| 8 | 2 | 64 | 32 | 64 | 32 | 64 | 2 | 64 | 2 | 64 | 2 | 4 | 32 | 64 | 64 |
| 16 | 16 | 32 | 16 | 32 | 16 | 32 | 8 | 2 | 8 | 2 | 16 | 2 | 4 | 32 | 32 |
| 4 | 4 | 4 | 8 | 4 | 8 | 8 | 32 | 8 | 32 | 32 | 4 | 64 | 8 | 4 | 1 |
| 32 | 32 | 2 | 4 | 2 | 4 | 16 | 4 | 32 | 16 | 8 | 32 | 32 | 64 | 2 | 2 |

TABLE 22

Example Set of Weights for the Generation of 16 GCP with Mutual Xcorr <= 34

| W1 | W2 | W3 | W4 | W5 | W6 | W7 | W8 | W9 | W10 | W11 | W12 | W13 | W14 | W15 | W16 |
|---|---|---|---|---|---|---|---|---|---|---|---|---|---|---|---|
| 1 | -1 | -1 | 1 | -1 | 1 | 1 | -1 | -1 | -1 | 1 | 1 | 1 | -1 | -1 | -1 |
| 1 | 1 | -1 | -1 | -1 | -1 | -1 | 1 | -1 | -1 | -1 | -1 | 1 | -1 | 1 |
| 1 | 1 | -1 | 1 | 1 | -1 | 1 | 1 | 1 | -1 | 1 | -1 | 1 | -1 | -1 | -1 |
| -1 | -1 | -1 | 1 | -1 | 1 | -1 | -1 | 1 | -1 | -1 | -1 | -1 | -1 | -1 | -1 |
| -1 | -1 | -1 | 1 | -1 | -1 | 1 | -1 | -1 | 1 | -1 | 1 | 1 | 1 | -1 | 1 |
| -1 | -1 | 1 | -1 | -1 | -1 | 1 | 1 | -1 | 1 | 1 | 1 | 1 | -1 | 1 | 1 |
| -1 | 1 | -1 | -1 | 1 | 1 | -1 | -1 | -1 | 1 | 1 | 1 | 1 | 1 | 1 | 1 |

The 64 chip code used in the GI period may be derived from the Golay code indicator as well. A similar procedure may be used to find appropriate sets of Ga-64 can be used. Power control procedures may also be updated in a further example.

During the creation of each of the 224 bit-codewords, parity bits may be punctured from the center of the LDPC parity bit field plus some offset. $PO_{max}$ represents the maximum offset, or PO, relative to the center of the parity bit field of the LDPC codeword that can be supported. In order to gain insight into how the particular choice of PO affects the performance a number of simulations were configured where PO was swept over a given range. For reference a simulation was also run where PO was kept constant. The configurations of the various example simulations were as shown in Table 23.

TABLE 23

PO Sweep Test Configurations

| Simulation Number | Code Rate [R] | Message Size [Bits] | PO values |
|---|---|---|---|
| 0 | ½ | 46 | $PO_{max}$ |
| 1 | ½ | 46 | $\{-PO_{max}: PO_{max}\}$ |
| 2 | ⅝ | 46 | $\{-PO_{max}: PO_{max}\}$ |
| 3 | ¾ | 64 | $\{-PO_{max}: PO_{max}\}$ |

Note:
Simulation 3 is the same as the SC-PHY header used on 802.11ad

Figure 34:
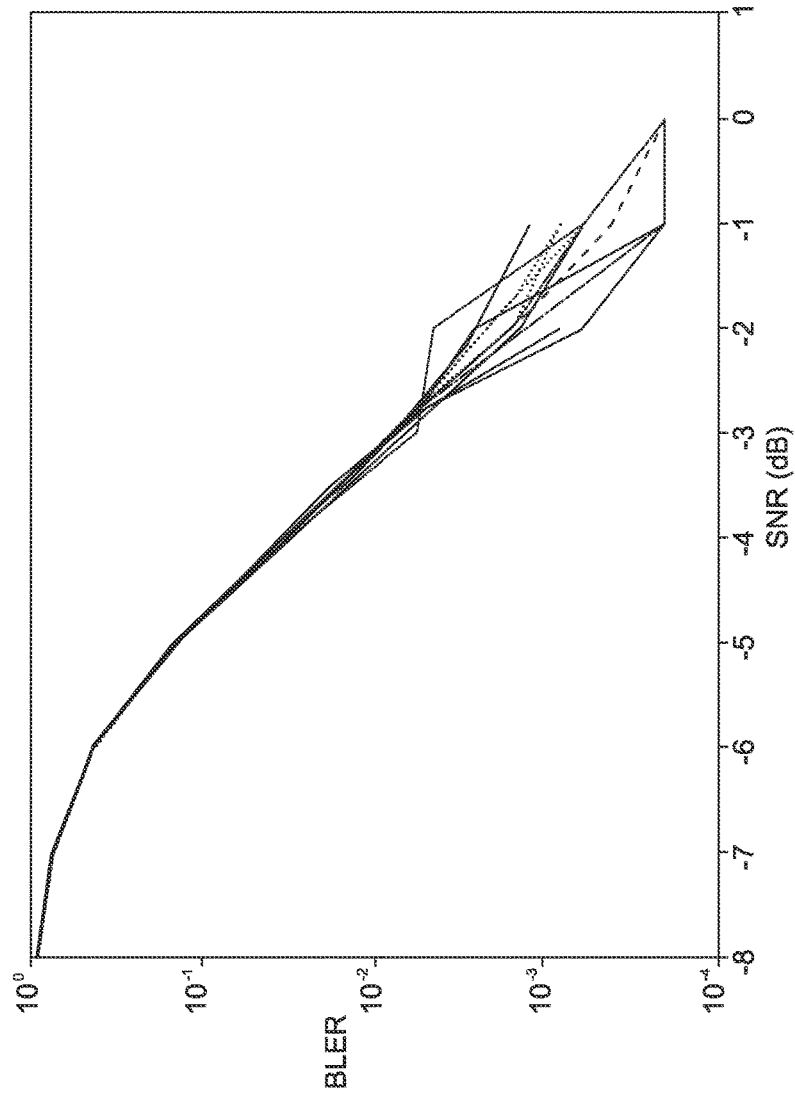
FIG. 34 is a diagram of an example result from a simulation.

FIG. 34 is a diagram of an example result from a simulation. Result 3400 may show results with a shortened code and repetition, a rate of 0.5 LDPC, 46 msgBits and 5000 Num blocks. Result 3400 may further show a reference example of multiple runs of the same PO. Result 3400 may also show there may be less of a variation in performance of simulation 0 compared to simulations 1, 2 and 3. This observation validates the conclusions that will be drawn from simulations 1, 2 and 3.

Figure 35:
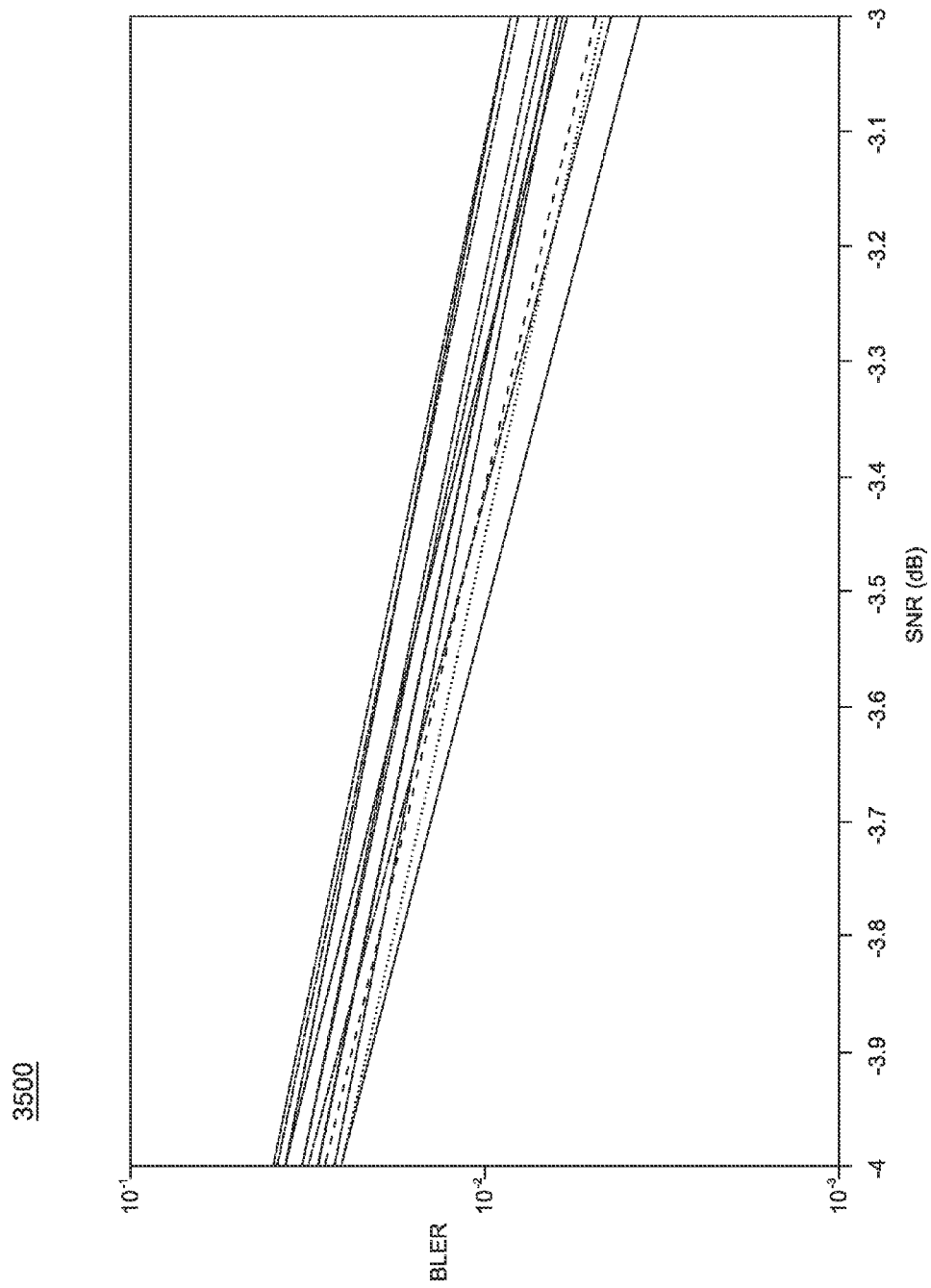
FIG. 35 is a diagram of an example result from a simulation.

FIG. 35 is a diagram of an example result from another simulation. Result 3500 may show results with a shortened code and repetition, a sweep of POs, a rate of 0.5 LDPC, 46 msgBits and 5000 Num blocks. Result 3500 shows the performance spread of simulation 1 may be about ½ dB at 1% block error rate (BLER). Result 3500 may also show R of ½, a message size of 46 and PO=-POmax: -10.

Figure 36:
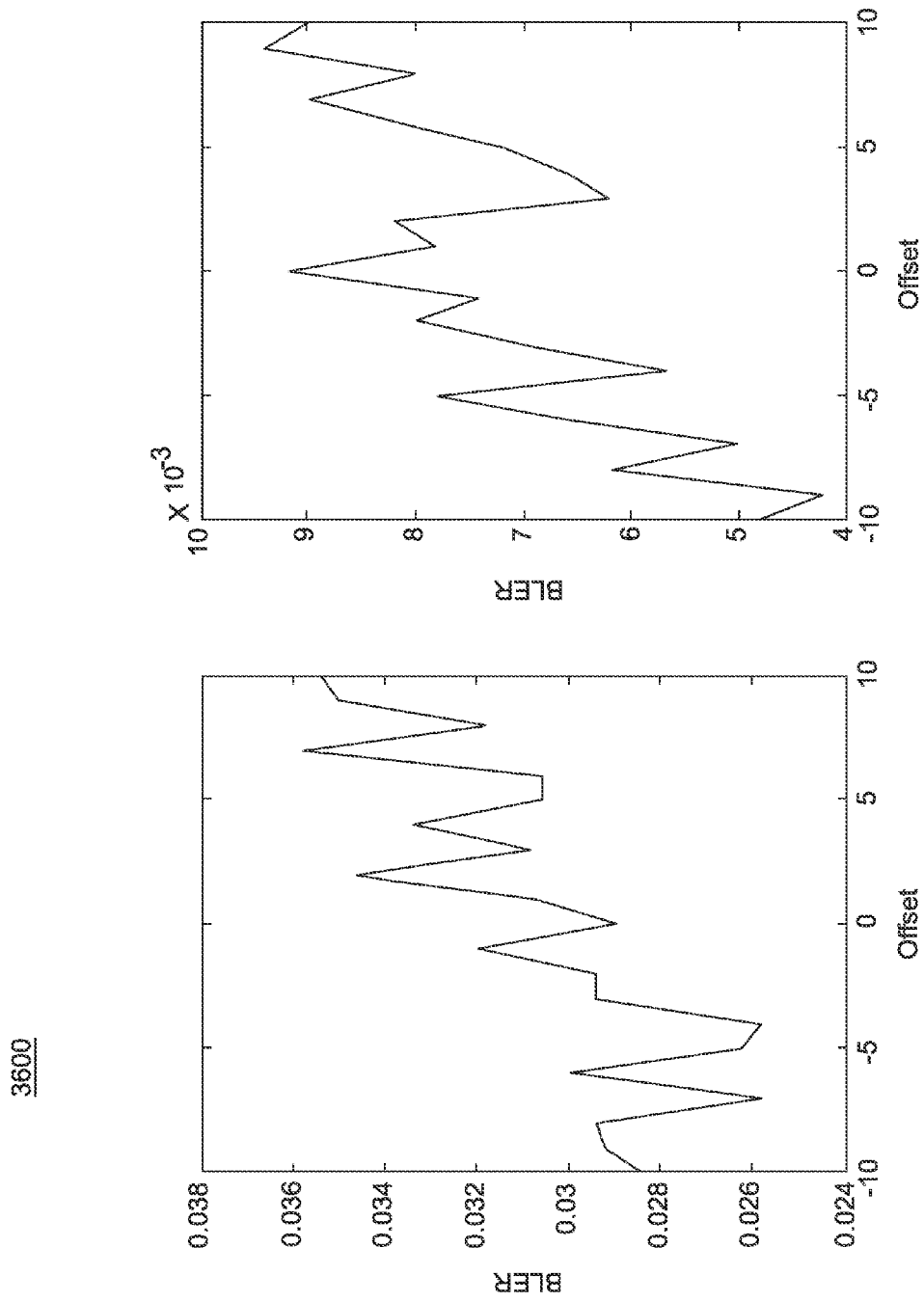
FIG. 36 is a diagram of another example result from a simulation.

FIG. 36 is a diagram of another example result from another simulation. Result 3600 of simulation 1 highlights that $-PO_{max}$ is the best choice in the typical sense. Result 3600 may show BER at -4 dB, -3 dB SNR versus PO and message bit=46 rate=0.5. Result 3600 may also show BLER plotted versus PO at two different SNRs.

Figure 37:
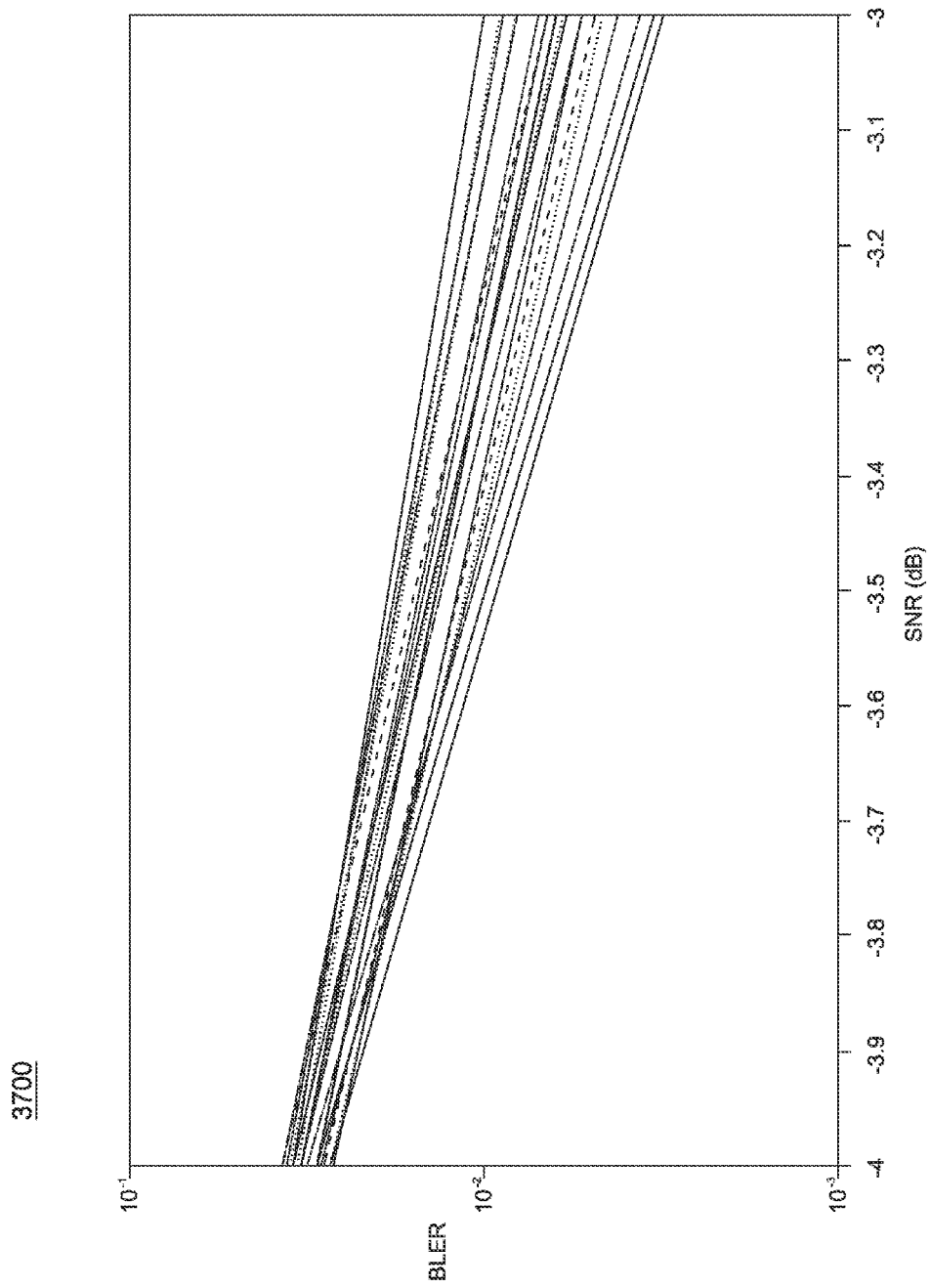
FIG. 37 is a diagram of an example result from yet another simulation.

FIG. 37 is a diagram of an example result yet another simulation. Result 3700 may show results with a shortened code and repetition, a sweep of POs, a rate of 0.625 LDPC, 46 msgBits and 5000 Num blocks. Result 3700 of simulation 2 shows a similar performance spread as in simulation 1. Result 3700 may also show R of ⅝, a message size of 46 and PO=-POmax: -10.

Figure 38:
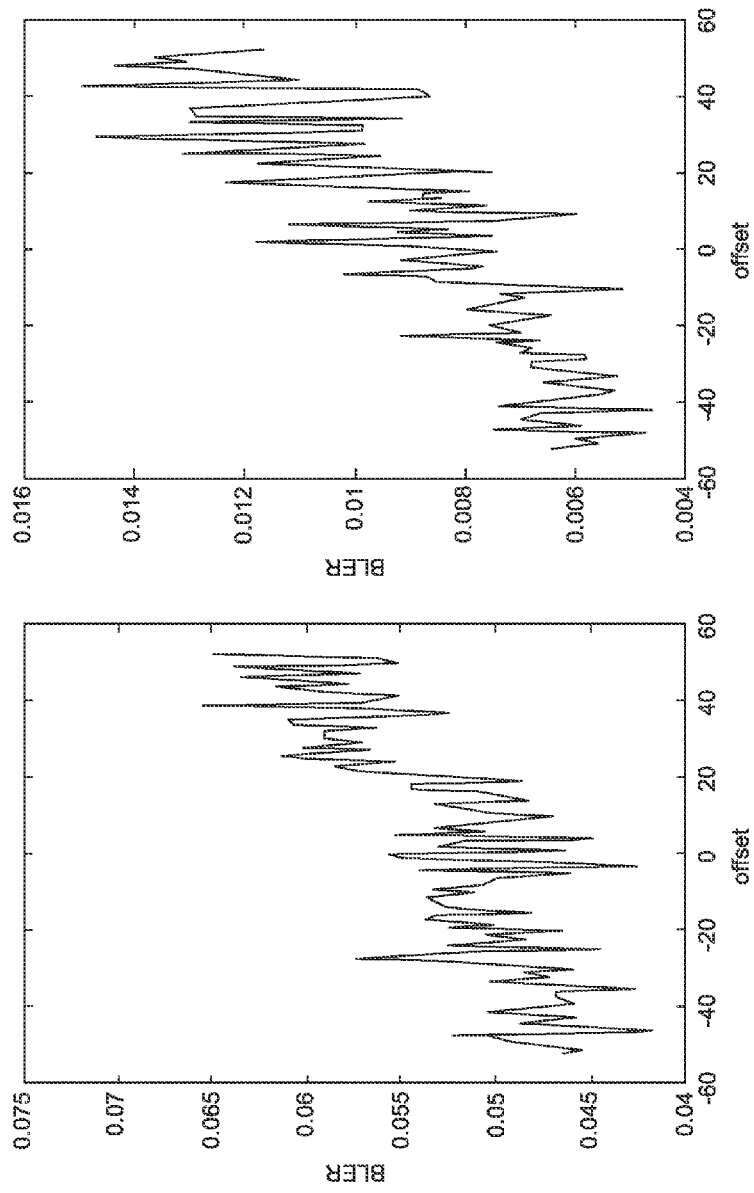
FIG. 38 is a diagram of an example of another result from another simulation.

FIG. 38 is a diagram of an example of another result from another simulation. Result 3800 of simulation 2 shows that $-PO_{max}$ may be the best choice in the typical sense. Result 3800 may show BER at -4 dB, -3 dB SNR versus PO and message bit=46 rate=0.625. Result 3800 may also show BLER plotted versus PO at two different SNRs.

Figure 39:
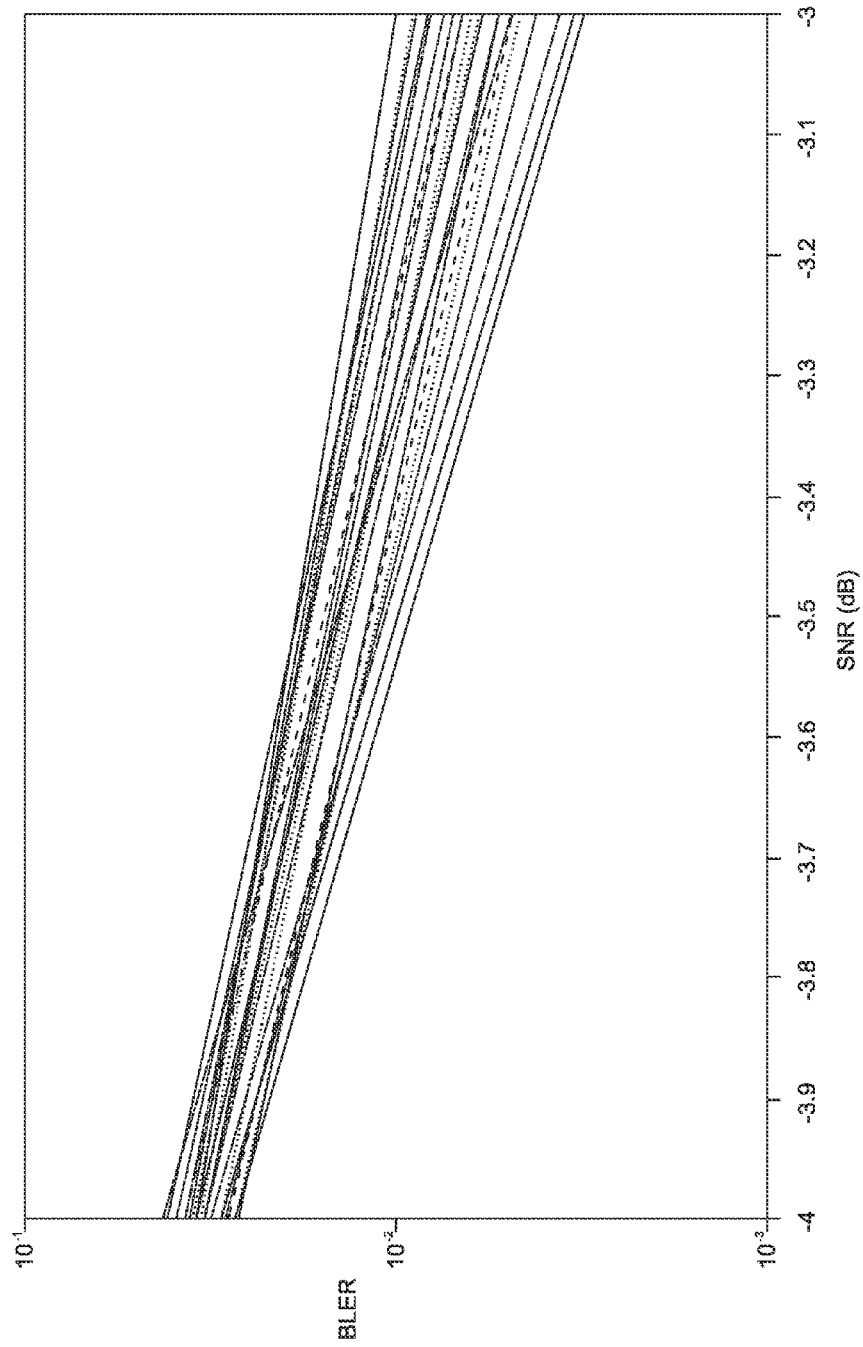
FIG. 39 is a diagram of an example result from yet another simulation.

FIG. 39 is a diagram of an example result from yet another simulation. Result 3900 may show results with a shortened code and repetition, a sweep of POs, a rate of 0.75 LDPC, 64 msgBits and 10,000 Num blocks. Result 3900 of simulation 3 shows a similar performance spread as in simulation 1. Result 3900 may also show R of ¾, a message size of 64 and PO=-POmax: -10.

Figure 40:
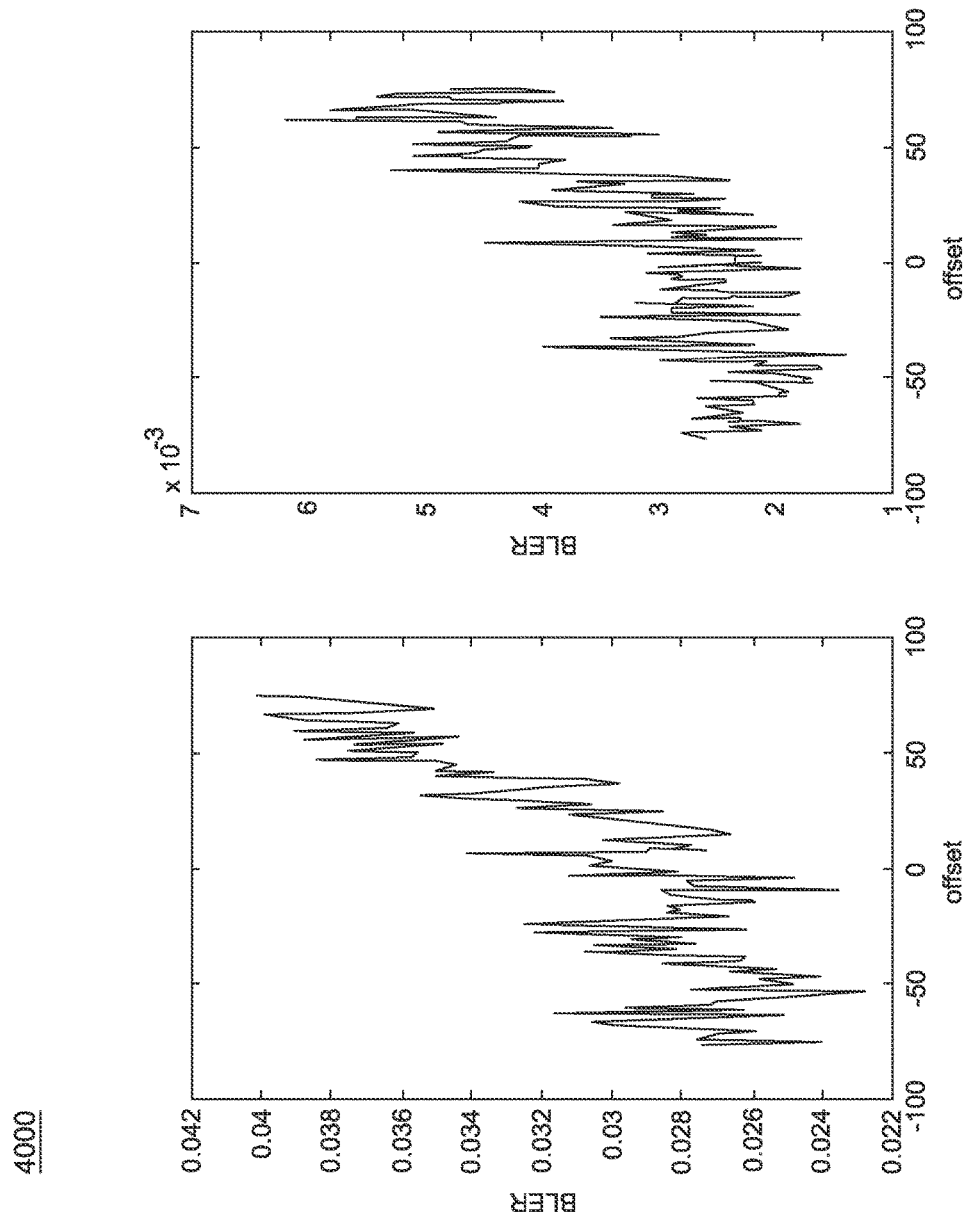
FIG. 40 is a diagram of another example result from an additional simulation.

FIG. 40 is a diagram of another example result from an additional simulation. Result 4000 of simulation 3 may also show that $-PO_{max}$ is the best choice in the typical sense. Result 4000 may also show BER at -4 dB, -3 dB SNR versus PO and message bit=64 rate=0.75. Result 4000 may also show BLER plotted versus PO at two different SNRs. Note that this simulation may be configured similar to the SC-PHY header in IEEE 802.11ad. More importantly, IEEE 802.11ad uses $-PO_{max}$ which is actually the worst PO that could be selected according to the simulation.

Figure 41:
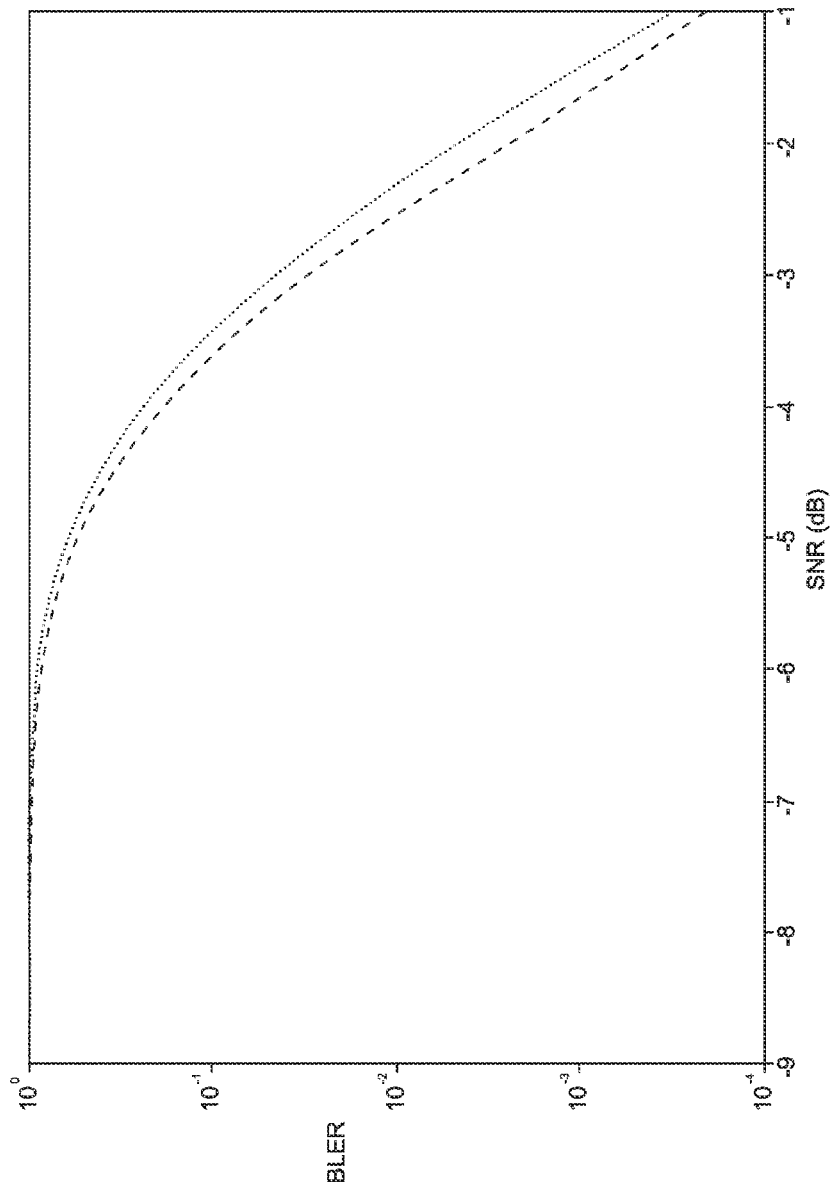
FIG. 41 is a diagram of an example comparison of the results of simulations.

FIG. 41 is a diagram of an example comparison of the results of simulations. Result 4100 compares simulation 2 with simulation 3. Result 4100 may show results with a shortened code and repetition, a sweep of LDPC coderates, 64 msgBits, 10,000 Num blocks and an efficiency rate per each method for 2 CWs of 0.2857. Further, result 4100 may show the modified method performs better because it can utilize the lower code rate. Further, the modified method may be flexible enough to take a large range of word sizes.

The IEEE 802.11ad method uses the ¾ rate code, possibly to minimize zero padding. This strategy, however, may increase the overall code rates and thus may lead to lower performance depending on the message payload. The best choice of R is not clear for the general case and therefore the R is left as a system parameter so that best performance can be obtained for any payload size.

In examples, the low MCS was integrated with the existing MCSs in the BWT link level (LL) test bench (TB). Simulations were run to verify the performance. In order to use the existing SC-PHY header (or small modification of it), the performance of the modified low MCS, although expected to be better than MCS1, may still leave ~2 dB margin with respect to the header performance. With this in mind three separate example performance simulations were run: SC-PHY header (the 802.11ad version is used, but we note the modified version will have performance at least as good as the 802.11ad version), MCS1, and Low MCS.

The simulation parameters were as follows: 1x data sampling, AWGN channel, ideal SoP/EoSTF, no radio impairments, realistic CHEST and data detection, and PSDU length. While these simulations are idealistic, the relative performance of the different transmissions should not be overly distorted by these assumptions.

Figure 42:
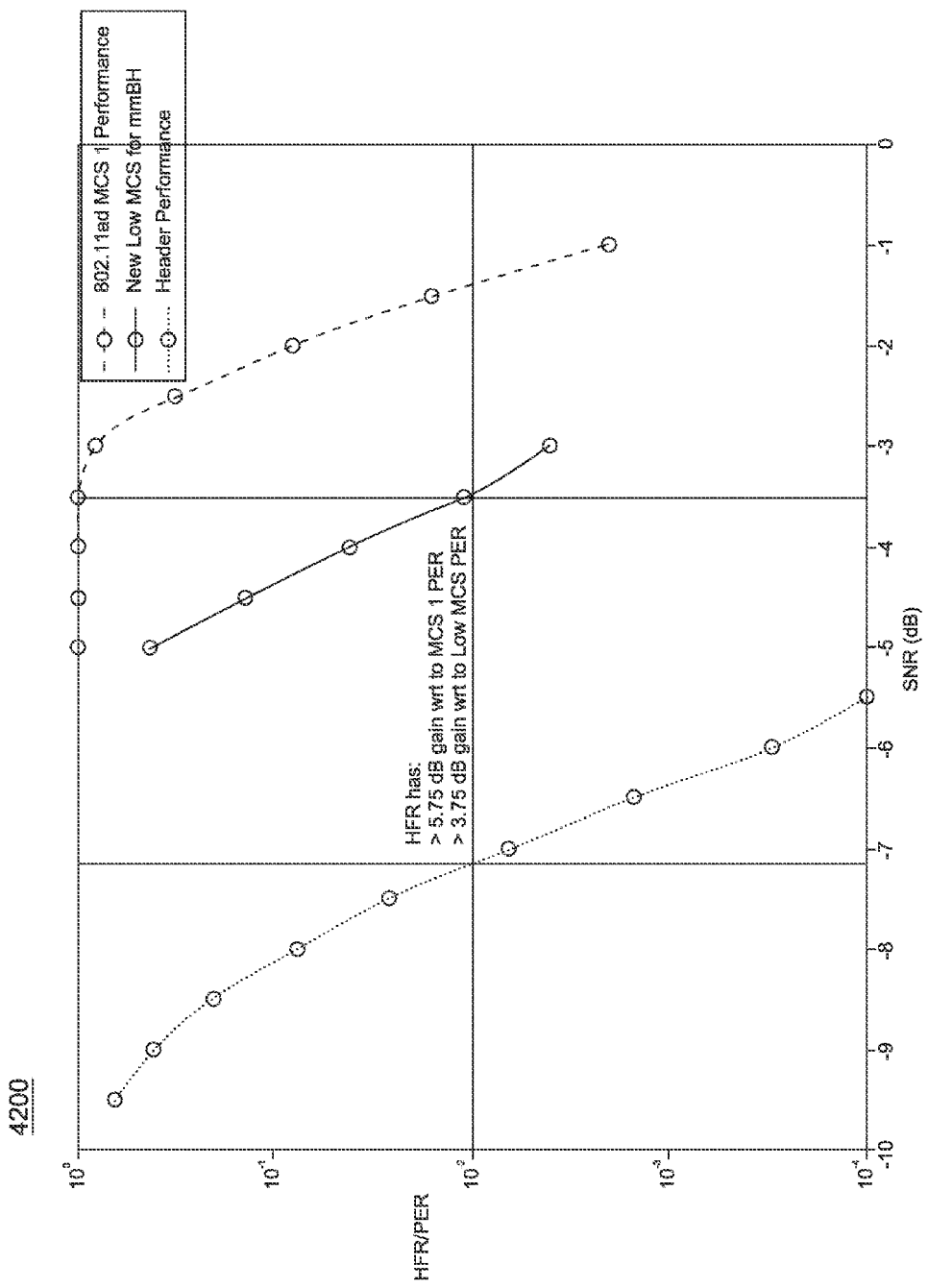
FIG. 42 is a diagram of an example comparison of multiple simulations.

FIG. 42 is a diagram of an example comparison of multiple simulations. The following may be observed in result 4200: Low MCS performs at about 2 dB better than MCS1 at 1% PER (this was expected due the lower effective coding rate), and the header performance may still be better than low MCS by ~4 dB at 1% PER. This may meet the ~2 dB margin, which may allow for the original SC-PHY header to be used unchanged. Result 4200 may also show one times sampling, an ideal SoP/EoSTF, realistic CHEST and no radio impairments.

The IEEE 802.11ad standard lists the receiver sensitivity for all SC-PHY MCSs. The receiver sensitivity for the modified low MCS may be calculated using the same performance criteria and degradation assumptions. The performance criterion is stated as "The PER shall be less than 1% for a PSDU length of 4096 octets using the input level defined at the antenna port." The simulation specification also assumes a 5 dB example loss and a 10 dB noise factor. However, using the MCS1, the criteria may be compared to the performance obtained with the simulation parameters specified as above. The specified receiver sensitivity, S_p, for MCS1 is started at −68 dBm. Next, using a 1.76 GHz BW, the thermal noise power is calculated as $$N_p = 10 \log(KTB) = -81.5 \text{ dBm}. \quad \text{Equation (20)}$$

Therefore the required SNR at the antenna port to be supported is:

$$SNR_{AP} = S_p - N_p = -68 + 81.5 = 13.5 \text{ dB}. \quad \text{Equation (21)}$$

Next, assuming 15 dB of degradation, as specified above, the SNR at which the 1% PER requirement refers to is −1.5 dB:

$$SNR_R = SNR_{AP} - SNR_D = -1.5 \text{ dB}. \quad \text{Equation (22)}$$

Result 4200 shows the 1% PER is at about −1.5 dB for MCS1 matching the specification. It may be assumed the operating environment used in the simulations is accurate. As shown in Result 4200, the modified low MCS may perform ~2 dB better so that the $SNR_R$ at 1% PER is about −3.5 dB and $$SNR_{AP} = SNR_R + SNR_D = 11.5 \text{ dB}. \quad \text{Equation (23)}$$

The receive sensitivity for the modified low MCS may now be calculated as:

$$S_p = SNR_{AP} + N_p = 11.5 - 81.5 = -70 \text{ dBm}. \quad \text{Equation (24)}$$

To achieve an example range of 350 m with the modified low MCS, a received power of −70 dBm at the antenna port (after any array gain and antenna losses) is required. There are multiple antenna configurations that may be used to achieve this. For the purposes of this example, the following assumptions are made: the same number of antenna elements are used for Tx and Rx; the elements are printed patch antennas with gain of 5.5 dBi; Equivalent Isotropically Radiated Power (EIRP) limited Federal Communications Commission (FFC) limit of 40 dBm; total Tx power is less than 10 dBm (European Union (EU) and other regional limits); molecular oxygen absorption is equal to 13 dB/km; rainfall losses is equal to 10 dB/Km (25 mm/Hr); and 3 dB a loss in Rx antenna (e.g., feed network).

With these assumptions, the low MCS link may be closed at 350 m with 100 Tx and Rx antenna elements, total Tx power equal to 10 dBm, EIRP equal to 35.5 dBm, Half Power Beamwidth (HPBW) equal to 11.5 deg (for square 10×10 arrangement). While these arrays are seemingly large, the following observations may be made. The 10 dBm Tx power limit is only for 60 GHz and outside of the US. The FCC permits higher power, and the EIPR limit is higher outside of the US and outside of 60 GHz. Techniques to scale antenna to thousands of elements may be feasible with mass production techniques. Most links may not need to support 350 m; 150 m is more typical.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented in a mesh node for use in mesh operations, the method comprising:
   receiving, by the mesh node, a signal including a preamble, wherein the preamble includes a first Golay sequence that is different from a second Golay sequence, wherein the second Golay sequence is an initial Golay sequence;

adjusting, by the mesh node, the preamble based on the received first Golay sequence; and sending, by the mesh node, transmissions using the adjusted preamble to a neighboring node.

2. The method of claim 1, wherein the signal including the preamble is received from a central node.

3. The method of claim 1, wherein the first Golay sequence included in the preamble is based on content of a data payload in a received transmission.

4. The method of claim 1, further comprising:
sending, by the mesh node, transmissions using the adjusted preamble to a plurality of neighboring nodes.

5. The method of claim 1, further comprising:
adjusting, by the mesh node, a preamble based on estimated channel conditions for at least one neighboring node.

6. The method of claim 1, further comprising:
sending, by the mesh node, further transmissions using the adjusted preamble based on receiving an acknowledgement or using a preamble longer than the adjusted preamble based failing to receive an acknowledgement.

* * * * *